United States Patent [19]
Yamashita et al.

[11] Patent Number: 5,644,621
[45] Date of Patent: Jul. 1, 1997

[54] POINT TO MULTIPOINT RADIOTELEPHONE SYSTEM

[75] Inventors: Hidehiro Yamashita, Ohnojou; Masakazu Tachiyama, Ogoori, both of Japan

[73] Assignee: Matsushita Electric Industrial co., Ltd., Osaka, Japan

[21] Appl. No.: 370,882

[22] Filed: Jan. 10, 1995

[30] Foreign Application Priority Data

Jan. 11, 1994 [JP] Japan ................... 6-001148

[51] Int. Cl.⁶ .......................... H04Q 7/30
[52] U.S. Cl. .......................... 455/463; 455/464
[58] Field of Search ............ 379/58, 61; 455/54.1, 455/56.1

[56] References Cited

U.S. PATENT DOCUMENTS

| | | |
|---|---|---|
| 4,144,412 | 3/1979 | Ito et al. . |
| 4,682,351 | 7/1987 | Makino .................... 379/61 |
| 4,765,753 | 8/1988 | Schmidt . |
| 4,833,702 | 5/1989 | Shitara et al. . |
| 5,014,295 | 5/1991 | Kunihiro .................... 379/61 |
| 5,067,171 | 11/1991 | Kawano . |
| 5,101,501 | 3/1992 | Gilhousen et al. . |
| 5,136,629 | 8/1992 | Toyama et al. .................... 379/61 |
| 5,243,641 | 9/1993 | Evans et al. . |
| 5,327,574 | 7/1994 | Monma et al. . |
| 5,396,541 | 3/1995 | Farwell et al. . |

FOREIGN PATENT DOCUMENTS

| | | |
|---|---|---|
| 4104890 | 8/1992 | Germany . |
| 2-150131 | 6/1990 | Japan . |
| 2-215238 | 8/1990 | Japan . |
| 91/13509 | 9/1991 | WIPO . |

*Primary Examiner*—Dwayne D. Bost
*Attorney, Agent, or Firm*—Ratner & Prestia

[57] ABSTRACT

A radiotelephone system comprises plural sub units, and a main unit for communicating with the plural sub units. The main unit of the radiotelephone system comprises a first transmitter for transmitting radio signals to the sub units, a first receiver for receiving radio signals from the sub units, chief sub unit determining means for determining the chief sub unit to make radio communications out of the plural sub units, and first communication establishing means for establishing the communications with the chief sub unit determined by the chief sub unit determining means by controlling the first transmitter and second receiver. The sub unit of the radiotelephone system comprises second transmitting means for transmitting radio signals to the main unit, second receiving means for receiving radio signals from the main unit, and second communication establishing means for controlling the second transmitting means and second receiving means so as to establish radio communications with the main unit when selected as the chief sub unit, or controlling the second receiving means so as to receive the radio communications between the main unit and the chief sub unit when not selected as the chief sub unit.

28 Claims, 37 Drawing Sheets

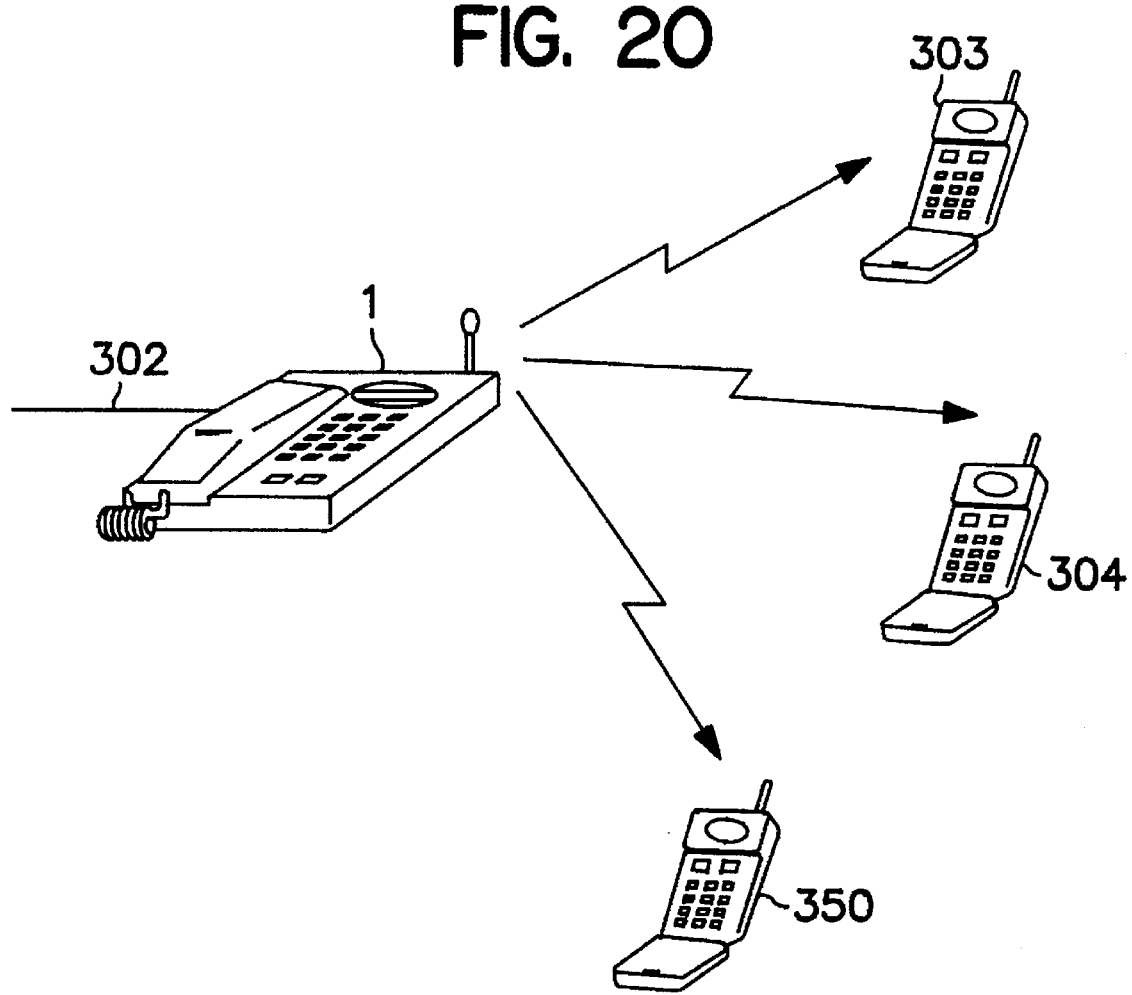

POINT TO MULTIPOINT RADIOTELEPHONE SYSTEM

BACKGROUND OF THE INVENTION

The present invention relates to a radiotelephone system for making communications between one main unit and plural sub units.

Recently, using radio communication means instead of the curled cord for connecting the telephone main body and transmitter-receiver, various radiotelephone systems enhanced in portability and convenience are developed.

Hitherto, the radiotelephone system consisted of one main unit equivalent to the telephone main body in the wired telephone system, and one sub unit for making radio communications with the main unit, and made communications by using analog signals.

There are lately developed radiotelephone systems comprising a main unit and plural sub units, and having a radio transmission unit for sending and receiving the signals for controlling these two radiotelephone units by using digital signals. In such radiotelephone system, the main unit selects one out of the plural sub units, and sends signals to this sub unit for controlling, and after establishing the communication with the intended sub unit, one-to-one communication is made with this sub unit.

In such constitution, however, one main unit can communicate with only one sub unit at the same time, and point-to-multi-point (batch multiple address) communication such as notice from one main unit to all sub units was not possible.

SUMMARY OF THE INVENTION

The invention solves the problems of the prior art, and it is hence a primary object thereof to present a radiotelephone system capable of making batch multiple address communications from a main unit, by allowing the other sub units to intercept the signal from the main unit while one main unit and one sub unit are making communications, as well as controlling two or more sub units by one main unit.

To achieve the object, in a radiotelephone system of the invention, the main unit comprises a first transmission unit for sending radio signals to sub units, a first reception unit for receiving radio signals from sub units, means for determining a chief sub unit for making radio communications out of plural sub units, and first means for establishing communications with the chief sub unit determined by the chief sub unit determining means by controlling the first transmission unit and first reception unit, and the sub unit comprises a second transmission unit for sending radio signals to the main unit, a second reception unit for receiving radio signals from the main unit, and second means for establishing communications with the main unit when the chief sub unit is determined by the main unit by controlling the second transmission unit and second reception unit, and controlling the reception unit when the chief sub unit is not determined by the main unit so as to receive communications between the main unit and the previous sub unit determined as chief sub unit.

BRIEF DESCRIPTION OF THE DRAWINGS

FIG. 20 is a general structural diagram of radiotelephone system in a fourth embodiment of the invention.

DESCRIPTION OF THE PREFERRED EMBODIMENTS

Embodiment 1

An embodiment of the invention is described below while referring to FIGS. 1, 2 and 3.

Figure 1:
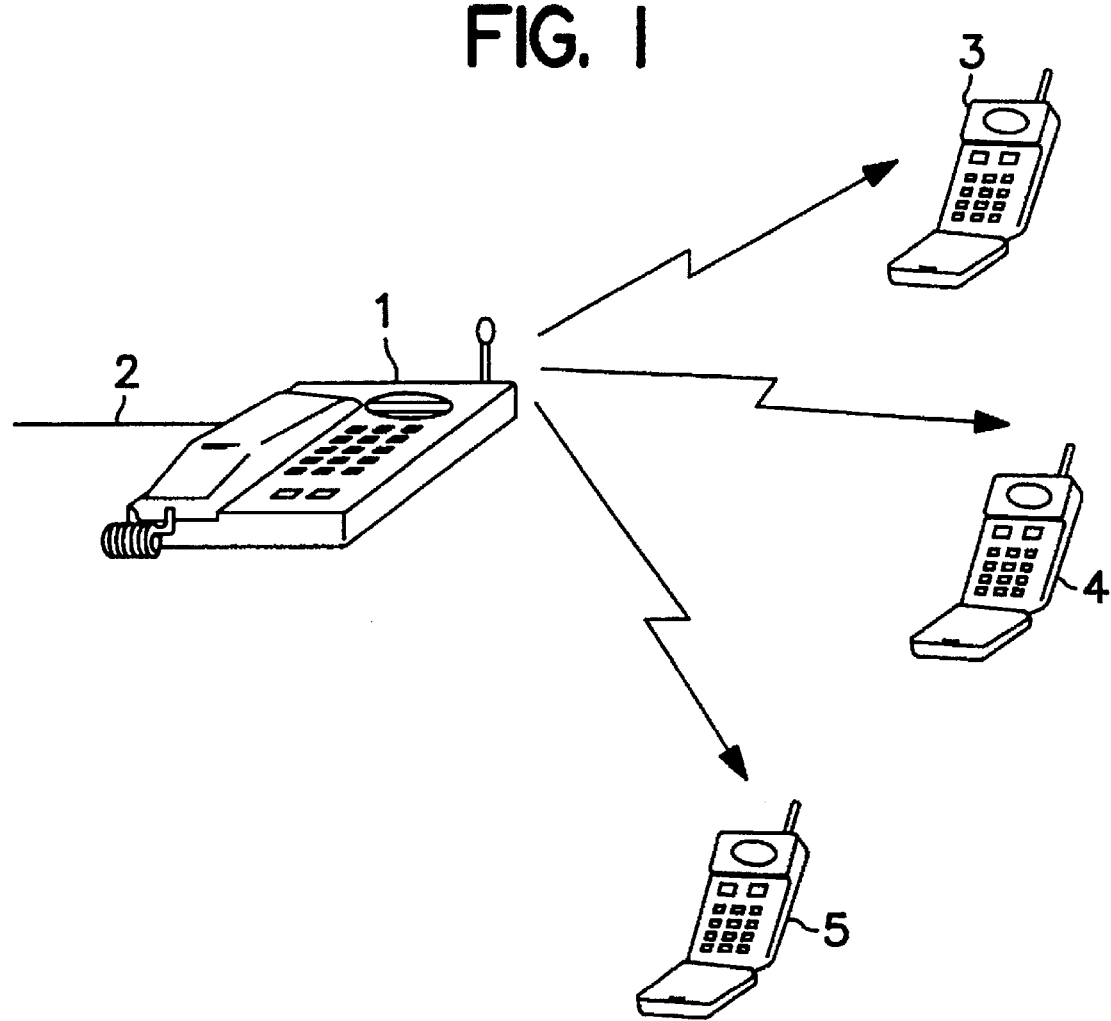
FIG. 1 is a general structural diagram of radiotelephone system in a first embodiment of the invention.

FIG. 1 is a general structural diagram of a radiotelephone system in an embodiment of the invention. The radiotelephone system of the embodiment comprises a main unit 1 connected to a telephone circuit 2, and plural sub units, sub unit 3, sub unit 4, and sub unit 5, for making radios communications with the main unit 1. Between the main unit 1 and the sub unit 3, sub unit 4 and sub unit 5, radio communications are made by making use of one of a control channel (CCH) for exchanging control signals, and three information channels (TCH1, TCH2, TCH3) for sound communications, etc. These pieces of information are communicated by time division multiplex access (TDMA).

The constitution of the main unit 1 and the sub unit 3, sub unit 4, sub unit 5 is described below.

Figure 2:
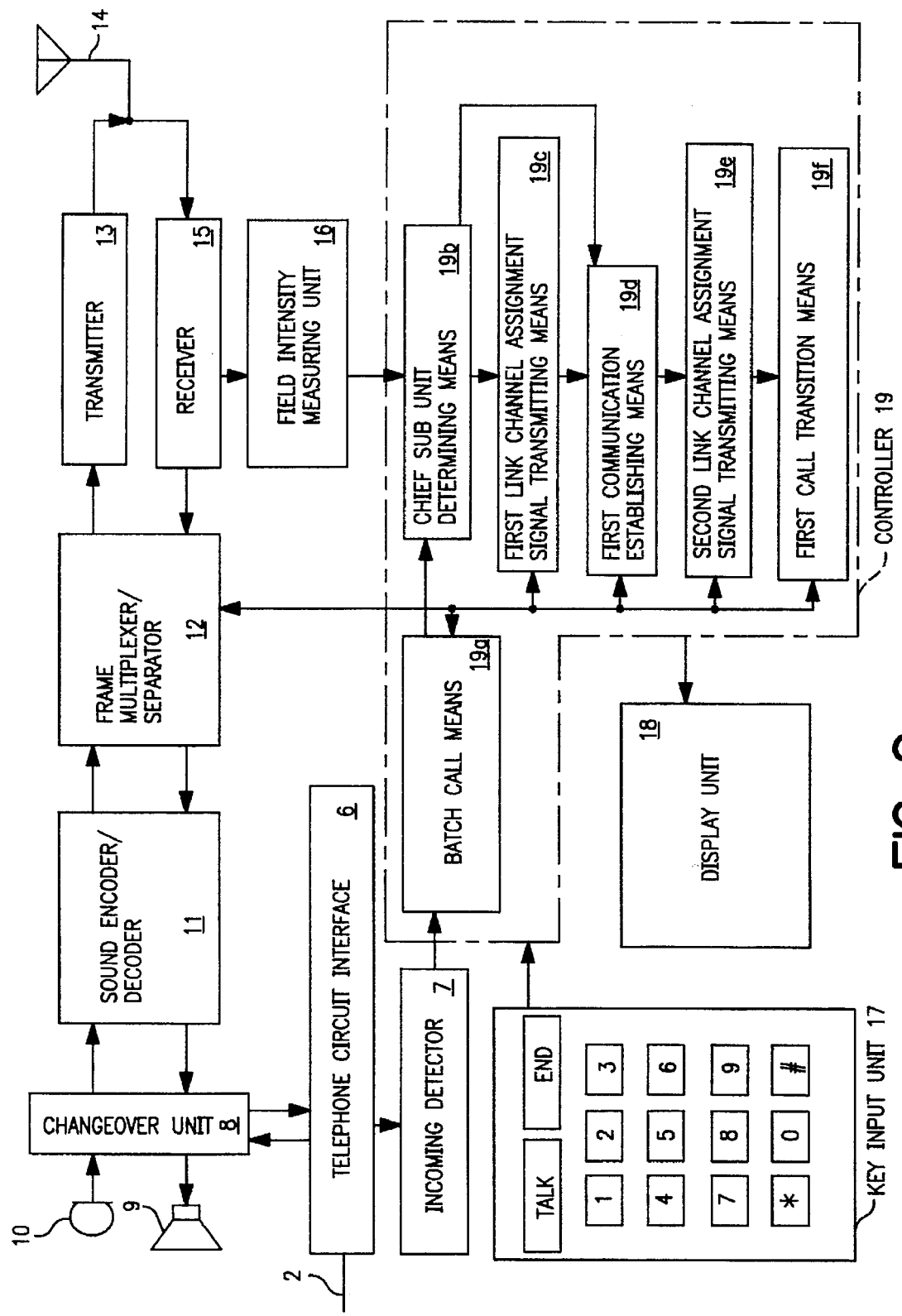
FIG. 2 is a functional block diagram of a main unit of the radiotelephone system in the first embodiment of the invention.

FIG. 2 is a functional block diagram of the main unit 1 of the embodiment, in which reference numeral 6 is a telephone circuit interface for exchanging signals with the telephone circuit 2, 7 is an incoming detector for detecting incoming to the main unit 1 by monitoring the signals entering from the telephone circuit 2 into the telephone circuit interface 6, 9 is a sound output unit for issuing sound signals, 10 is a sound input unit for receiving sound signals, 11 is a sound encoder/decoder for coding sound signals and decoding coded sound signals, and 8 is a changeover unit for changing over whether to connect the telephone circuit 2 to the sound encoder/decoder 11 or to connect the sound input unit 10 and sound output unit 9.

Reference numeral 12 is a frame multiplexer/separator for distributing coded signals from the sound encoder/decoder 11 and control signals from a controller 19 described below in a channel specified by the controller 19 among TCH1, TCH2, TCH3, CCH, multiplexing each channel, separating the multiplexed signals into TCH1, TCH2, TCH3, CCH, and issuing the signals of the channel specified by the controller 19 into the sound encoder/decoder 11 and controller 19, 13 is a transmitter for radio-transmitting the multiplexed signals issued from the frame multiplexer/separator 12 through an antenna 14, 15 is a receiver for sending out the multiplex signals radio-received through the antenna 14 to the frame multiplexer/separator 12, 16 is a reception field intensity measuring unit for measuring the reception field intensity of the multiplexed signals received in the receiver 15, 17 is a key input unit for entering dial numbers and others, 18 is a display unit for displaying the number and others entered from the key input unit 17, and 19 is the controller for controlling the entire main unit 1.

The controller 19 also instructs the channel for making communications to the frame multiplexer/separator 12, generates signals to be sent out by using the instructed channel, analyzes the signals sent from the instructed channel, and controls the parts depending on the result of analysis.

Each one of the radio channels TCH1, TCH2, TCH3, CCH comprises an up slot for sending from the sub unit 3, sub unit 4 and sub unit 5 to the main unit 1, and a down slot, from the main unit 1 to the sub unit 3, sub unit 4 and sub unit 5, and two-way access is realized by these two slots.

Between the sub unit 3, sub unit 4 and sub unit 5, and the telephone circuit 2, the telephone circuit interface 6 captures the signal from the telephone circuit 2, the sound encoder/decoder 11 encodes the captured signal, the frame multiplexer/separator 12 distributes the coded signal into the channel instructed by the controller 19 to multiplex, and sends the multiplexed signal to the transmitter 13, and the transmitter 13 radio-transmits to the sub unit 3, sub unit 4 and sub unit 5, thereby communicating from the telephone circuit 2 to the sub unit 3, sub unit 4 and sub unit 5, the receiver 15 receives the signal from the sub unit 3, sub unit 4 and sub unit 5, the frame multiplexer/separator 12 separates and sends the signal of the channel instructed by the controller 19 to the controller 12 and sound encoder/decoder 11, and the sound encoder/decoder 11 sends out to the telephone circuit 2 through the sound output unit 9 or telephone circuit interface 6, thereby communicating from the sub unit 3, sub unit 4 and sub unit 5 to the telephone circuit 2.

Furthermore, when sending control information from the main unit 1 to the sub unit 3, sub unit 4 and sub unit 5, the control information is generated by the controller 19, and using this control signal, the coded signal is distributed and multiplexed in the channel preliminarily instructed by the controller 19 by the frame multiplexer/separator 12, and the multiplexed signal is sent out into the transmitter 13, and the transmitter 13 radio-transmits. Moreover, received by the receiver 15, the signal of the channel separated by the frame multiplexer/separator 12 is sent into the controller 19, and this signal is analyzed, and is controlled depending on the type of the signal. By these controls, the control information is exchanged between the main unit 1 and the sub unit 3, sub unit 4 and sub unit 5. In other words, that the controller 19 sends the control information to the frame multiplexer/separator 12 means that the controller 19 transmits the control information to the sub unit 3, sub unit 4 and sub unit 5, and, to the contrary, that the controller receives the separated signal from the frame multiplexer/separator 12 means that the controller 19 receives the signal from the sub unit 3, sub unit 4 and sub unit 5.

The controller 19 comprises batch call means 19a for instructing to use CCH as the channel for making communications when the incoming detector 7 detects incoming, and sending a batch call signal to the frame multiplexer/separator 12, chief sub unit determining means 19b for analyzing the transmission destination of the signal when a first link channel establishment request signal is contained in the signals separated by the frame multiplexer/separator 12, measuring the reception field intensity at this time in the reception field intensity measuring unit 16, and determining the sub unit that have sent the greatest signal of the signals as a result of measurement by the reception field intensity measuring unit 16 as the chief sub unit, first link channel assignment signal transmitting means 19c for generating a first link channel assignment signal comprising the information showing which sub unit is determined as the chief sub unit, the information showing which one of the TCH1, TCH2, TCH3 is the information channel for making sound communications or the like for transmitting the batch incoming information, and others, and sending out the signal to the frame multiplexer/separator 12, first communication establishment means 19d for instructing the frame multiplexer/separator 12 to communicate by using the signal for instructing to communicate by using the information channel assigned by the first link channel assignment means 19c, and establishing the communications by exchanging synchronous bursts or the like with the chief sub unit determined by the chief sub unit determining means 19b in this channel, second link channel assignment signal transmitting means 19e for sending out a second link channel assignment signal comprising frequency of new talk channel, slot information and others with respect to the sub unit receiving the signal when receiving a second link channel establishment request signal through CCH to the frame multiplexer/separator 12, sending out a radio channel cut-off signal for releasing the busy channel to the frame multiplexer/separator 12, and first call transition means 19f for instructing to communicate by using the call channel set by the second link channel assignment signal transmitting means 19e to the frame multiplexer/separator 12, and transferring to the call state by exchanging synchronous bursts or the like with the sub unit which has transmitted a second link channel establishment request signal.

Figure 3:
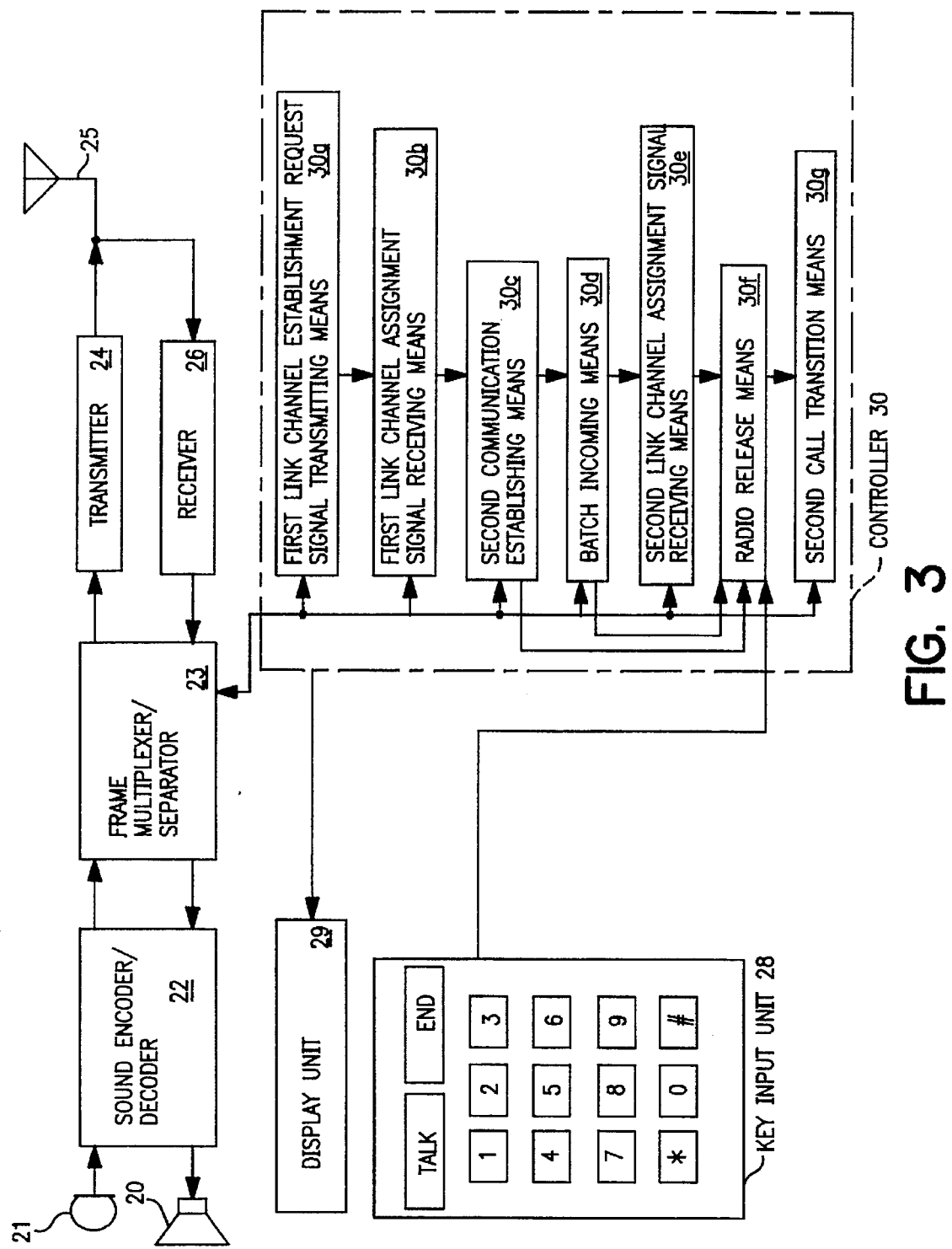
FIG. 3 is a functional block diagram of a sub unit of the radiotelephone system in the first embodiment of the invention.

FIG. 3 is a functional block diagram of the sub unit 3, sub unit 4 and sub unit 5 shown in FIG. 1, in which reference numeral 20 denotes a sound output unit for issuing sound signals, 21 is a sound input unit for receiving sound signals, 22 is a sound encoder/decoder for coding a sound signal and decoding a coded sound signal, 23 is a frame multiplexer/separator for distributing the coded signal from the sound encoder/decoder 22 and control signal from a controller 30 described below in a channel specified by the controller 30 out of TCH1, TCH2, TCH3, CCH, multiplexing each channel, and separating the multiplexed signal sent from a receiver 26 mentioned below into TCH1, TCH2, TCH3, CCH, and sending out the signal of the channel instructed by the controller 30 to the sound encoder/decoder 22 and controller 30, 24 is a transmitter for radio-transmitting the multiplexed signal sent from the frame multiplexer/separator 23 from an antenna 25 to the main unit 1, 26 is a receiver for sending out the multiplexed signal radio-received through the antenna 25 to the frame multiplexer/separator 23, 28 is a key input unit for entering dial number and others, 29 is a display unit for displaying the number and others entered from the key input unit 28, and 30 is the controller for controlling the whole.

In transmission of sound signal from the sub unit 3, sub unit 4 and sub unit 5 to the main unit 1, the sound signal entered in the sound input unit 21 is coded by the sound encoder/decoder 22, the coded signal is distributed and multiplexed in the channel instructed by the controller 30 by the frame multiplexer/separator 23, the multiplexed signal is issued to the transmitter 24, and the transmitter 24 radio-transmits, whereas in reception from the main unit 1, the signal in the channel instructed by the controller 30, being received by the receiver 26 and separated by the frame multiplexer/separator 23 is sent out into the controller 30 and sound encoder/decoder 22, and the sound encoder/decoder 22 sends the output to the sound output unit 9.

Furthermore, when sending control information to the main unit 1, the control information is generated by the controller 30, and this information is distributed and multiplexed in the channel preliminarily instructed by the controller 30 by the frame multiplexer/separator 23, and the multiplexed signal is sent out into the transmitter 24, and the transmitter 24 radio-transmits. Moreover, received by the receiver 26, the signal is separated by the frame multiplexer/separator 23, and the signal in the channel instructed by the controller 30 is put out into the controller 30, and the controller 19 analyzes the signal, and controls depending on the type of the signal. In other words, that the controller 30 sends the control information to the frame multiplexer/separator 23 means that the controller 30 transmits the control information to the main unit 1, and, to the contrary, that the controller 30 receives the separated signal from the frame multiplexer/separator 23 means that the controller 30 receives the signal from the main unit 1.

The controller 30 comprises first link channel establishment request signal transmitting means 30a for issuing a first link channel establishment request signal to the frame multiplexer/separator 23 when a batch call signal is issued from the frame multiplexer/separator 23 when instructing the CCH to the frame multiplexer/separator 23, a first link channel assignment signal receiving means 30b for instructing the frame multiplexer/separator 23 to communicate by using the talk channel specified in the signal when the batch call signal is issued from the frame multiplexer/separator 23 while instructing the CCH to the frame multiplexer/separator 23, second communication establishment means 30c for establishing communications with the main unit 1 by exchanging signals with the frame multiplexer/separator 23, when the chief sub unit information contained in the signal is one's own, in the case of output of a first link channel assignment signal from the frame multiplexer/separator 23 after control of the first link channel assignment signal receiving means 30b, batch incoming means 30d for controlling the frame multiplexer/separator 23 to intercept the call between the main unit 1 and the chief sub unit, when the chief sub unit information contained in the signal is not one's own, in the case of output of a first link channel assignment signal from the frame multiplexer/separator 23 after control of the first link channel assignment signal receiving means 30b, second link channel assignment signal receiving means 30e for instructing to communicate by using the CCH to the frame multiplexer/separator 23 in the case of input to the response from the key input unit 28, and issuing a second link channel establishment request signal, then receiving the second link channel assignment signal issued from the frame multiplexer/separator 23, radio release means 30f for instructing the CCH to the frame multiplexer/separator 23, when a radio channel cut-off signal is issued from the frame multiplexer/separator 23 during operation of the second communication establishment means 30c or batch incoming means 30d, and transferring to the state of waiting for output from the frame multiplexer/separator 23, and second call transition means 30g for instructing the frame multiplexer/separator 23 to communicate by using the call channel specified in the second link channel assignment signal, and transferring to the call state by controlling the frame multiplexer/separator 23.

Figure 4:
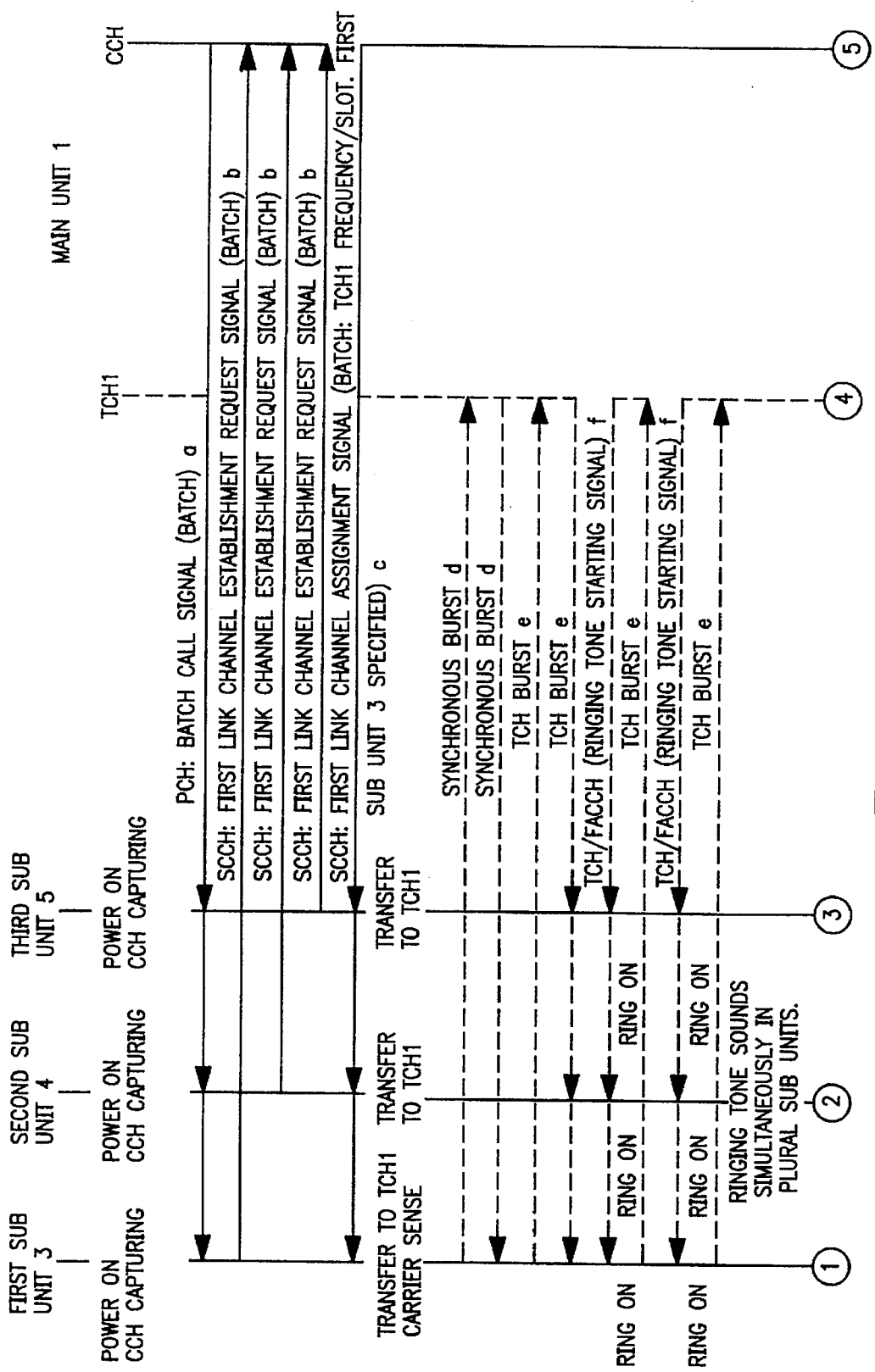
FIG. 4 is a sequence chart of the radiotelephone system in the first embodiment of the invention.
Figure 5:
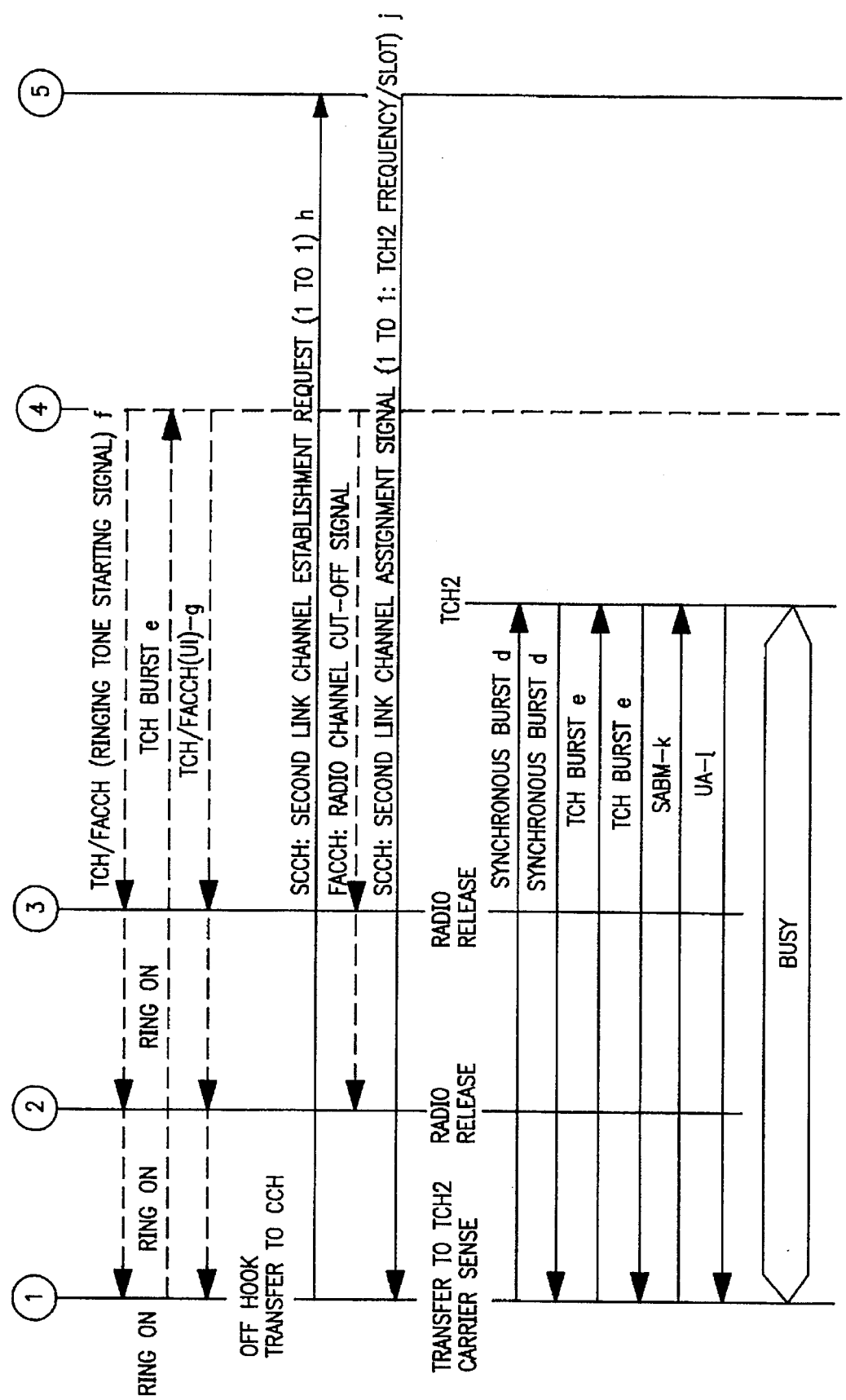
FIG. 5 is a sequence chart of the radiotelephone system in the first embodiment of the invention.

In thus constituted radiotelephone system, the operation is described below while referring to FIGS. 4, 5, 6, and 7. The embodiment refers to a case in which the one from the sub unit 1 is the strongest of all first link channel establishment request signals received by the main unit 1. FIG. 4 is a sequence flow chart of the radiotelephone system in the embodiment of the invention, and FIG. 5 is a sequence chart following the sequence shown in FIG. 4, in FIGS. 4 and 5, CCH is a control channel, TCH, TCH1, TCH2 are information channel for sound communications, etc., SCCH is a channel for sending information necessary for call connection, FACCH is a control channel attached to TCH, SABM is a synchronous setting mode, and UA is a validation signal not specified in sub unit. Moreover, a is a batch call signal sent from the main unit 1, b is a first link channel establishment request signal sent from the sub unit 3, sub unit 4 and sub unit 5, c is a first link channel assignment signal sent from the main unit 1, d is a signal transmitted for synchronizing between the sub unit and main unit 1 (hereinafter called synchronous burst), e is a TCH burst transmitted for establishing communications of TCH, f is a ringing tone starting signal for issuing a ringing tone by the sub unit 3 or the like, g is a ringing tone starting signal, h is a second link channel establishment request signal transmitted from the sub unit 3, i is a radio channel cut-off signal transmitted from the main unit 1, j is a second link channel assignment signal transmitted from the main unit 1, k is SABM, and l is UA.

Figure 6:
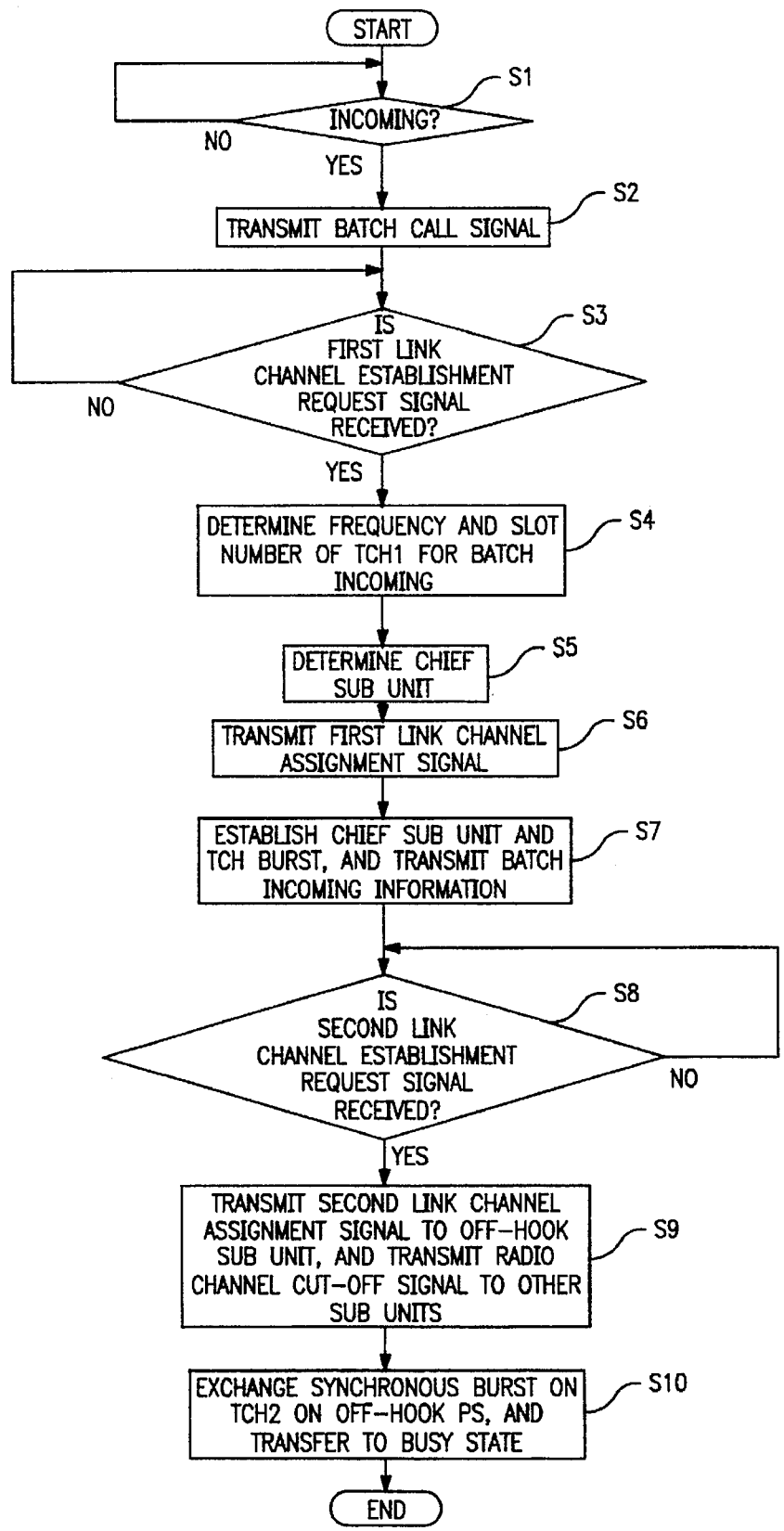
FIG. 6 is a flow chart of the main unit of the radiotelephone system in the first embodiment of the invention.
Figure 7:
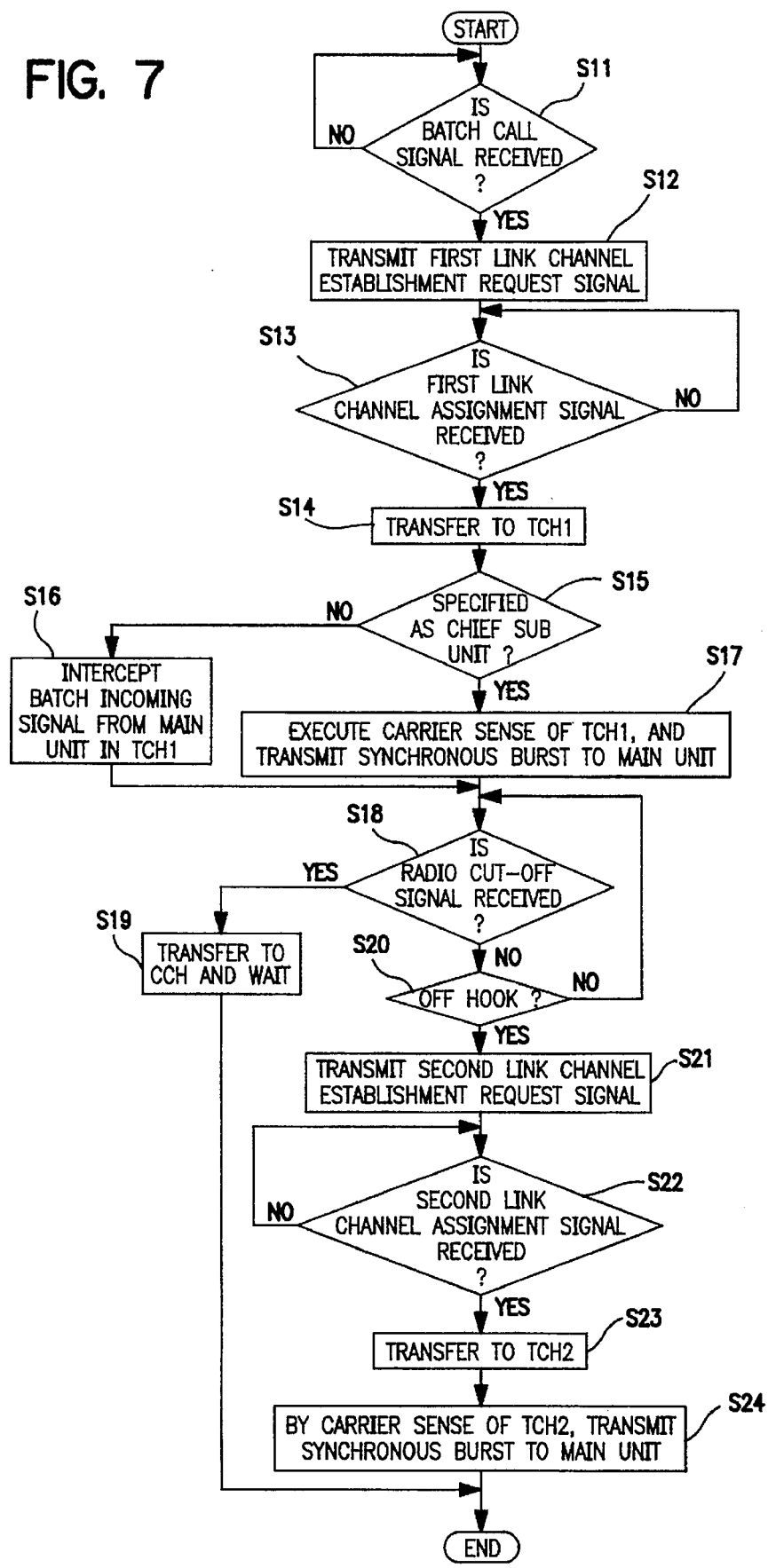
FIG. 7 is a flow chart of the sub unit of the radiotelephone system in the first embodiment of the invention.

FIG. 6 is a flow chart of the main unit of the radiotelephone system in the embodiment of the invention, and FIG. 7 is a flow chart of the sub unit of the radiotelephone system in the embodiment of the invention.

To begin with, the operation of the main unit 1 is explained by reference to FIG. 6.

First, the batch call detecting means 19a checks if the incoming detector 7 has detected incoming or not (S1).

If No, the batch call detecting means 19a continues this action until incoming is detected.

If Yes, the batch call detecting means 19a instructs the frame multiplexer/separator 23 to communicate by using the CCH, and issues a batch call signal a. As a result, the frame multiplexer/separator 23 multiplexes with the batch call signal a distributed in the CCH, and this signal is sent out from the transmitter 13 (S2).

Afterwards, the chief sub unit determining means 19b checks if the first link channel establishment request signals b from all of the sub unit 3, sub unit 4 and sub unit 5 are issued from the frame multiplexer/separator 12. At S2, since the CCH is instructed to the frame multiplexer/separator 12, the first link channel establishment request signals b incoming from the sub units are received by using the CCH by this control, and it is checked if signals from all sub units are received or not (S3).

If the result of S3 is No, this control is continued until all signals are received. At this time, the chief sub unit determining means 19b analyzes the signal every time the first channel link establishment request signal b is received, and the sending sub unit is checked, while the output of this signal from the reception field intensity measuring unit 16 is checked.

If Yes, the largest first channel link establishment request signal b as a result of measurement in the reception field intensity measuring unit 16 is analyzed, and the information channel is determined on the basis of the communication desired information channel contained in that signal. In this embodiment, supposing that the first channel link establishment request signal b from the sub unit 3 is the largest, the information channel data contained in this signal b is TCH1, and this TCH1 is determined (S4).

Consequently, the chief sub unit determining means 19b determines the sub unit transmitting the largest first channel link establishment request signal b as a result of measurement by the reception field intensity measuring unit 16 as the representative sub unit. In the case of this embodiment, supposing that the first channel link establishment request signal b sent from the sub unit 3 is the largest, the sub unit 3 is determined as the representative sub unit (S5).

The first link channel assignment signal transmitting means 19c generates a first link channel assignment signal c comprising the information showing that the signal for batch call is TCH1 and that the chief sub unit is the sub unit 3, and sends it out to the frame multiplexer/separator 12. As a result, this signal is multiplexed in the state distributed in the CCH, and is transmitted to the transmitter 13 (S6).

Later, the first communication establishing means 19d instructs to the frame multiplexer/separator 12 that the communication channel determined at S3 is TCH1, and controls the frame multiplexer/separator to exchange the synchronous burst d with the sub unit 3, thereby establishing the TCH burst e in the TCH1.

Then the second link channel assignment signal transmitting means 19e issues the batch incoming signal such as ringing tone starting signal f for starting the ringing tone of the sub unit 3, sub unit 4 and sub unit 5 to the frame multiplexer/separator 12. This information is distributed and multiplexed in the TCH1 by the frame multiplexer/separator 12, and is transmitted by the transmitter 13 (S7).

The first call transition means 19f instructs the CCH to the frame multiplexer/separator 12, and checks if the second link channel establishment request signal h is issued from the frame multiplexer/separator 12 or not (S8).

If No, the sequence lumps to S8, and if Yes, the first call transition means 19f specifies the sub unit that has transmitted this signal from the second link channel establishment request signal h (sub unit 3, in this embodiment), and controls the frame multiplexer/separator 12, and controls to transmit the second link channel assignment signal j containing the information of the information channel (TCH2, in this embodiment) by using the CCH, and further controls the frame multiplexer/separator 12 so as to transmit the radio channel cut-off channel i for releasing the TCH1 by using the CCH to the other sub unit 4 and sub unit 5 (S9).

In consequence, the controller 19 instructs the TCH2 to the frame multiplexer/separator 12, and controls the frame multiplexer/separator 12 to exchange the synchronous burst d with the sub unit 3 transmitted in TCH2 to establish communications, thereby setting in busy state (S10).

The operation of the sub unit 3, sub unit 4 and sub unit 5 is explained below by reference to FIG. 7.

In the first place, the first link channel establishment request transmitting means 30a instructs the CCH to the frame multiplexer/separator 23, and monitors the output from the frame multiplexer/separator 23 to check if a batch call signal a is issued or not (S11).

If No, this monitoring is continued until a batch call signal a is issued, and if Yes, a first link channel establishment request signal b is issued to the frame multiplexer/separator 23 to send this signal to the main unit 1. This transmission is effected in the CCH because the CCH is instructed at S11 (S12).

The first link channel assignment signal receiving means 30b monitors the frame multiplexer/separator 23, and checks if a first link channel assignment signal c is issued or not. That is, it is investigated if a first link channel assignment signal c is sent from the main unit 1 (S13)

If No, this monitoring is continued until a first link channel assignment signal c is issued, and if Yes, it is instructed to the frame multiplexer/separator 23 to make communications by using the specified information channel TCH1 in the received first link channel assignment signal c, so that the consequent communication is transferred to the TCH1 (S14).

The second communication establishment means c investigates if it is itself determined as the chief sub unit from the information of the chief sub unit in the first link channel assignment signal c (S15). In this embodiment, the sub unit 3 is determined as the chief sub unit.

The sub units of No, or the sub unit 4 and sub unit 5 are issued from the frame multiplexer/separator 23, that is, the TCH burst e communicated between the main unit and the chief sub unit, and ringing tone starting signal f and other batch incoming information are intercepted, thereby jumping to S18 (S16).

The sub unit of Yes, or the sub unit 3 senses the carrier, and issues a synchronous burst d in TCH1 to the frame multiplexer/separator 23, thereby establishing communications with the main unit 1 (S17).

Then the batch incoming means 30d investigates if the frame multiplexer/separator 23 has issued a radio channel cut-off signal i or not, that is, if a batch incoming signal is sent from the main unit or not (S18).

If Yes, after instructing the CCH to the frame multiplexer/separator 23, all processing is terminated (S19).

If No, the second link channel assignment signal receiving means 30e checks if an off-hook signal is sent from the key input unit 23, or if the own user has replied or not (S20).

If No, jumping to S18, and if Yes, it is instructed to the frame multiplexer/separator 23 to communicate by using the CCH, while a second link channel establishment request signal h is issued, and this signal is sent to the main unit 1 in the CCH (S21).

The second link channel assignment signal receiving means 30e further investigates if a second link channel assignment signal j is issued from the frame multiplexer/separator 23 (S22).

If No, jumping to S22, and if Yes, the information channel TCH2 specified in this second link channel assignment signal j is instructed to the frame multiplexer/separator 23, and the subsequent communication is transferred to the TCH2 (S23).

Consequently, by the controller 30 of the sub unit 3 which is off the hook, carrier sensing is done in the TCH2, and a synchronous burst d is sent in the TCH2, thereby transferring to the busy state (S24).

Thus, according to the embodiment, the batch call signal a in the CCH from the main unit 1 is sent to all sub units, and the first sub unit 3 and others, upon receiving the batch call signal a in the CCH, sends first link channel establishment request signals b as the reply thereto, and the main unit 1 receives the first link channel assignment signals c composed of slot number information and others corresponding to the first sub unit 3 and others which have send the first link channel establishment request signals b, so that one main unit 1 can control two or more sub units.

Instead of the CCH, moreover, by using the TCH1 for transmitting the batch incoming information, the sub units may be transferred to the TCH1, the signal from the main unit 1 is intercepted to set in batch incoming state, and thereby the two or more sub units intercept the batch incoming information composed of sound and others from one main unit, so that the batch incoming state can be established.

Besides, the main unit 1 determines the chief sub unit, selecting one from the first sub unit 3 and others which have transmitted the first link channel establishment request signals b in the CCH, and establishes communications with this chief sub unit, so that the TCH1 may be held securely.

Furthermore, by selecting the sub unit strongest in the reception field intensity of the first link channel establishment request signals b in the main unit 1 as the chief sub unit, the holding of TCH may be more secure.

Incidentally, in the embodiment, the chief sub unit is the one strongest in the reception field intensity in the main unit 1 of the first link channel establishment request signals b measured in the reception field intensity measuring unit 16 in the main unit 1, but, instead, the field intensities in the sub unit 3 and others of the batch call signals a measured in the field intensity measuring unit 16 in the sub unit 3 and others may be sent to the main unit 1 together with the first link channel establishment request signal, and the main unit 1 may determine the one largest in the values of the reception field intensity being transmitted as the chief sub unit, or may determine in other method, too.

Embodiment 2

A radiotelephone system in a second embodiment of the invention is described below while referring to FIGS. 8 and 9.

The embodiment, like embodiment 1, comprises one main unit 101, and three sub units, sub unit 102, sub unit 103 and sub unit 104.

Figure 8:
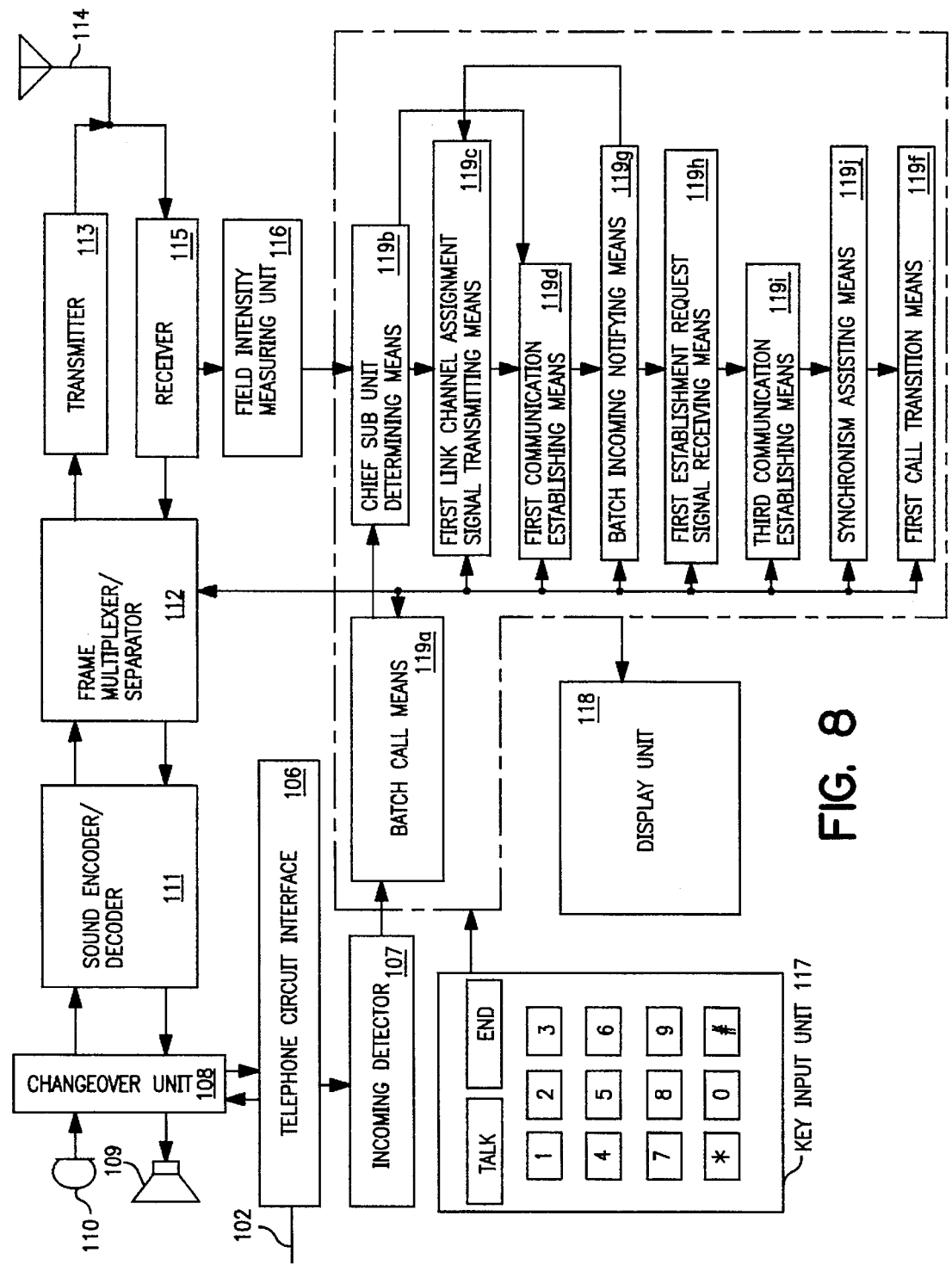
FIG. 8 is a functional block diagram of a main unit of a radiotelephone system in a second embodiment of the invention.

FIG. 8 is a functional block diagram of the main unit 101 of the radiotelephone system of the embodiment, in which reference numeral 106 is a telephone circuit interface, 107 is an incoming detector, 108 is a changeover unit, 109 is a sound input unit, 111 is a sound encoder/decoder, 112 is a frame multiplexer/separator, 113 is a transmitter, 115 is a receiver, 116 is a reception field intensity measuring unit, 117 is a key input unit, 118 is a display unit, 119 is a controller, 119a is batch call means, 119b is chief sub unit determining means, 119c is first link channel assignment signal transmitting means, 119d is first communication establishing means, 119e is second link channel assignment signal transmitting means, and 119f is first call transition means, and they are same as in embodiment 1, and hence their explanations are omitted.

Reference numeral 119g is batch incoming state notifying means for issuing a batch incoming state notifying signal composed of frequency and slot number of TCH1 and the like to the frame multiplexer/separator 112 after controlling of the first link channel assignment signal transmitting means 119c, 119h is first link channel establishment request signal receiving means for receiving a first link channel establishment request signal c from the frame multiplexer/separator 112, 119i is third communication establishing means for issuing a first link channel assignment signal c to the frame multiplexer/separator 112 when the first link channel establishment request signal receiving means 119h has received a first link channel establishment request signal c, and 119j is synchronism assisting means for controlling the frame multiplexer/separator 112 so as to periodically send out synchronism assisting signals.

Figure 9:
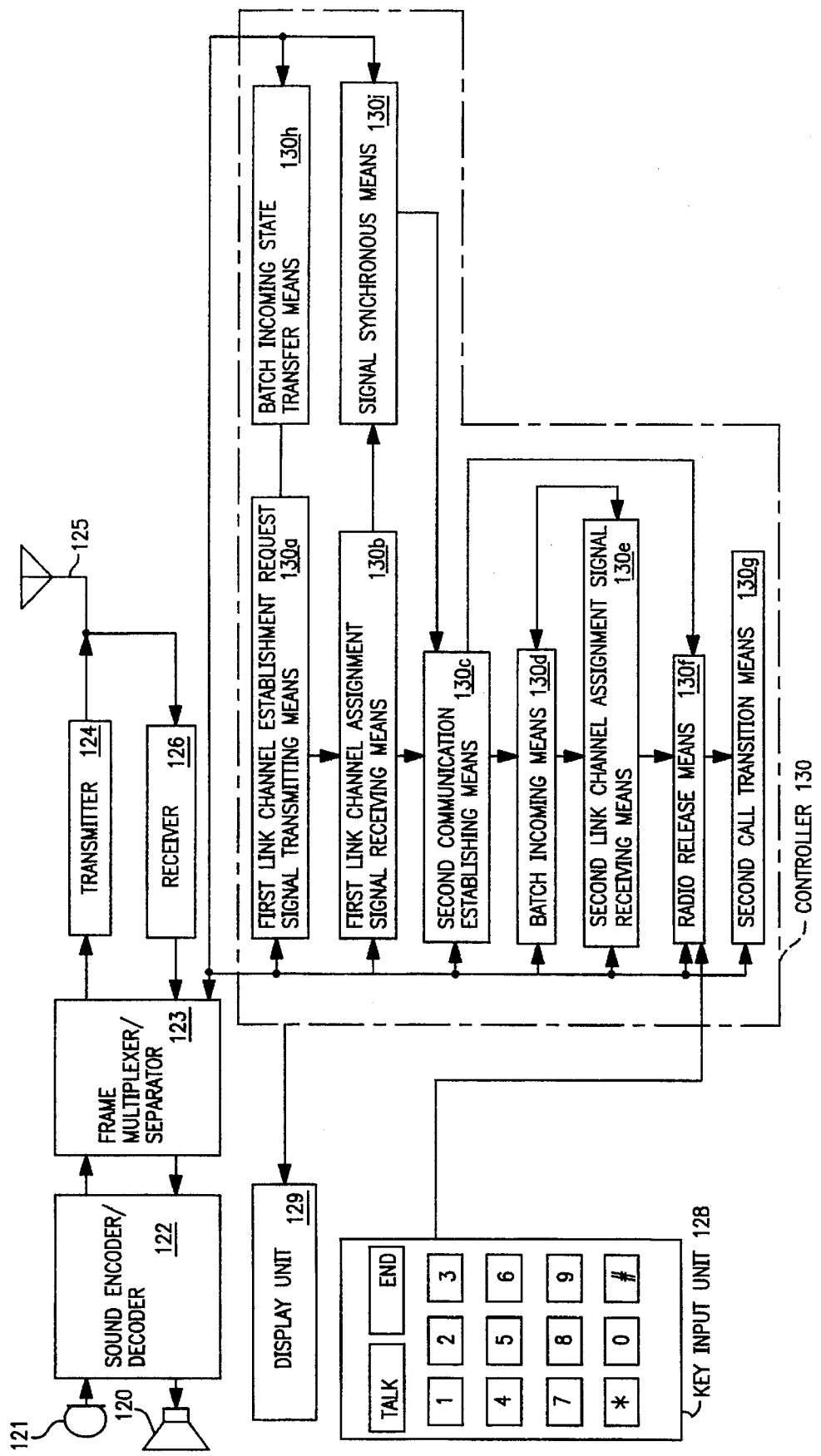
FIG. 9 is a functional block diagram of a sub unit of the radiotelephone system in the second embodiment of the invention.

FIG. 9 is a functional block diagram of the sub unit 103, sub unit 104 and sub unit 105, in which reference numeral 120 is a sound output unit for issuing a sound signal, 121 is a sound input unit for receiving sound, 122 is a sound encoder/decoder for coding the sound signal and decoding the coded sound signal, 123 is a frame multiplexer/separator, 124 is a transmitter, 125 is an antenna, 126 is a receiver, 128 is an input unit, 129 is a display unit, 130 is a controller, 130a is a first link channel establishment request signal transmitting means, 130b is a first link channel assignment signal receiving means, 130c is second communication establishing means, 130d is batch incoming means, 130e is second link channel assignment signal receiving means, 130f is radio release means, and 130g is call transition means, which are same as in embodiment 1 and are hence not explained herein.

Reference numeral 130h is batch incoming state transfer means for instructing the information specified in the signal to the frame multiplexer/separator 123 when the frame multiplexer/separator 123 issues a batch incoming state notifying signal, and intercepting the signal from the information channel to set in batch incoming state, and 130i is signal synchronizing means for synchronizing with the signal sent from the main unit 101 by using the synchronism assisting signal sent from the receiver 126 through the frame multiplexer/separator 123 after instructing the information channel to the frame multiplexer/separator 123 by the batch incoming state transfer means 130h.

In thus constituted radiotelephone system, the operation is described below.

Figure 10:
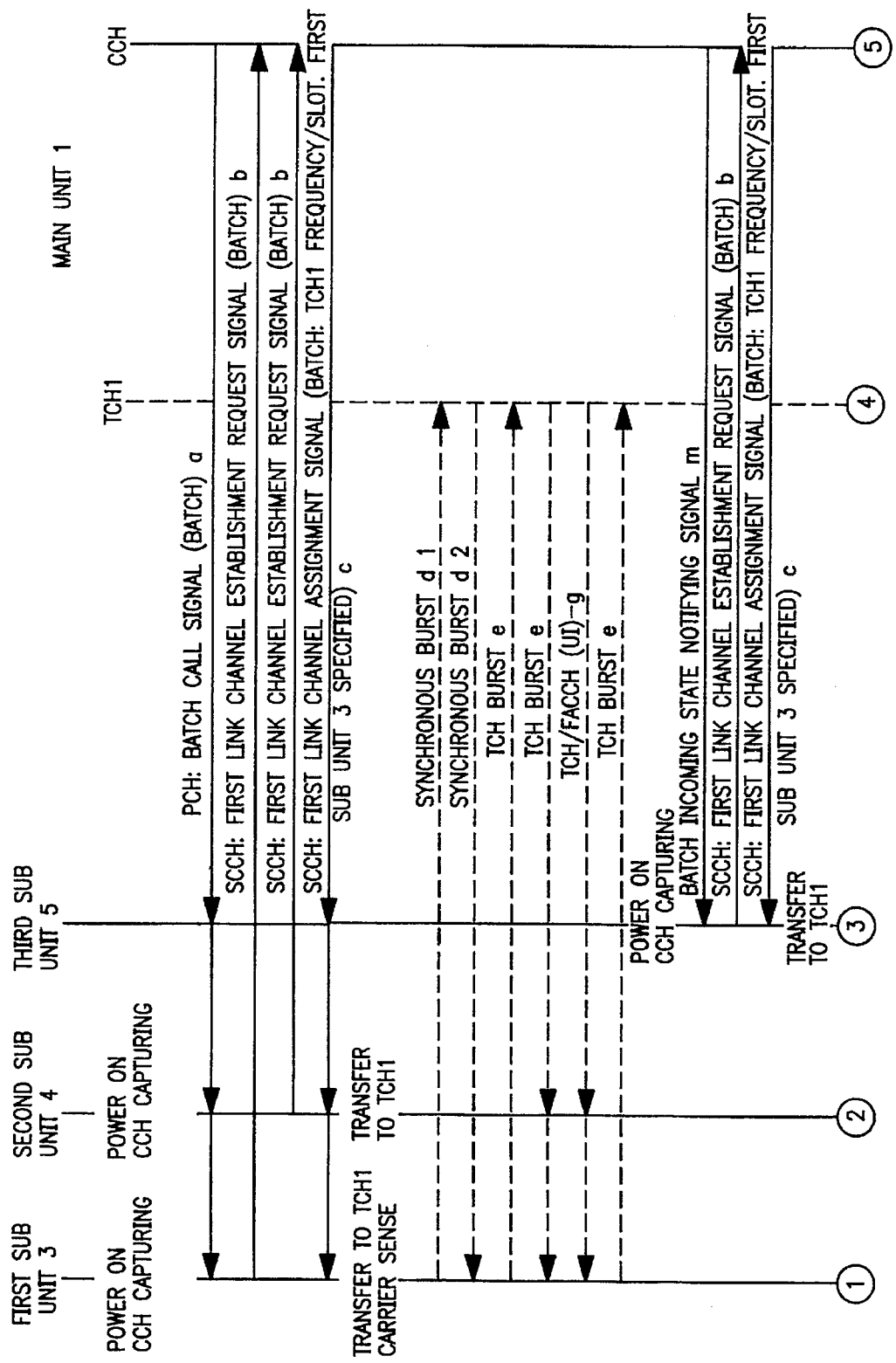
FIG. 10 is a sequence chart of the radiotelephone system in the second embodiment of the invention.
Figure 11:
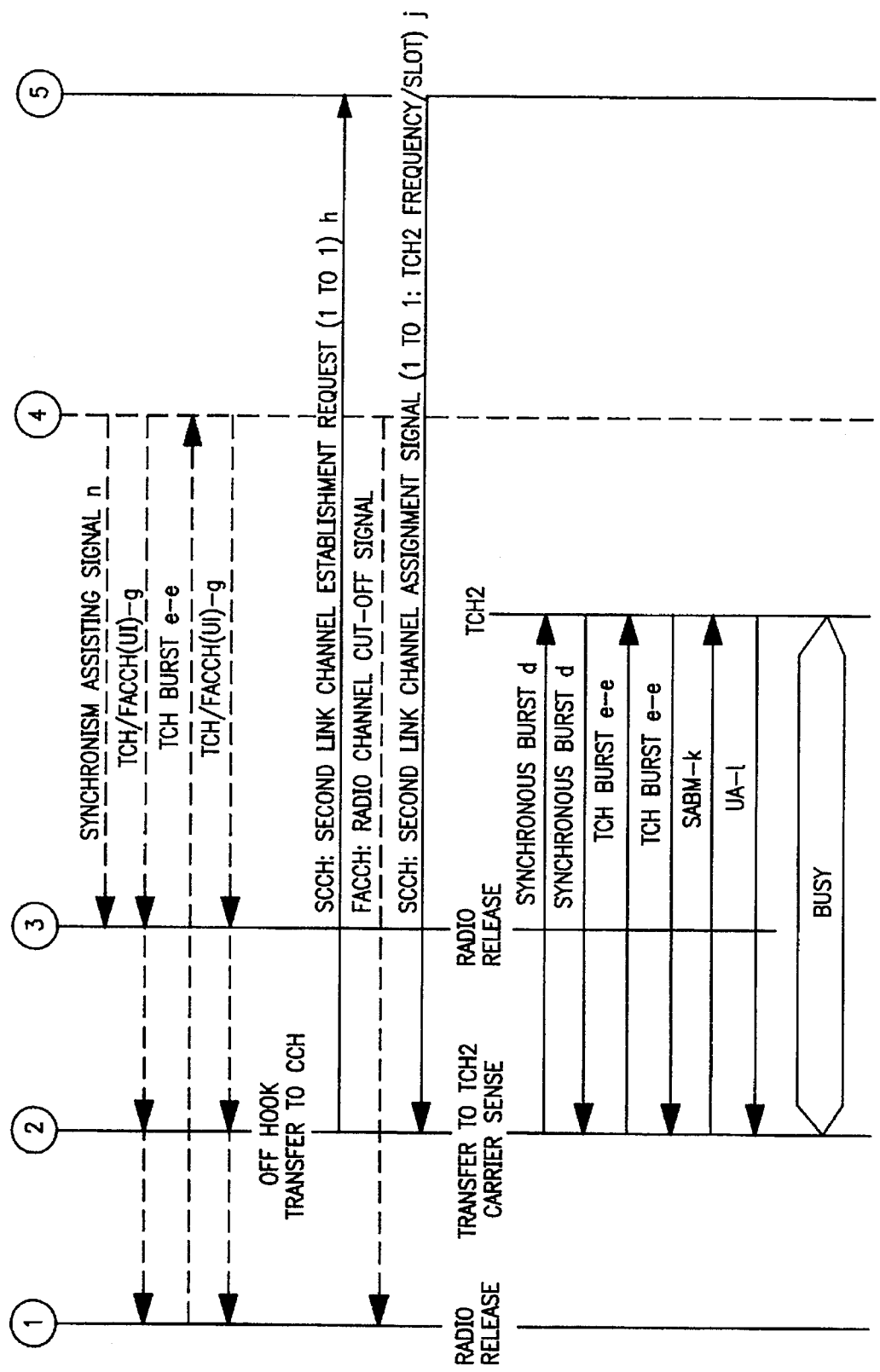
FIG. 11 is a sequence chart of the radiotelephone system in the second embodiment of the invention.
Figure 12:
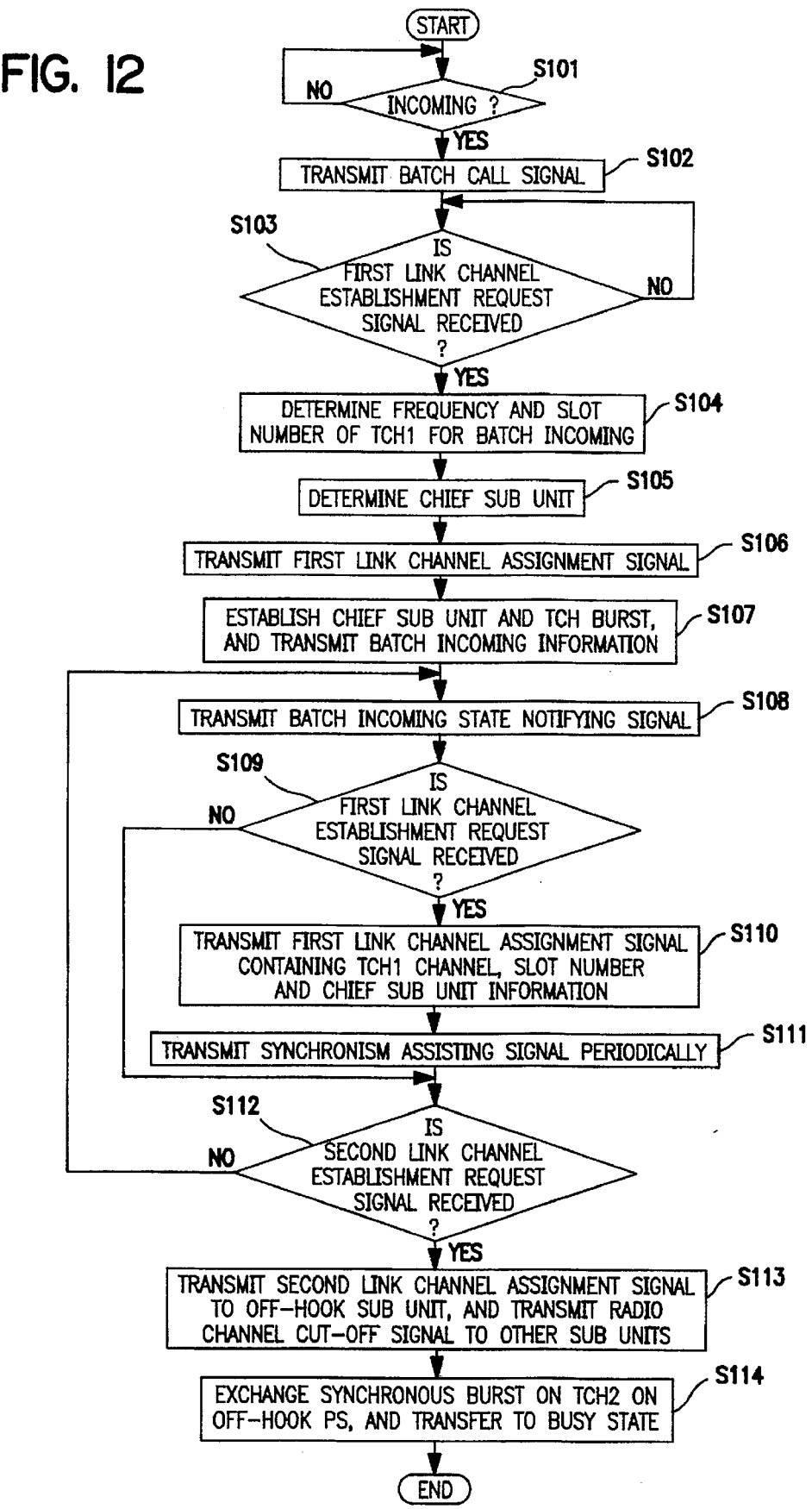
FIG. 12 is a flow chart of the main unit of the radiotelephone system in the second embodiment of the invention.
Figure 13:
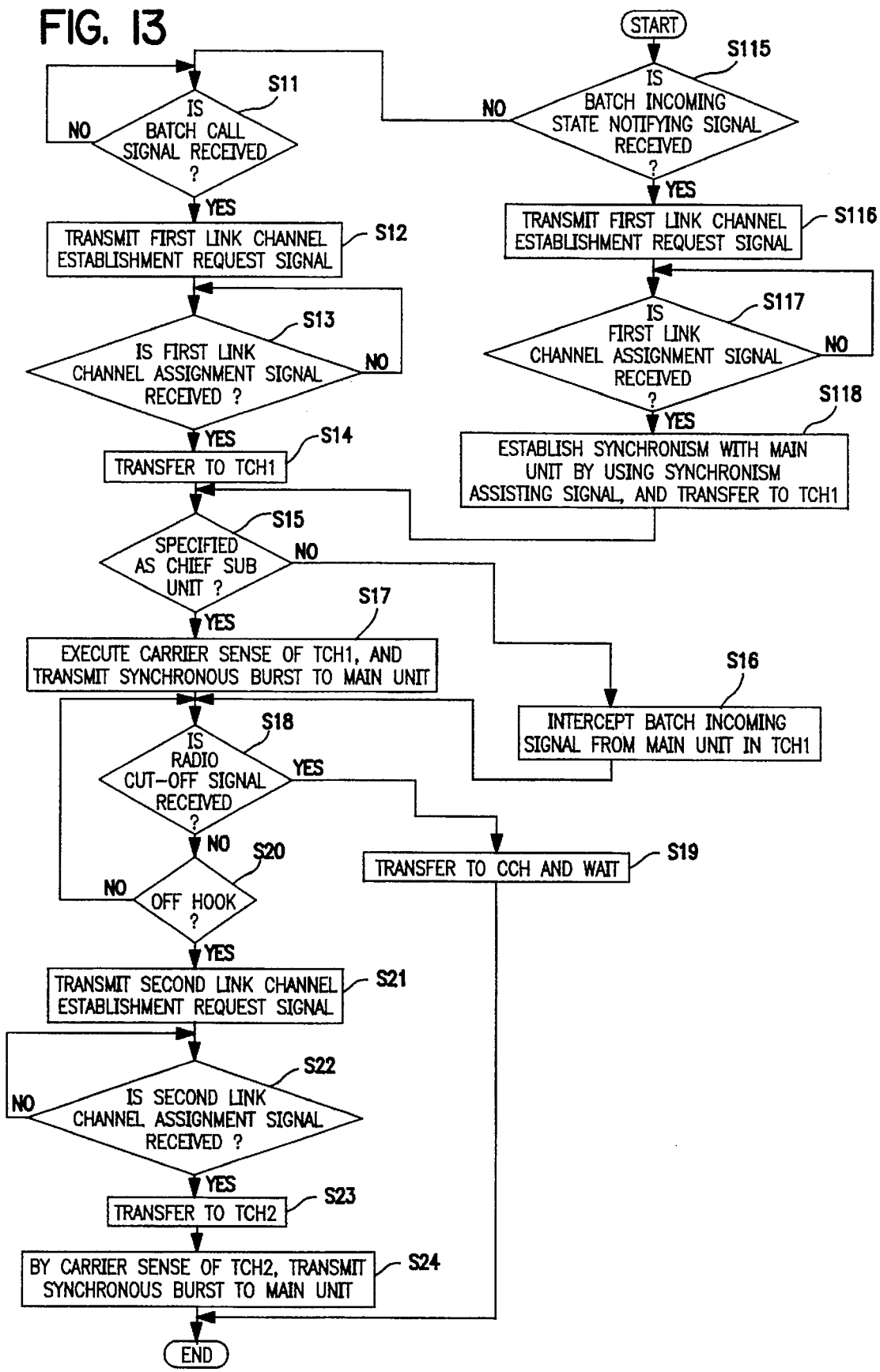
FIG. 13 is a flow chart of the sub unit of the radiotelephone system in the second embodiment of the invention.

FIG. 10 and FIG. 11 are sequence charts of the radiotelephone system in the second embodiment of the invention. FIG. 12 is a flow chat of the main unit of the radiotelephone system in the second embodiment of the invention, and FIG. 13 is a flow chart of the sub unit of the radiotelephone system in the second embodiment of the invention. In FIG. 10 and FIG. 11, the CCH is a control channel, and TCH, TCH1, TCH2 are information channels for sound communications, etc., SCCH is a channel for transmitting information necessary for call connection, FACCH is a control channel accompanying the TCH, SABM is a synchronous setting mode signal, and UA is a validation signal not specified in sub unit. Moreover, a is a batch call signal sent from the main unit 101, b is a first link channel establishment request signal sent from the sub unit 103, sub unit 104 and sub unit 105, c is a first link channel assignment signal sent from the main unit 101, d is a signal sent out to synchronize the sub units and the main unit 101 (hereinafter called synchronous burst), e is a TCH burst transmitted for establishing communications of TCH, f is a ringing tone starting signal for issuing a ringing tone in the sub unit 103 and others, g is a ringing tone starting signal, h is a second link channel establishment request signal sent out from the sub unit 103, i is a radio channel cut-off signal sent out from the main unit 101, j is a second link channel assignment signal sent out from the main unit 101, k is the SAMB, l is the UA, m is a batch incoming state notifying signal to notify the other sub units that the batch incoming state has been already established when the power source of the other sub units is turned on or the other sub units move into the radio wave reaching area of the main unit 101, while the batch incoming state is already established between the main unit 101 and one sub unit, and n is a synchronism assisting signal having a long UW to synchronize the sub unit participating on the way into the batch incoming state directly with the TCH burst e or the like transmitted from the main unit 101.

To begin with, the operation of the main unit 101 is described while referring to the flow chart in FIG. 12.

First, the batch call detecting means 119a checks if the incoming detector 7 has detected incoming or not (S101).

If No, the batch call detecting means 119a continues this action until detecting incoming.

If Yes, the batch call detecting means 119a instructs the frame multiplexer/separator 112 to communicate by using the CCH, and sends out a batch call signal a to the frame multiplexer/separator 112. Accordingly, the multiplexed signal containing the batch call signal a is transmitted from the transmitter 113 (S102).

Later, the chief sub unit determining means 119b investigates if the first link channel establishment request signals b from all sub units are issued from the frame multiplexer/separator 112 or not, that is, the receiver 115 has received the first link channel establishment request signals b from all sub units or not (S103).

If No, this control is continued until all are received. At this time, every time an individual signal of the first channel link establishment request signal b is issued, the output from the reception field intensity measuring unit 116 is checked.

If Yes, the information channel is determined on the basis of the specified information of the information channel contained in the largest first channel link establishment request signal as a result of measurement by the reception field intensity measuring unit 116. In this embodiment, supposing that the first channel link establishment request signal b sent from the sub unit 103 is the largest, the specified information of the information channel contained in this signal b is assumed to be TCH1 (S104).

Next, the sub unit 103 transmitting the largest first channel link establishment request signal b as a result of measurement by the reception field intensity measuring unit 116 is determined as the chief sub unit (S105).

Consequently, the first link channel assignment signal transmitting means 119c generates a first link channel assignment signal c composed of the information showing that the signal for batch call is TCH1 and that the chief sub unit is the sub unit 103, and sends it out to the frame multiplexer/separator 112. Hence, this signal is distributed and multiplexed in the CCH by the frame multiplexer/separator 112, and is sent out from the transmitter 113 (S106).

Then, after instructing the frame multiplexer/separator 112 to communicate in the TCH1 specified in the specified information of the information channel, the frame multiplexer/separator 112 is controlled, and the synchronous burst d is exchanged with the sub unit 103, thereby establishing the TCH burst e, while the batch incoming information containing the ringing tone starting signal f for starting the ringing tone of the sub unit 103 and sub unit 104 is issued to the frame multiplexer/separator 112. Thus, the signal multiplexed in the state of the batch incoming information distributed in the TCH1 is transmitted from the transmitter 113 (S107).

The batch incoming notifying means 119g instructs the frame multiplexer/separator 112 to communicate in the CCH, and issues a batch incoming state notifying signal m to the frame multiplexer/separator 112. As a result, the signal multiplexed in the state of the batch incoming state notifying signal m distributed in the CCH is transmitted from the transmitter 113 (S108).

Then the first establishment request signal receiving means 119h investigates if the frame multiplexer/separator has received the first link channel establishment request signal b or not (S109).

If No, jumping to S112, and if Yes, the third communication establishing means 119i issues the first link channel assignment signal c composed of information of the frequency of TCH1 transmitting the batch incoming signal, slot number, chief sub unit and others, to the frame multiplexer/separator 112. Accordingly, the signal multiplexed in the state of the first link channel assignment signal c distributed in the CCH is transmitted from the transmitter 113 (S110). Herein, it is supposed that the sub unit 105 has transmitted the first link channel establishment request signal b.

The synchronism assisting means 119j controls the frame multiplexer/controller 112 in order to assist the sub unit 105 participating on the way into the batch incoming state to synchronize with the signal transmitted in the TCH1 from the main unit 101, and the transmitter 113 periodically transmits the synchronism assisting signal n having a long UW in the TCH1 (S111).

The first call transition means 119f instructs the frame multiplexer/separator 112 to communicate in the CCH, and investigates if the second link channel establishment request signal h is issued from the frame multiplexer/separator 112, that is, if the receiver 115 has received the multiplexed radio signal containing the signal sent from any one of the sub unit 103, sub unit 104 and sub unit 105 (S112).

If No, jumping to S112, and if Yes, the first call transition means 119f specifies the sub unit 103 having transmitted this signal from the received second link channel establishment request signal h, and issues the second link channel assignment signal j containing the information such as information channel for making a call (TCH2, in this embodiment) to the frame multiplexer/separator 112, and this signal is sent out from the transmitter 113, while the frame multiplexer/ separator 112 is controlled so as to transmit the radio channel cut-off signal for releasing the TCH1 by using the CCH to the other sub unit 104 and sub unit 105 (S113).

Then the controller 119 controls the frame multiplexer/ separator 112, and establishes the communication by exchanging the synchronous burst d with the sub unit 103 which has transmitted in the TCH2, thereby setting in busy state (S114).

Referring now to FIG. 13, the operation of the sub unit 103, sub unit 104 and sub unit 105 is described below.

Incidentally, S119 to S132 are same as S11 to S24 in embodiment 1, and are hence not explained herein.

After the process of S132, the batch incoming state transfer means 130h instructs the frame multiplexer/ separator 123 to communicate in the CCH, and investigates if the batch incoming state notifying signal m is issued from the frame multiplexer/separator 123, that is, if the batch incoming state notifying signal m sent from the main unit 101 is received or not (S115).

If No, jumping to S119, the same process as in embodiment 1 is done, and if Yes, the first link channel establishment request signal transmitting means 130b issues a first link channel establishment request signal b to the frame multiplexer/separator 123, thereby controlling to send this signal to the main unit 101 (S116).

The first link channel assignment signal receiving means 130b investigates if the first link channel assignment signal c is issued or not, that is, if the receiver 126 has received this signal or not (S117).

If No, jumping to S117, and if Yes, the signal synchronizing means 130i instructs the frame multiplexer/separator 123 to communicate with the information channel (herein TCH1) specified in the first link channel assignment signal c, and when the synchronism assisting signal n is issued from the frame multiplexer/separator 123, this signal sent from the main unit 101 is received. The signal synchronizing means 130i, using this synchronous signal, establishes the synchronism with the main unit 101, thereby transferring to this TCH1 (S118).

Then, jumping to S123, the same process as in embodiment 1 is carried out.

Thus, according to the embodiment, while the main unit 101 is in batch incoming state, the batch incoming state notifying signal m is transmitted in the CCH, and when the sub unit is in power ON state or moving into the signal reaching area of the main unit 101, the batch incoming state notifying signal m is received in the CCH, thereby transferring the sub unit into the TCH1 to set in batch incoming state, and therefore when the power source of other sub unit is turned on while the main unit 101 and a sub unit are preliminarily in batch incoming state, or when other sub unit is moved into the signal reaching area of the main unit 101, the other sub units may be participated on the way in the batch incoming state. Or, when the main unit 101 is in batch incoming state, by periodically transmitting the synchronism assisting signal n having a long UW periodically in the TCH1, when the sub unit participating on the way into the batch incoming state is transferred to the TCH1, if it is not possible to synchronize directly with the short signal of UW usually transmitted from the main unit 101 in the TCH1, it can be synchronized by using this synchronism assisting signal n.

In this embodiment, when the main unit 1 is in batch incoming state, the synchronism assisting signal n is transmitted periodically, but in the midst of intermediate participation of the sub unit into the batch incoming state, if it can be synchronized directly with the signal of short UW usually transmitted from the main unit 101 in the TCH1, it is not necessary to transmit this synchronism assisting signal n. Or, when the sub unit is on the way to participate in the batch incoming state, the first link channel establishment request signal b is first transmitted, and the frequency of the TCH1 is obtained by the first link channel assignment signal c as its response, but the main unit 101 may transmit the frequency of TCH1, together with the batch incoming state notifying signal m.

Embodiment 3

A radiotelephone system in a third embodiment of the invention is described below while referring to FIGS. 14 and 15.

The embodiment, same as embodiment 1, comprises one main unit 201, and three sub units, sub unit 202, sub unit 203 and sub unit 204.

Figure 14:
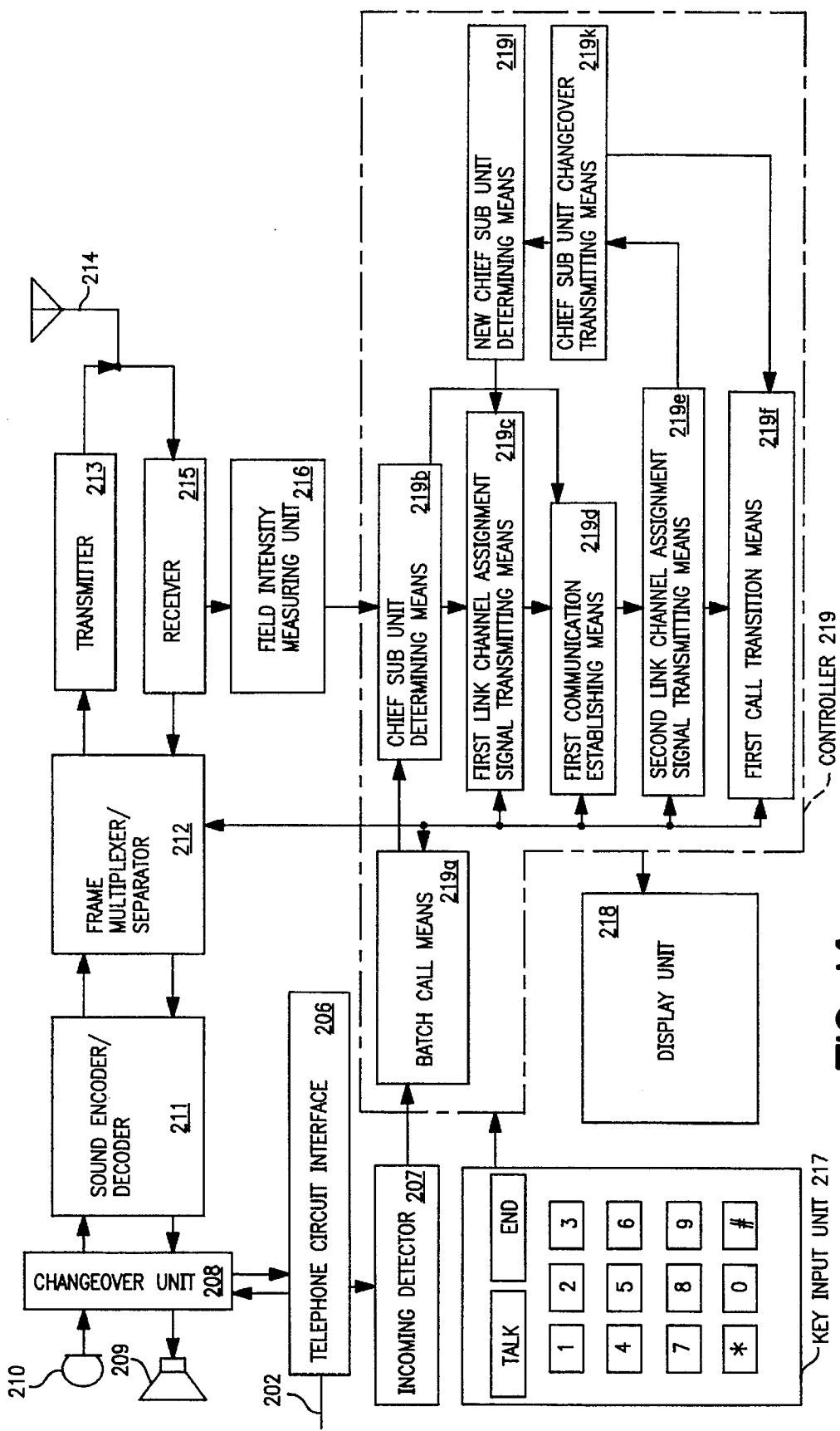
FIG. 14 is a functional block diagram of a main unit of a radiotelephone system in a third embodiment of the invention.

FIG. 14 is a functional block diagram of the main unit 201 of the radiotelephone system in the embodiment, in which reference numeral 206 is a telephone circuit interface, 207 is an incoming detector, 208 is a changeover unit, 209 is a sound input unit, 211 is a sound encoder/decoder, 212 is a frame multiplexer/separator, 213 is a transmitter, 214 is an antenna, 215 is a receiver, 216 is a reception field intensity measuring unit, 217 is a key input unit, 218 is a display unit, 219 is a controller, 219a is batch call means, 219b is chief sub unit determining means, 219c is first link channel assignment signal transmitting means, 219d is first communication establishing means, 219e is second link channel assignment signal transmitting means, and 219f is first call transition means, and they are same as in embodiment 1, and hence their explanations are omitted.

Reference numeral 219k is chief sub unit changeover transmitting means for instructing the frame multiplexer/ separator 212 to communicate in the TCH1 when the value measured in the reception field intensity measuring unit 216 during communication with the chief sub unit becomes smaller than the chief sub unit changeover threshold value, and issuing the chief sub unit changeover signal to the frame multiplexer/separator 212, and 219l is new chief sub unit determining means for instructing the frame multiplexer/ separator 212 to communicate in the CHH after transmission control of the chief sub unit changeover signal by the chief sub unit changeover transmitting means 219k, and checking the measured value of the reception field intensity measuring unit 216 when the first link channel establishment request signal of each sub unit is issued from the frame multiplexer/ separator 212, detecting the largest measured value, determining it as a new chief sub unit, and transferring the process to the first link channel assignment signal transmitting means 219c.

Figure 15:
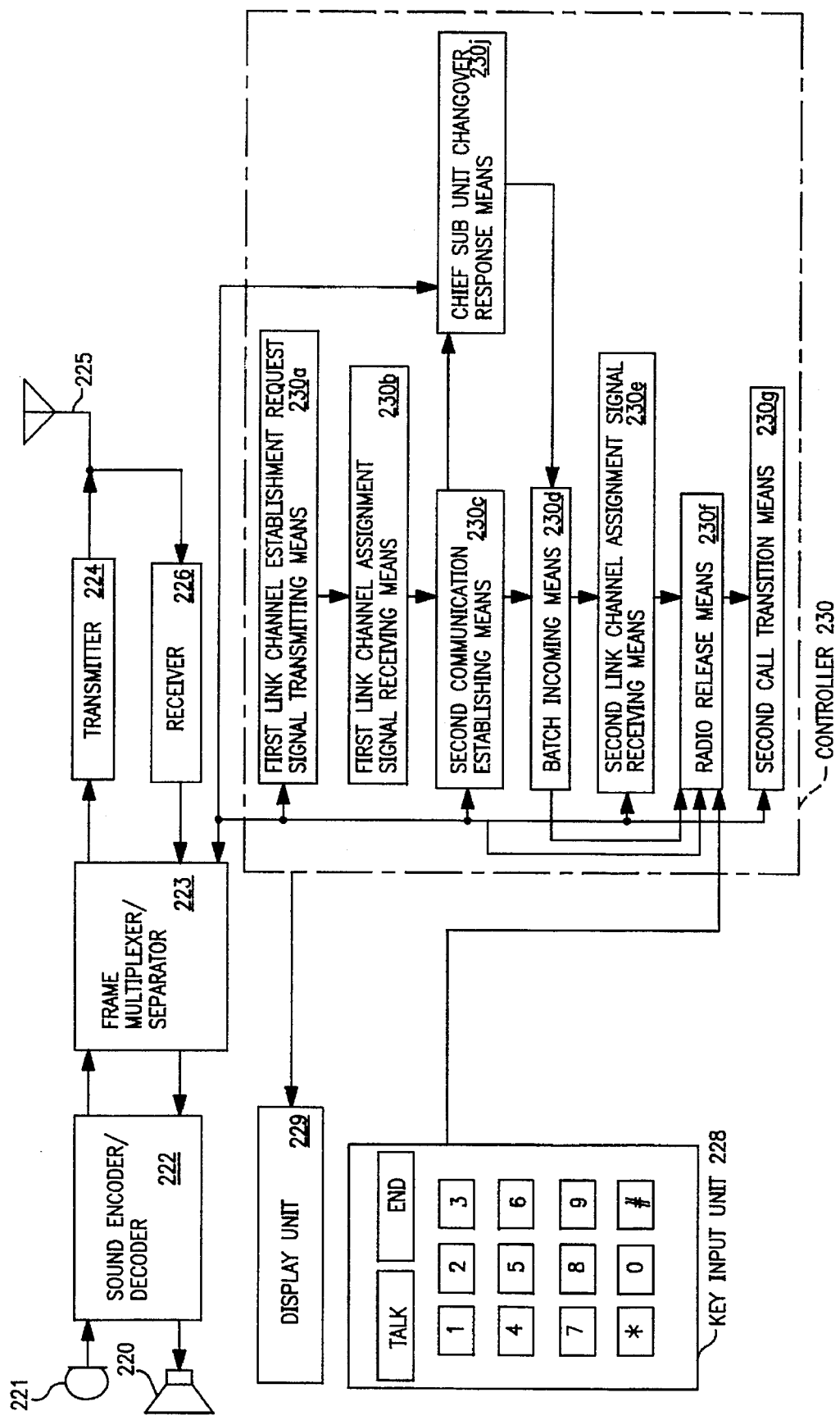
FIG. 15 is a functional block diagram of a sub unit of the radiotelephone system in the third embodiment of the invention.

FIG. 15 is a functional block diagram of the sub unit 203, sub unit 204 and sub unit 205, in which reference numeral 220 is a sound output unit for issuing a sound signal, 221 is a sound input unit for receiving sound, 222 is a sound encoder/decoder for coding the sound signal and decoding the coded sound signal, 223 is a frame multiplexer/separator, 224 is a transmitter, 225 is an antenna, 226 is a receiver, 228 is an input unit, 229 is a display unit, 230 is a controller, 230a is a first link channel establishment request signal transmitting means, 230b is a first link channel assignment signal receiving means, 230c is second communication establishing means, 230d is batch incoming means, 230e is second link channel assignment signal receiving means, 230f is radio release means, and 230g is call transition means, which are same as in embodiment 1 and are hence not explained herein.

Reference numeral 230j is chief sub unit changeover response means for instructing the frame multiplexer/ separator 223 to communicate by using the CCH when receiving the chief sub unit changeover signal from the frame multiplexer/separator 223, transmitting the first link channel establishment request signal b, and transferring the process to the first link channel assignment signal reception means 230e.

In thus constituted radiotelephone system in the third embodiment of the invention, the operation is described below by reference to FIGS. 16 through 19.

Figure 16:
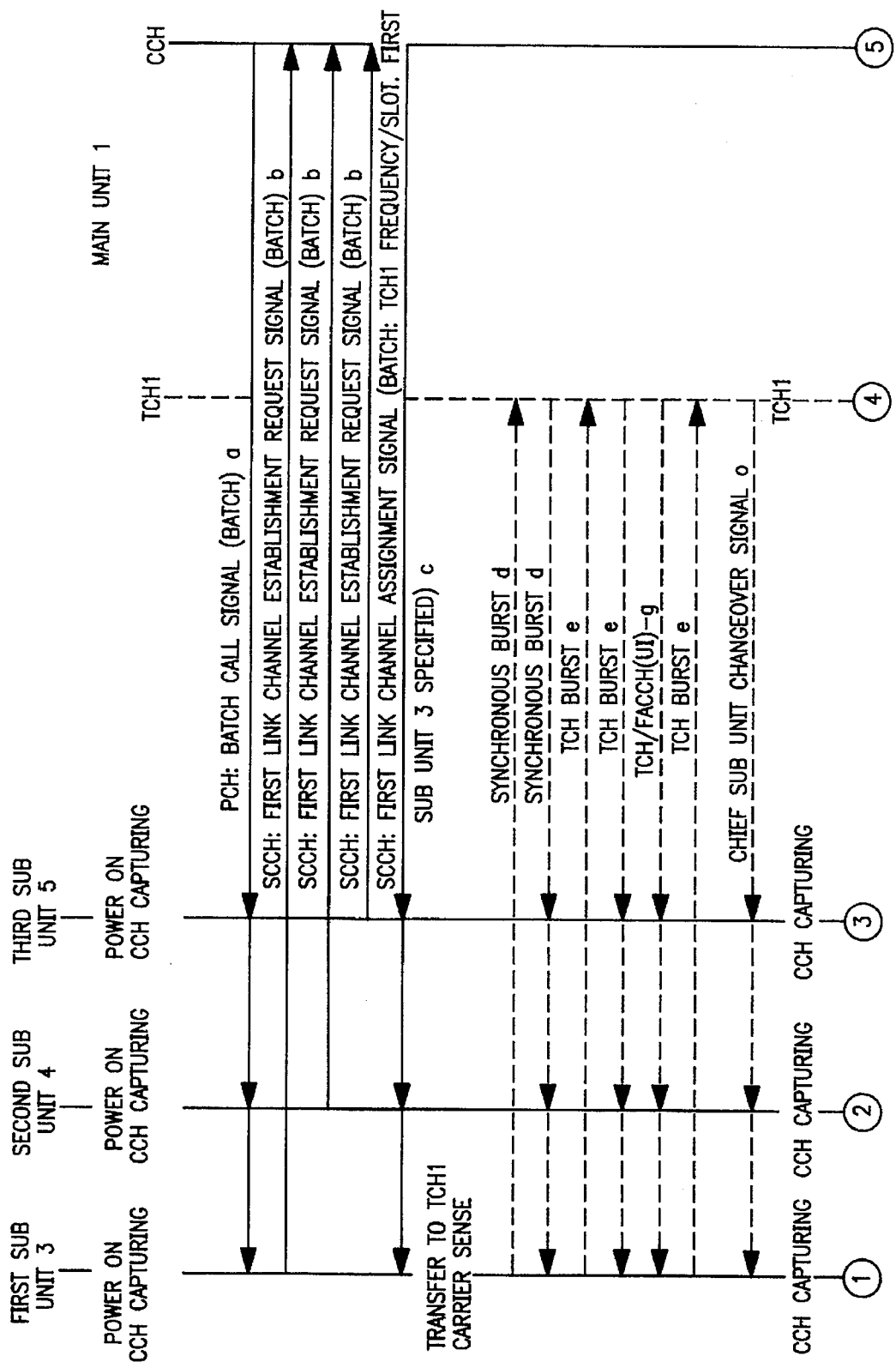
FIG. 16 is a sequence chart of the radiotelephone system in the third embodiment of the invention.
Figure 17:
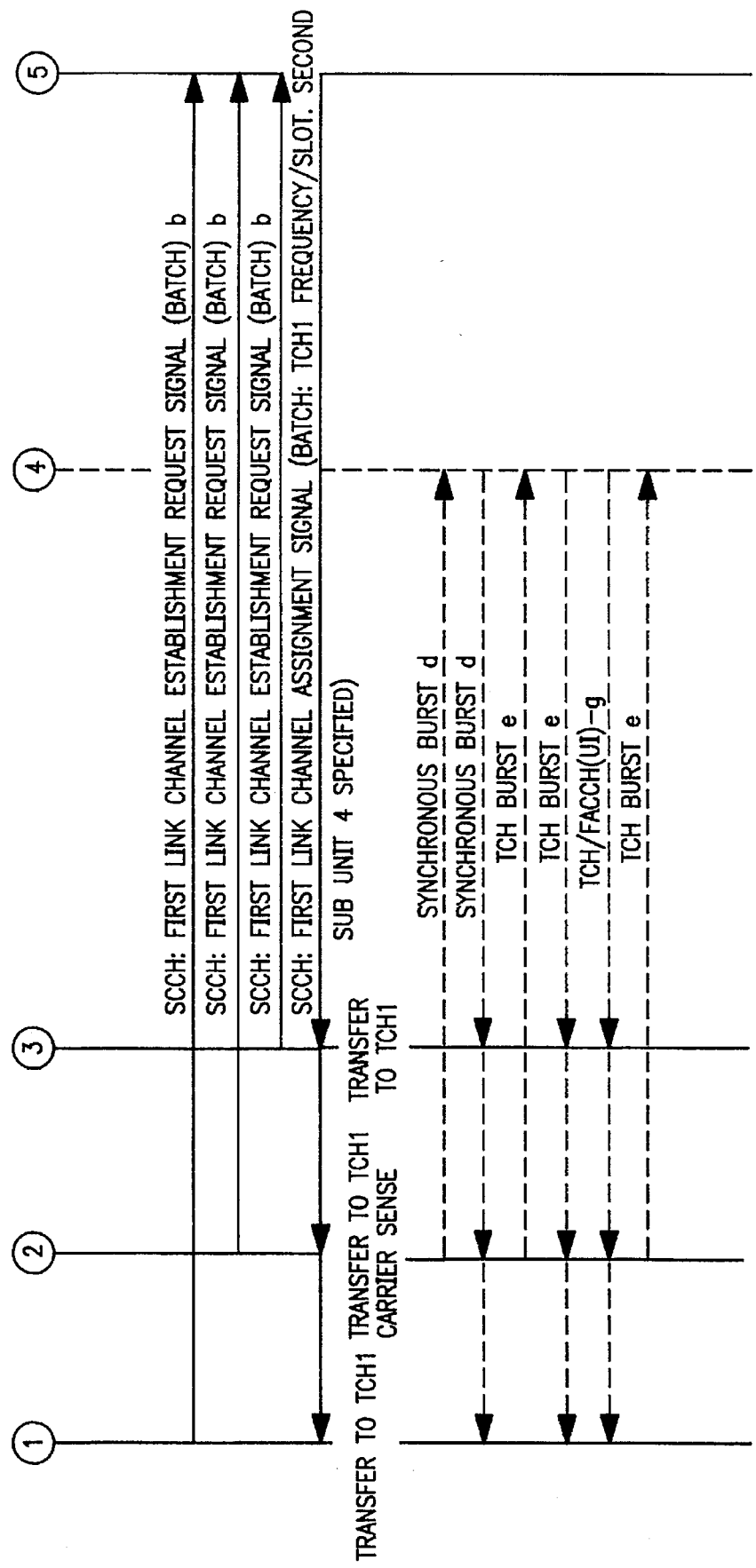
FIG. 17 is a sequence chart of the radiotelephone system in the third embodiment of the invention.
Figure 18:
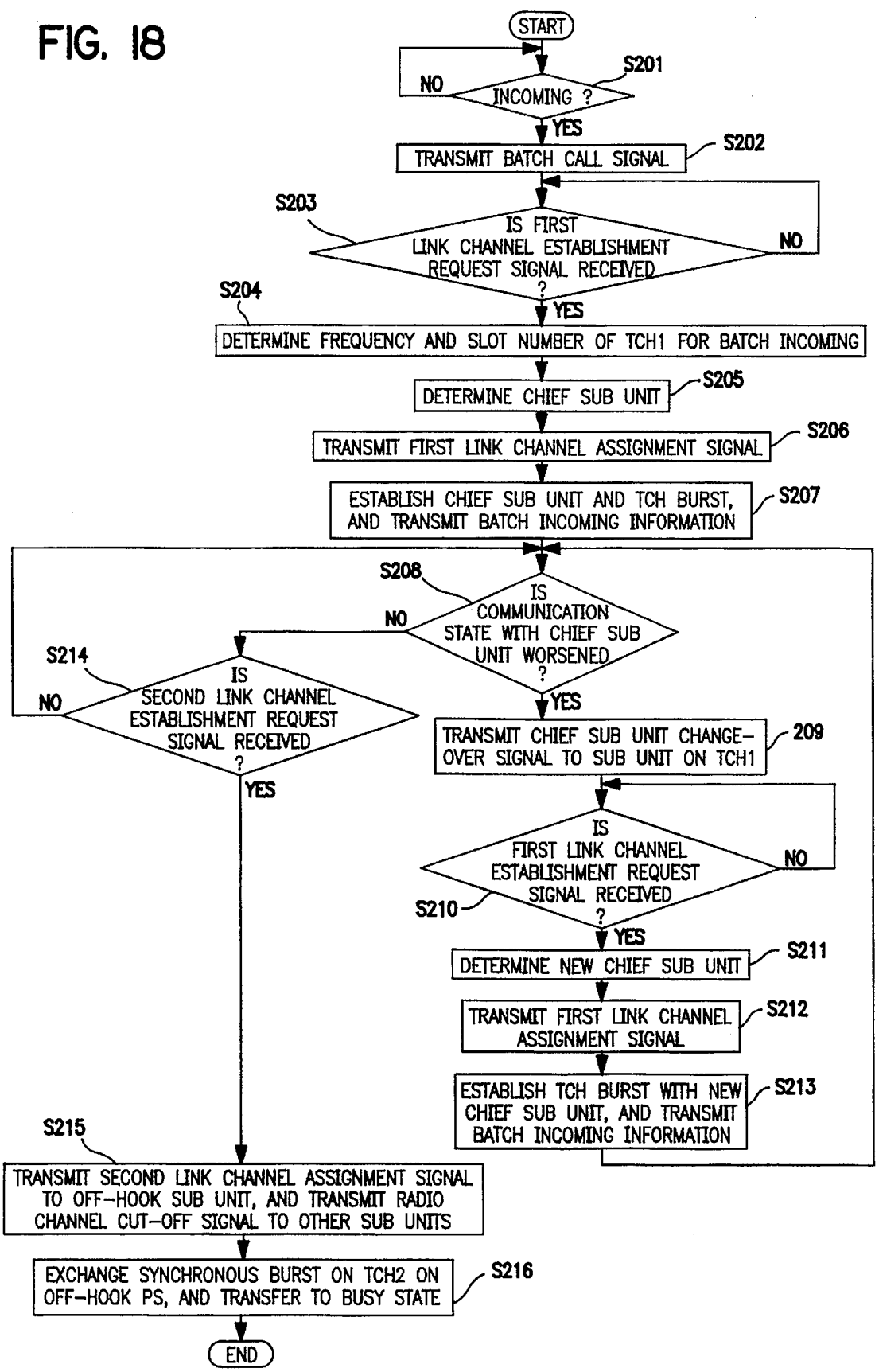
FIG. 18 is a flow chart of the main unit of the radiotelephone system in the third embodiment of the invention.
Figure 19A:
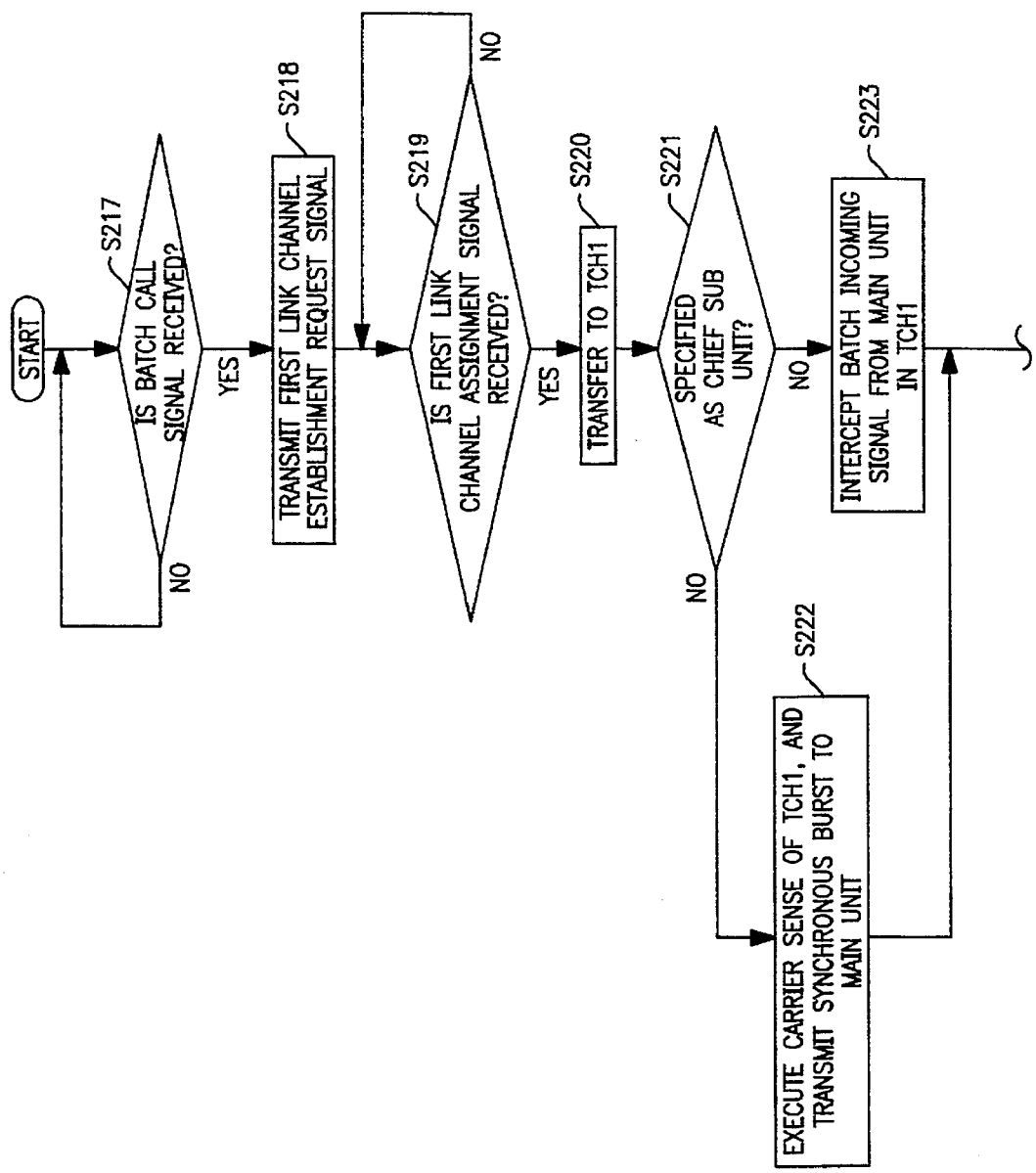
FIG. 19 is a flow chart of the sub unit of the radiotelephone system in the third embodiment of the invention.
Figure 19B:
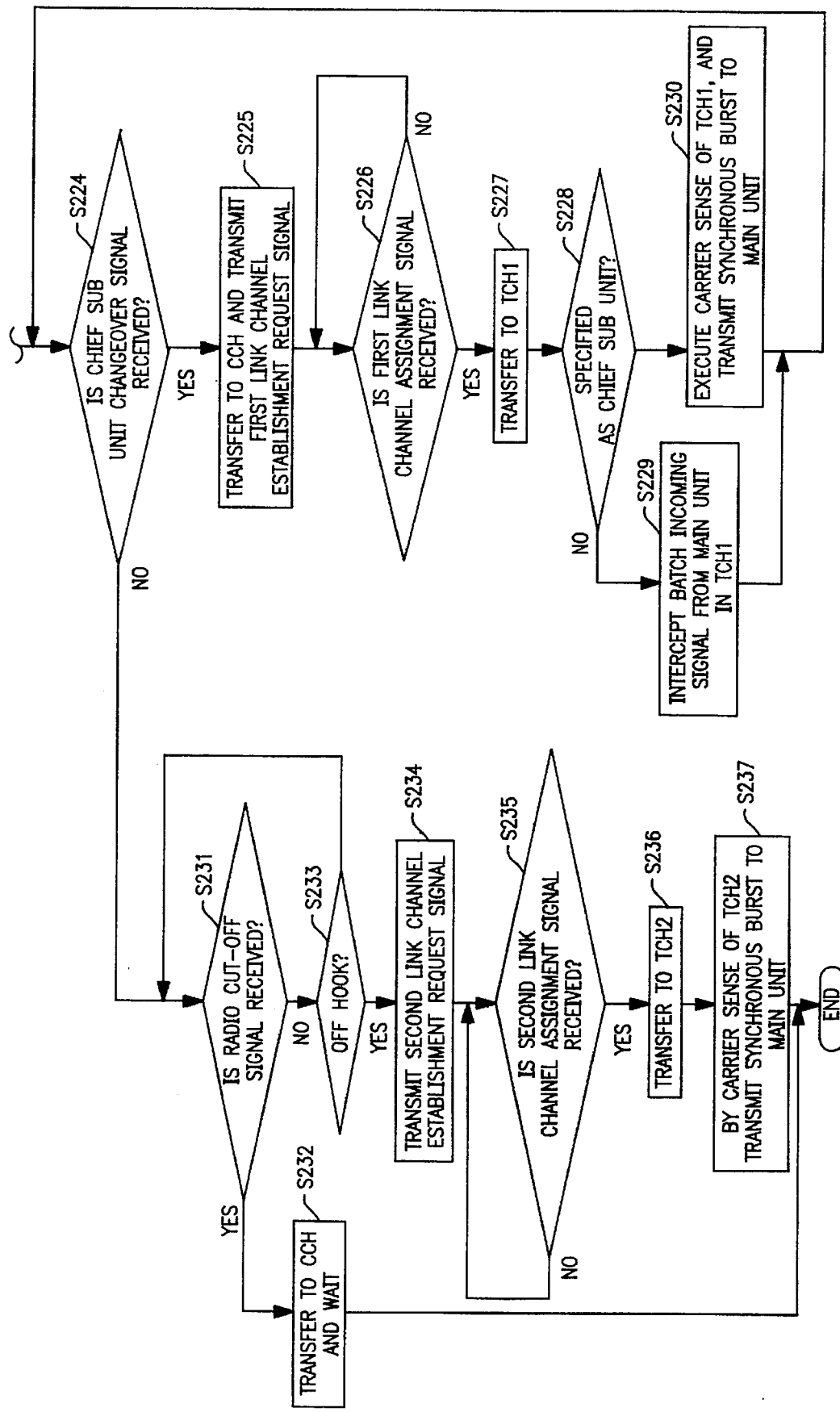

FIG. 16 and FIG. 17 are sequence flow charts of the radiotelephone system in the third embodiment of the invention, FIG. 18 is a flow chart of the main unit of the radiotelephone system in the third embodiment of the invention, and FIG. 19 is a flow chart of the sub unit of the radiotelephone system in the third embodiment of the invention.

In FIGS. 16 and 17, the CCH is a control channel, and TCH, TCH1, TCH2 are information channels for sound communications, etc. SCCH is a channel for transmitting information necessary for call connection, FACCH is a control channel accompanying the TCH, SABM is a synchronous setting mode signal, and UA is a validation signal not specified in sub unit. Moreover, a is a batch call signal sent from the main unit 201, b is a first link channel establishment request signal sent from the sub unit 203, sub unit 204 and sub unit 205, c is a first link channel assignment signal sent from the main unit 201, d is a signal sent out to synchronize the sub units and the main unit 201 (hereinafter called synchronous burst), e is a TCH burst transmitted for establishing Communications of TCH, f is a ringing tone starting signal for issuing a ringing tone in the sub unit 203 and others, g is a ringing tone starting signal, h is a second link channel establishment request signal sent out from the sub unit 203, i is a radio channel cut-off signal sent out from the main unit 201, j is a second link channel assignment signal sent out from the main unit 201, k is the SAMB, l is the UA, and o is a chief sub unit changeover signal for notifying each sub unit that the chief sub unit is to be changed when the reception field intensity in the main unit 201 becomes smaller than the chief sub unit threshold value, such as the TCH burst e sent from the chief sub unit due to move of the present chief sub unit or the like.

Referring first to FIG. 18, the operation of the main unit 201 is explained. Same as in S1 to S7 in embodiment 1, the batch incoming state is established (S201 to S207). Herein, it is supposed that the batch incoming state is established with the sub unit 203 as the chief sub unit.

Next, measuring the reception field intensity of the signal transmitted from the sub unit 203 as the chief sub unit by the reception field intensity measuring unit 216, the new chief sub unit determining means 219l investigates if the measured reception field intensity is smaller than the chief sub unit changeover threshold or not (S208).

If No, the control is transferred to the first call transition means 219f, and the processing same as in S8 to S10 in embodiment 1 is done to start service with the sub unit (S214 to S216).

If Yes, the new chief sub unit changeover transmitting means 219k instructs the frame multiplexer/separator 212 to communicate in the TCH1, and the chief sub unit changeover signal o is sent out to the frame multiplexer/ separator 212, and this signal is transmitted to the sub unit (S209).

The new chief sub unit determining means 219l instructs the frame multiplexer/separator 212 to communicate by using the CCH. At this time, it is checked if the first link channel establishment request signal b from all sub units have been issued from the frame multiplexer/separator 212 (S210).

If No, jumping to S210, and if Yes, depending on the result of measurement of reception field intensity of the first link channel establishment request signals b of the sub units by the reception field intensity measuring unit 216, the sub unit having the largest value is determined as a new chief sub unit (S211). Herein, it is supposed that the sub unit 204 is determined as the new, chief sub unit.

Next, the new chief sub unit determining means 219l issues a first link channel assignment signal c composed of the chief sub unit information telling that the sub unit 204 is the chief sub unit and others to the frame multiplexer/ separator 212, and this signal is transmitted from the transmitter 213 (S212).

Consequently, controlling the frame multiplexer/separator 212, the synchronous burst d is exchanged with the sub unit 204 to establish the TCH burst e, and the batch incoming information composed of TCH/FACCH (UI) g and others is issued to the frame multiplexer/separator 212, so that the batch incoming state is established with the sub unit 204 as the chief sub unit, and jumping to S208 the same processing is repeated (S213).

The operation of the sub units is described below by reference to FIG. 19.

Same as in steps S11 to S17 in embodiment 1, the batch incoming state is established (S217 to S223). Herein, the sub unit 203 is the chief sub unit, and the sub unit 204 and sub unit 205 are supposed to have established the batch incoming state in the TCH1.

The chief sub unit changeover response means 230j instructs the frame multiplexer/separator 223 to communicate in the TCH1, and investigates if the chief sub unit changeover signal o is received from the frame multiplexer/ separator 223 or not (S224).

If No, the control is transferred to the batch incoming means 230d, and the same processing as in S18 to S24 in embodiment 1 is done (S231 to S237), and the service is started.

If Yes, the chief sub unit changeover response means 230j controls the transmitter 213 of the first sub unit 203 or the like to transmit the first link channel establishment request signal b (S225).

Afterwards, instructing the chief sub unit changeover response means 230j to communicate in the CCH, it is investigated if the first link channel assignment signal c is issued from the frame multiplexer/separator 223 (S226).

If No, jumping to S226, and if Yes, it is instructed to communicate in the information channel specified in the first link channel assignment signal c, or (in this embodiment) TCH1 (S227).

By the chief sub unit information in the first link channel assignment signal c, each sub unit investigates if it is itself specified as the chief sub unit or not (S228). Herein, the sub unit 204 is supposed to be specified as a new chief sub unit.

The sub unit 203 and sub unit 205 of No control the frame multiplexer/separator 223, and intercept the batch incoming information in the TCH1 (S229), and jump to S224.

The sub unit 204 of Yes controls the frame multiplexer/ separator 223, and senses the carrier in the TCH1, and transmits a synchronous burst d in the TCH1, and establishes communication with the main unit 201, and jumps to S224 to repeat the same processing (S230).

Thus, according to the embodiment, if the signal from the present chief sub unit deteriorates while the main unit 201 is in batch incoming state, the chief sub unit changeover signal o is transmitted in the TCH1, and when the sub unit 203, sub unit 204 and sub unit 205 receive this chief sub unit changeover signal in the TCH1 in the batch incoming state, the sub unit 203, sub unit 204 and sub unit 205 transmit the first link channel establishment request signal b in the CCH as the response thereto, and the main unit 201 determines a new chief sub unit by selecting the one of the largest reception field intensity in the main unit 201 among the first link channel establishment request signals b transmitted in the CCH frame the sub units, and therefore if the communication state with the main unit 201 is worsened due to move of the present chief sub unit, the chief sub unit is changed to the other sub unit best in the communication state, so that the TCH1 may be held securely.

In the present embodiment, worsening of the communication state between the present chief unit and the master unit 201 is judged by the magnitude of the reception field intensity in the main unit 201 of the signal transmitted from the chief sub unit to the main unit, but, instead, by transmitting the magnitude of the reception field intensity in the chief sub unit of the signal transmitted from the main unit 201 to the chief sub unit to the main unit 201, it may be judged by the magnitude of this value. Or, instead of determining a new chief sub unit by selecting the one of the largest reception field intensity in the main unit 201 of the first link channel establishment request signals b transmitted from the sub units to the main unit 201, similarly, by transmitting the magnitude of the reception field intensity in each sub unit of the signals transmitted from the main unit to the sub units to the main unit 201, it may be judged by the magnitude of the value.

Embodiment 4

A radiotelephone system in a fourth embodiment of the invention is described below while referring to FIG. 21.

The embodiment comprises, as shown in FIG. 20, a main unit 301 and a sub unit 303 and a sub unit 304 both having a batch incoming function, and a sub unit 350 without batch incoming function. The sub unit 303 and sub unit 304 are constituted same as the sub unit 3, sub unit 4 and sub unit 5 in embodiment 1, while the sub unit 350 does not possess the constitution corresponding to the first link channel establishment request signal transmitting means 30a, first link channel assignment signal receiving means 30b, second communication establishing means 30c, batch incoming means 30d, second link channel assignment signal receiving means 30d, radio release means 30e and call transition means 30f constituted for batch incoming in the sub unit 3, sub unit 4 and sub unit 5 in embodiment 1.

Figure 21:
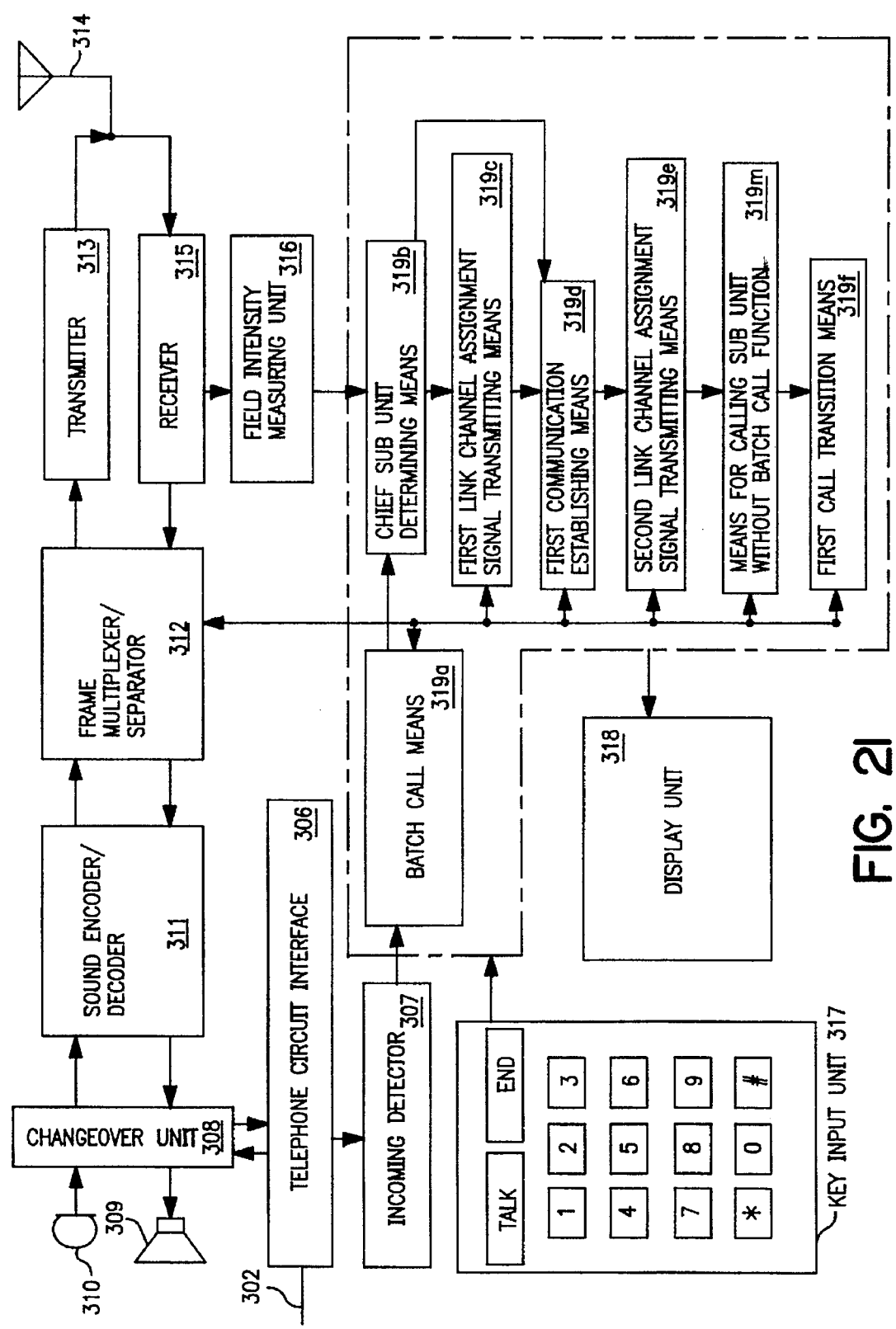
FIG. 21 is a functional block diagram of a main unit of the radiotelephone system in the fourth embodiment of the invention.

FIG. 21 is a functional block diagram of the main unit 301 of the radiotelephone system in the embodiment, in which reference numeral 306 is a telephone circuit interface, 307 is an incoming detector, 308 is a changeover unit, 309 is a sound input unit, 311 is a sound encoder/decoder, 312 is a frame multiplexer/separator, 313 is a transmitter, 314 is an antenna, 315 is a receiver, 316 is a reception field intensity measuring unit, 317 is a key input unit, 318 is a display unit, 319 is a controller, 319a is batch call means, 319b is chief sub unit determining means, 319c is first link channel assignment signal transmitting means, 319d is first communication establishing means, 319e is second link channel assignment signal transmitting means, and 319f is first call transition means, and they are same as in embodiment 1, and hence their explanations are omitted.

Reference numeral 319m is means for calling sub unit without batch call function by controlling the frame multiplexer/separator 312 in the case of batch incoming control by the second link channel assignment signal transmitting means 319e, and distributing a general call signal in the CCH by the transmitter 313.

In thus constituted radiotelephone system in the fourth embodiment of the invention, the operation is described below.

Figure 22:
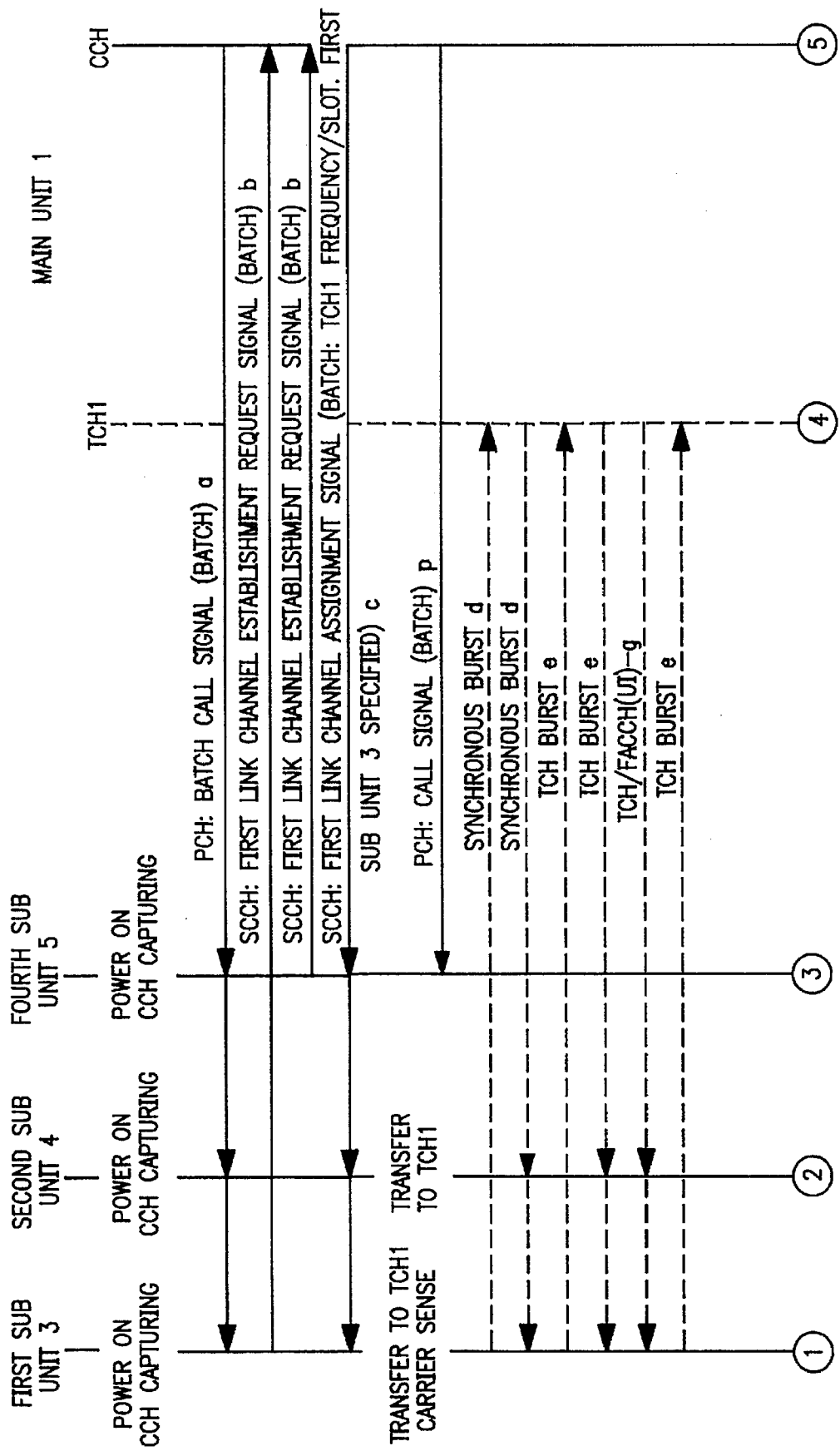
FIG. 22 is a sequence chart of the radiotelephone system in the fourth embodiment of the invention.
Figure 23:
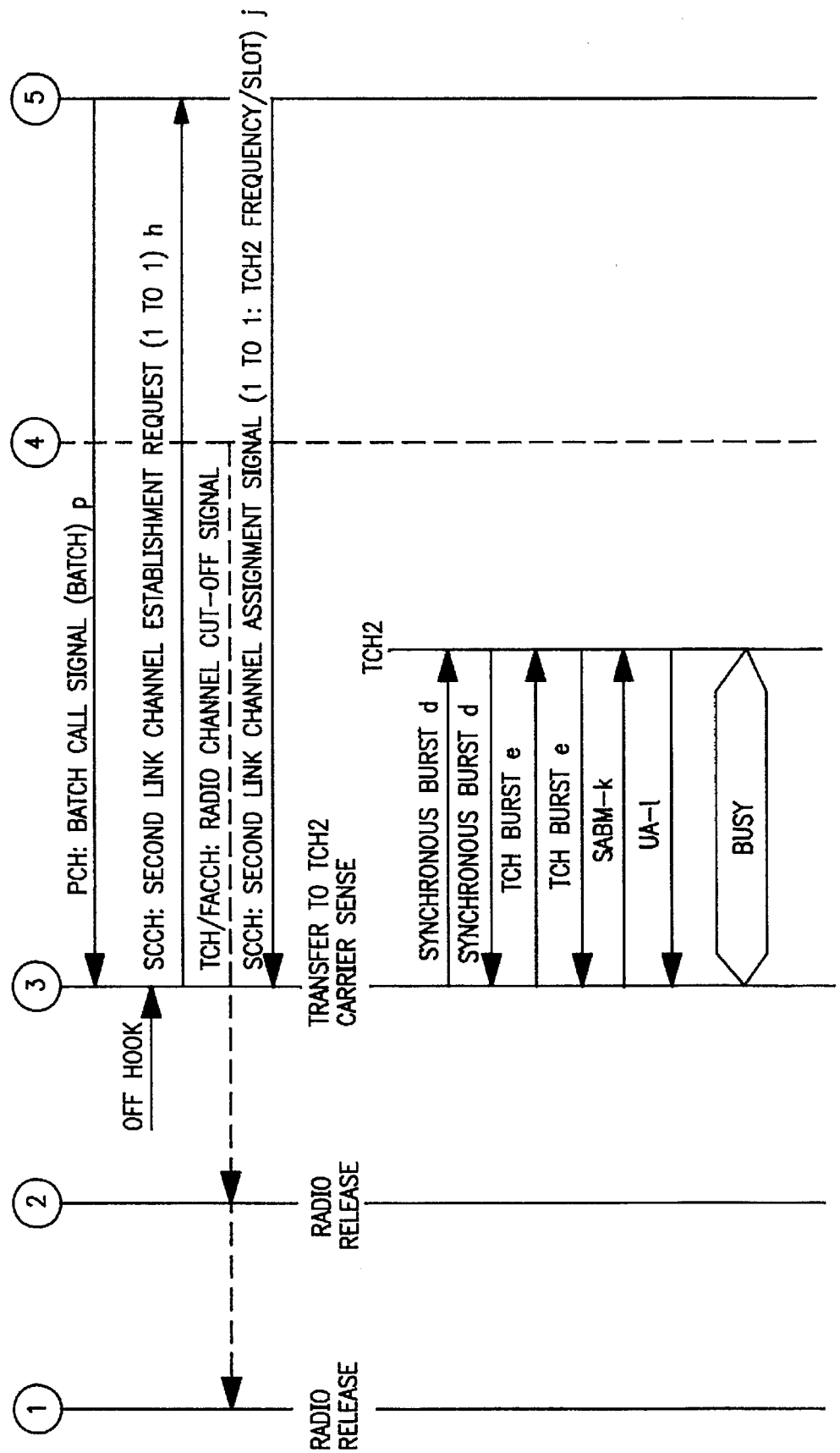
FIG. 23 is a sequence chart of the radiotelephone system in the fourth embodiment of the invention.
Figure 24:
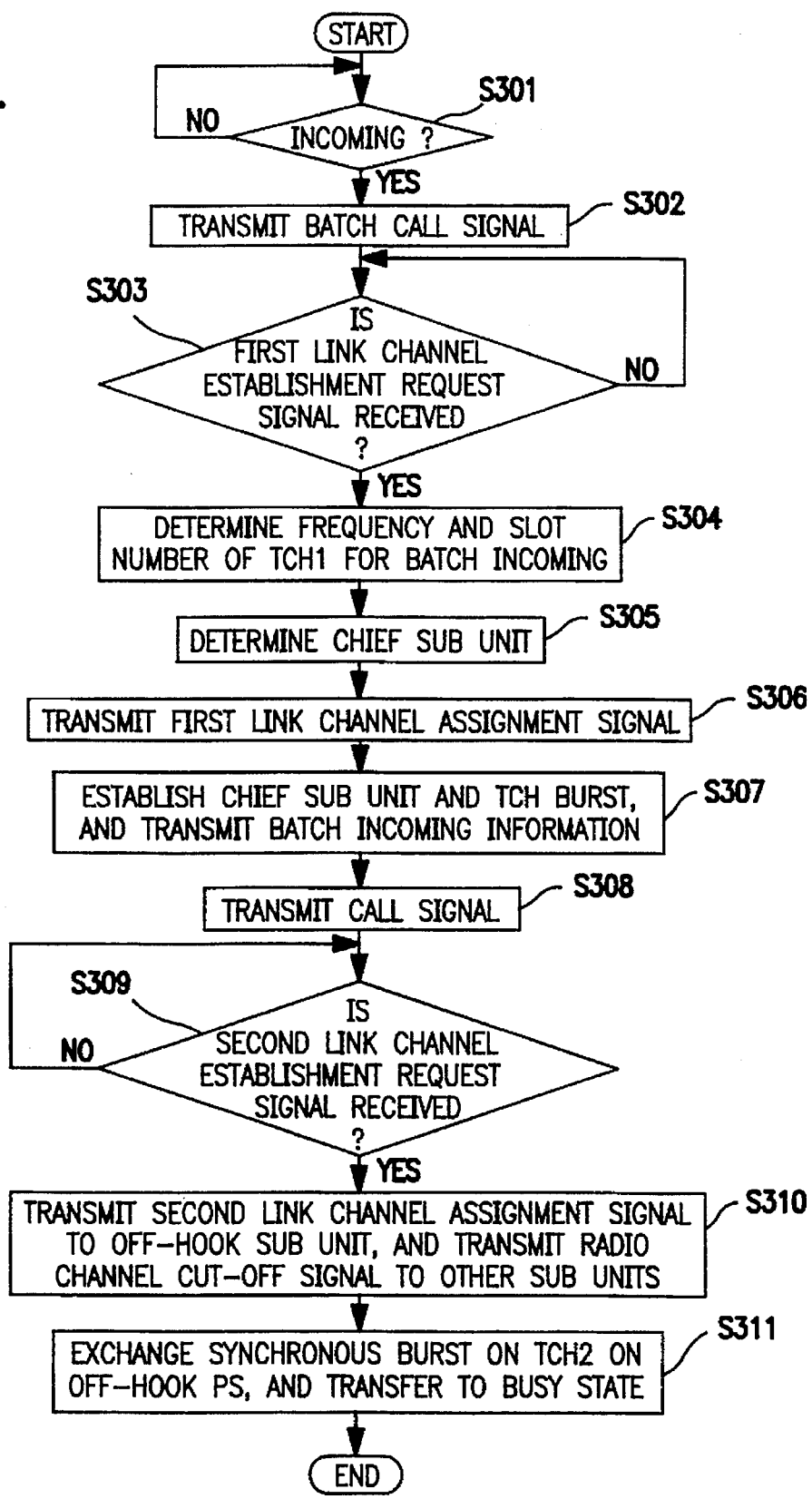
FIG. 24 is a flow chart of the main unit of the radiotelephone system in the fourth embodiment of the invention.

FIG. 22 and FIG. 23 are sequence charts of the radiotelephone system in the fourth embodiment of the invention, and FIG. 24 is a flow chart of the main unit in the radiotelephone system in the fourth embodiment of the invention.

In FIGS. 22 and 23, the CCH is a control channel, and TCH, TCH1, TCH2 are information channels for sound communications, etc., SCCH is a channel for transmitting information necessary for call connection, FACCH is a control channel accompanying the TCH, SABM is a synchronous setting mode signal, and UA is a validation signal not specified in sub unit. Moreover, a is a batch call signal sent from the main unit 301, b is a first link channel establishment request signal sent from the sub unit 303, sub unit 304 and sub unit 305, c is a first link channel assignment signal sent from the main unit 301, d is a signal sent out to synchronize the sub unit 303 and the main unit 301 (hereinafter called synchronous burst), e is a TCH burst transmitted for establishing communications of TCH, f is a ringing tone starting signal for issuing a ringing tone in the sub unit 303 and others, g is a ringing tone starting signal, h is a second link channel establishment request signal sent out from the sub unit 303, i is a radio channel cut-off signal sent out from the main unit 301, j is a second link channel assignment signal sent out from the main unit 301, k is the SAMB, l is the UA, and p is a call signal for reporting the incoming state to the sub unit 350 without batch call function transmitted in the CCH from the main unit 301.

First, same as in S1 to S7 in embodiment 1, batch incoming of the sub unit 303 and sub unit 304 is processed (S301 to S307).

Next, the calling means of sub unit without batch call function 319m controls the frame multiplexer/separator 312, and transmits a signal having the call signal p for notifying the incoming state distributed and multiplexed in the CCH from the transmitter 313 (S308).

This call signal is an ordinary call signal not related with the batch incoming function.

Accordingly, the sub unit 350 without batch incoming function receives this call signal p, and controls general incoming. That is, the incoming is notified by ringing a call signal or the like. Then the notified one manipulates to start service in response to the call signal so as to participate in the batch incoming.

Afterwards, by the same control as in S8 to S10 in embodiment 1, it is advanced to busy state (S309 to S311).

Thus, in this embodiment, the main unit 301 transmits the call signal p in the CCH in the batch incoming state, so that it can be directly applied in the general sub unit without batch incoming function.

In the embodiment, the sub unit without batch incoming function is the sub unit 350 only, but plural units may be without it.

Embodiment 5

A radiotelephone system in a fifth embodiment of the invention is described below while referring to the drawings.

Figure 25:
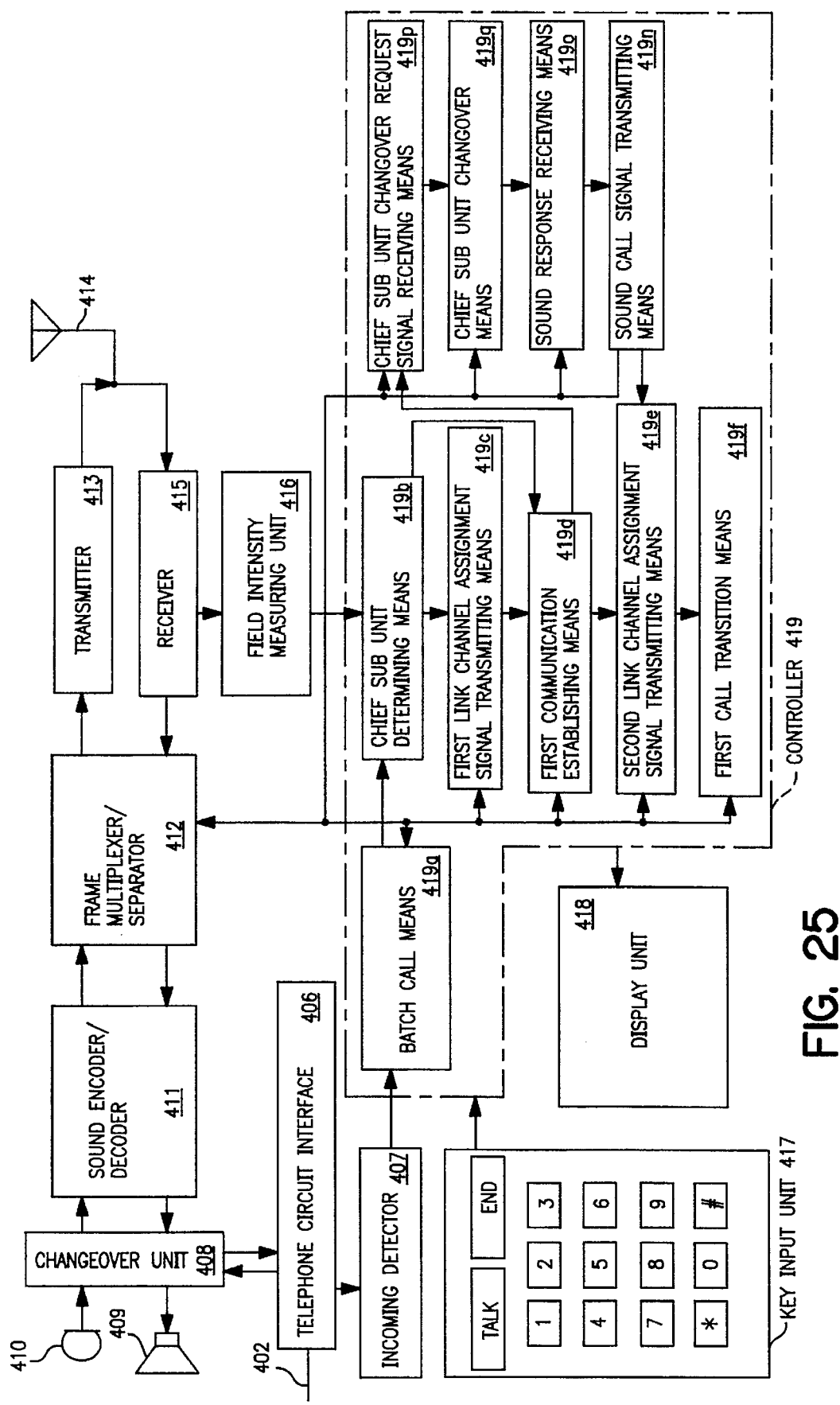
FIG. 25 is a functional block diagram of a main unit of a radiotelephone system in a fifth embodiment of the invention.

FIG. 25 is a functional block diagram of a main unit 401 of the radiotelephone system in the embodiment, in which reference numeral 406 is a telephone circuit interface, 407 is an incoming detector, 408 is a changeover unit, 409 is a sound input unit, 411 is a sound encoder/decoder, 412 is a frame multiplexer/separator, 413 is a transmitter, 414 is an antenna, 415 is a receiver, 416 is a reception field intensity measuring unit, 417 is a key input unit, 418 is a display unit, 419 is a controller, 419a is batch call means, 419b is chief sub unit determining means, 419c is first link channel assignment signal transmitting means, 419d is first communication establishing means, 419e is second link channel assignment signal transmitting means, and 419f is first call transition means, and they are same as in embodiment 1, and hence their explanations are omitted.

Reference numeral 419n is sound call signal transmitting means for superposing a sound signal transmitted from the sound input unit 410 on the second link channel assignment signal, and transmitting and controlling this signal by the second link channel signal transmitting means 419e, 419o is sound response signal receiving means for controlling to issue the output from the sound output unit 409 if a sound response signal is issued from the frame multiplexer/separator 412, 419p is chief sub unit changeover request signal receiving means for controlling the frame multiplexer/separator 412 when the frame multiplexer/separator 412 issues a chief sub unit changeover request signal, transmitting the first link channel assignment signal c composed of the chief sub unit information for determining the sub unit having transmitting his signal as the chief sub unit and others from the transmitter 413, and instructing the frame multiplexer/separator 412 to communicate in the TCH1, and also issuing the chief sub unit changeover request signal to the frame multiplexer/separator 412, and 419q is chief sub unit changeover means for changing the chief sub unit to the sub unit having transmitted the chief sub unit changeover request signal, and transferring the process to the sound response signal receiving means 419o.

Figure 26:
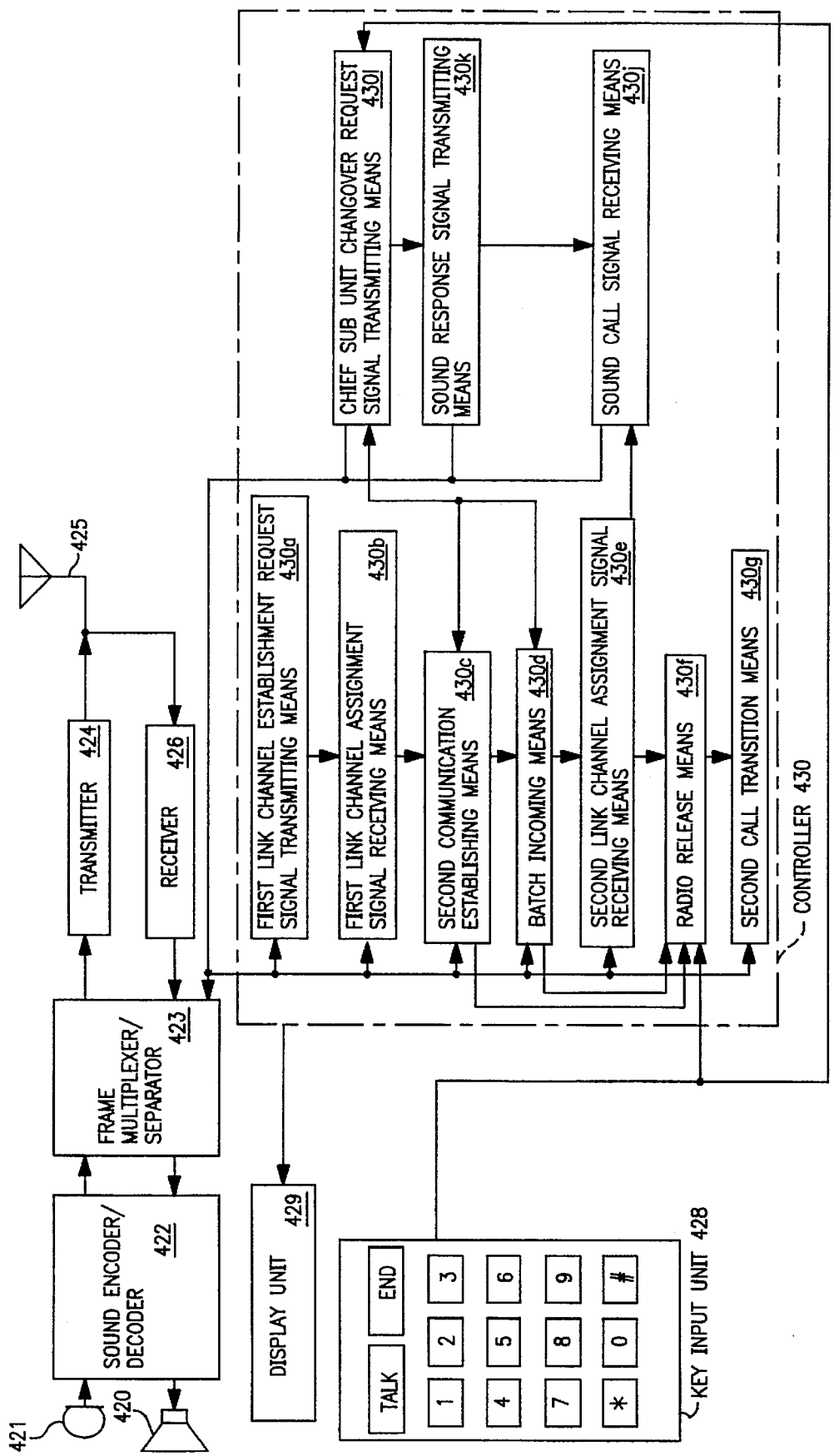
FIG. 26 is a functional block diagram of a sub unit of the radiotelephone system in the fifth embodiment of the invention.

FIG. 26 is a functional block diagram of the sub unit 403, sub unit 404 and sub unit 405, in which reference numeral 420 is a sound output unit for issuing a sound signal, 421 is a sound input unit for receiving sound, 422 is a sound encoder/decoder for coding the sound signal and decoding the coded sound signal, 423 is a frame multiplexer/separator, 424 is a transmitter, 425 is an antenna, 426 is a receiver, 428 is an input unit, 429 is a display unit, 430 is a controller, 430a is a first link channel establishment request signal transmitting means, 430b is a first link channel assignment signal receiving means, 430c is second communication establishing means, 430d is batch incoming means, 430e is second link channel assignment signal receiving means, 430f is radio release means, and 430g is call transition means, which are same as in embodiment 1 and are hence not explained herein.

Reference numeral 430j is sound call signal receiving means for controlling so as to reproduce the sound signal contained in the sound call signal received by the second link channel assignment signal receiving means 430e as sound from the sound output unit 420, 430k is sound response signal transmitting means for controlling to transmit the sound signal entering from the sound input unit 421 from the frame multiplexer/separator when the second communication establishing means 430c recognizes that it itself judges as the chief sub unit, and 430l is chief sub unit changeover request signal transmitting means for controlling the frame multiplexer/separator 423 to transmit the chief sub unit changeover request signal from the transmitter 424, and receiving the first link channel assignment signal c issued from the frame multiplexer/separator 423, transferring to the information channel specified in the first link channel assignment signal c, and transferring the process to the sound response signal transmitting means 430k.

In thus constituted radiotelephone system in the fifth embodiment of the invention, the operation is described below by reference to FIGS. 27 through 31.

Figure 27:
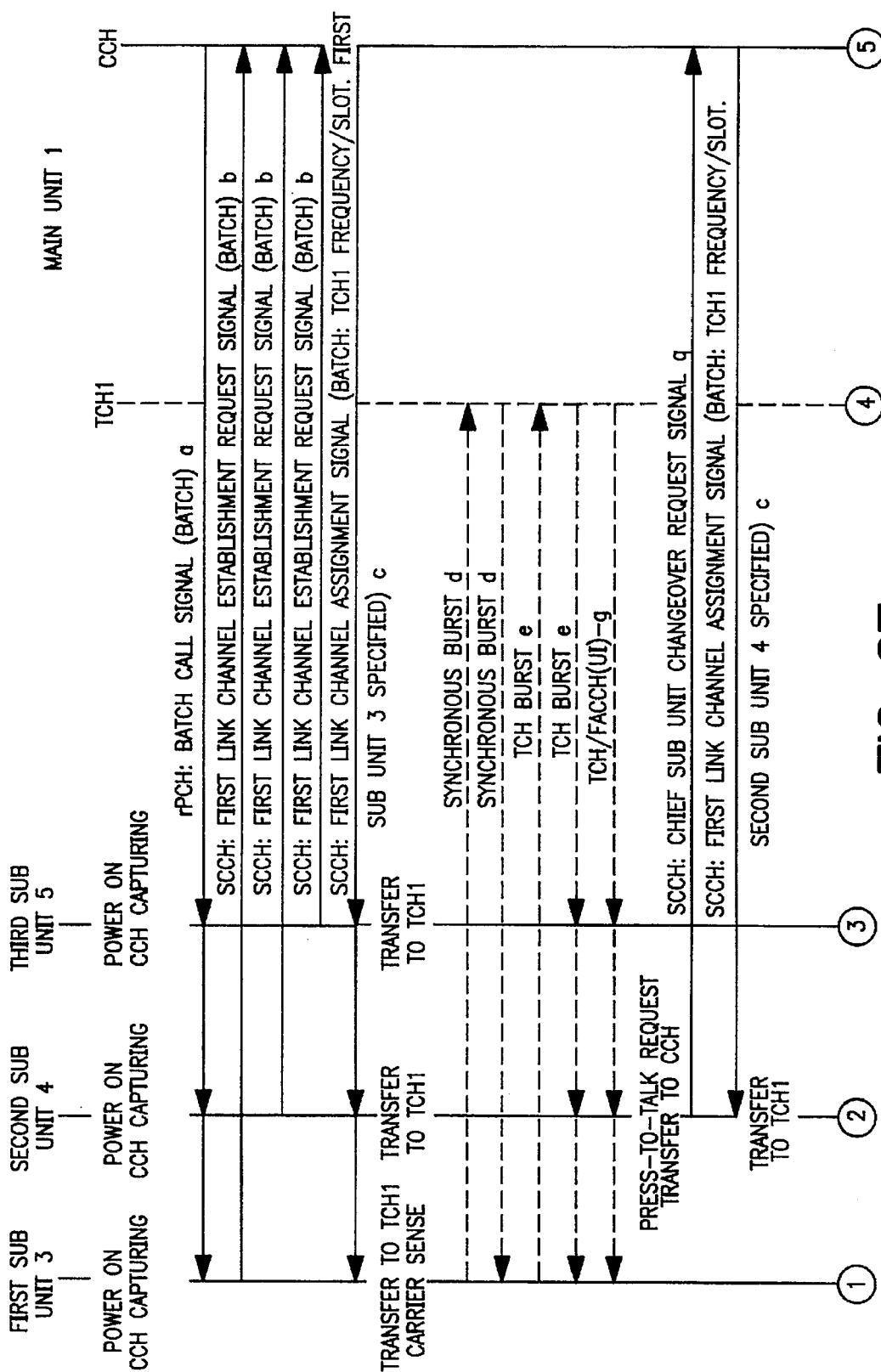
FIG. 27 is a sequence chart of the radiotelephone system in the fifth embodiment of the invention.
Figure 28:
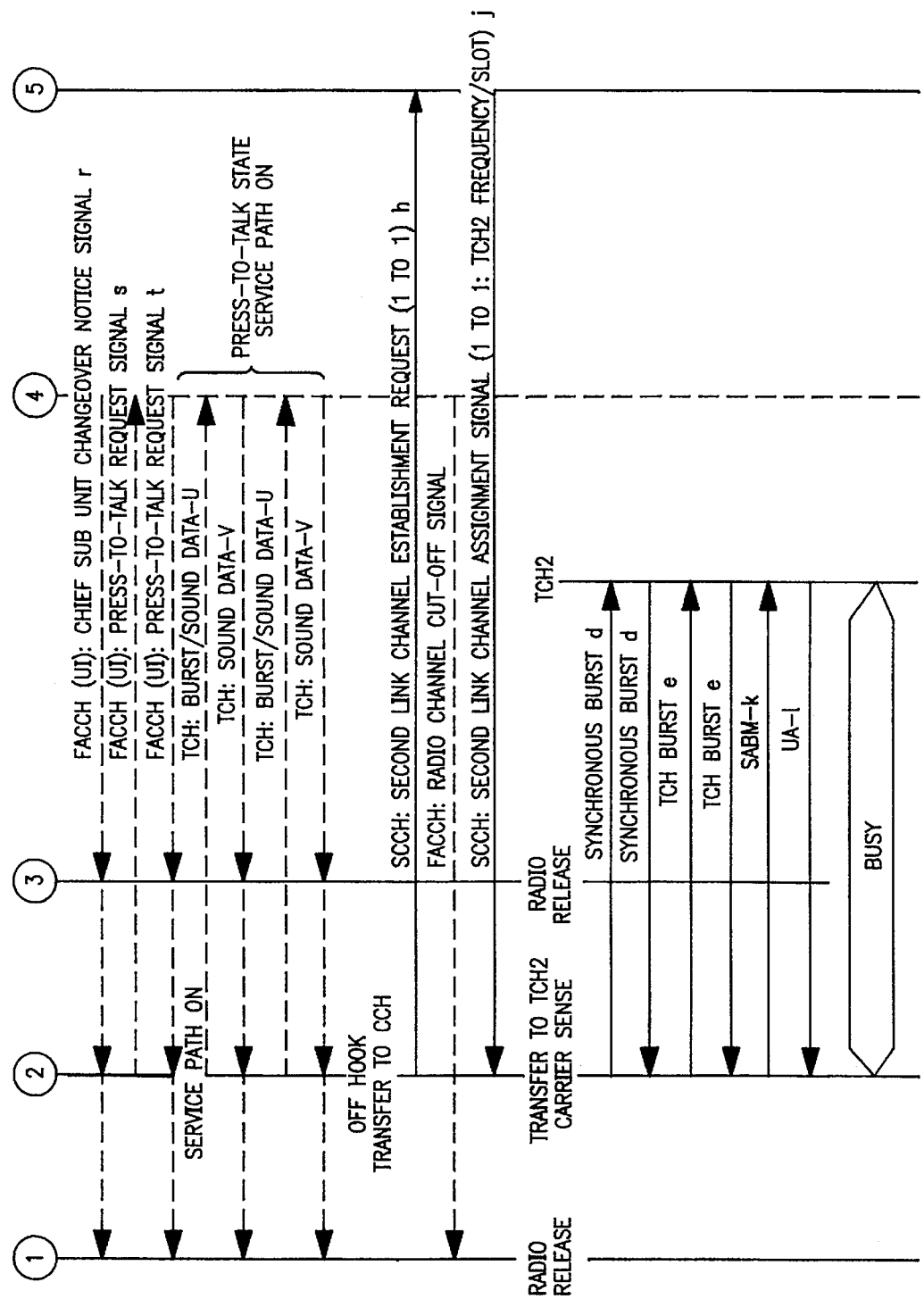
FIG. 28 is a sequence chart of the radiotelephone system in the fifth embodiment of the invention.
Figure 29:
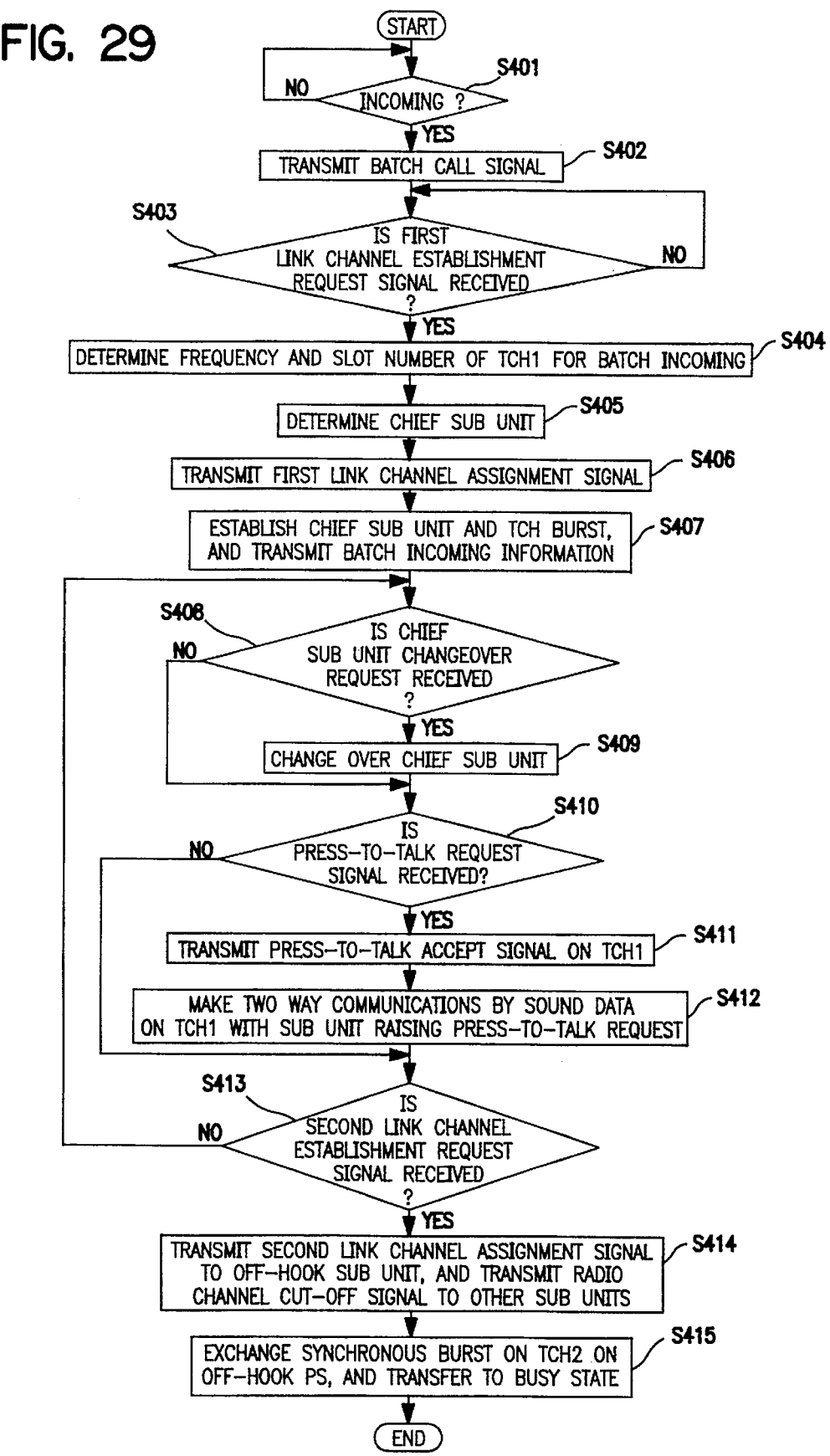
FIG. 29 is a flow chart of the main unit of the radiotelephone system in the fifth embodiment of the invention.
Figure 30A:
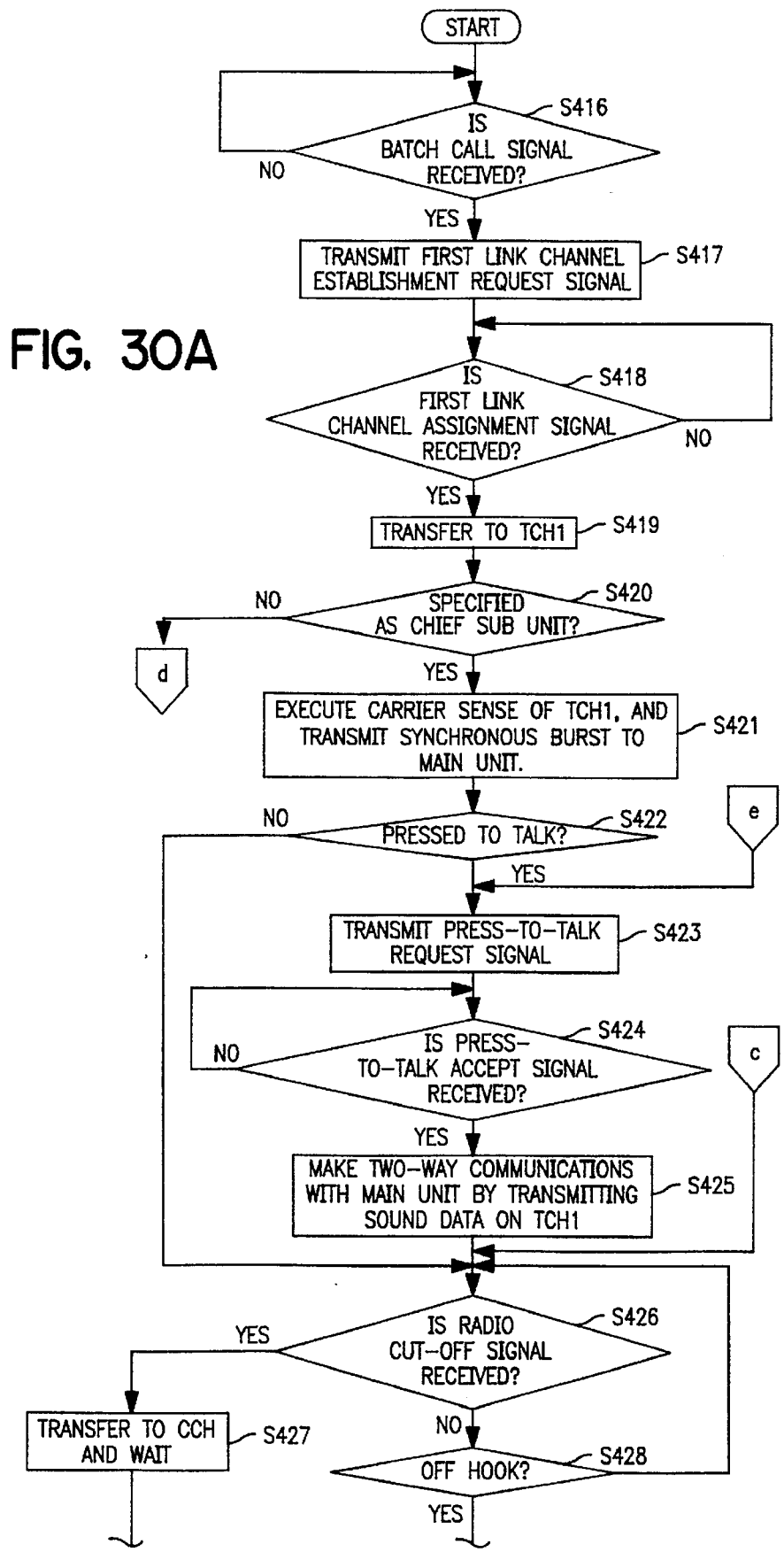
FIG. 30 is a flow chart of the sub unit of the radiotelephone system in the fifth embodiment of the invention.
Figure 30B:
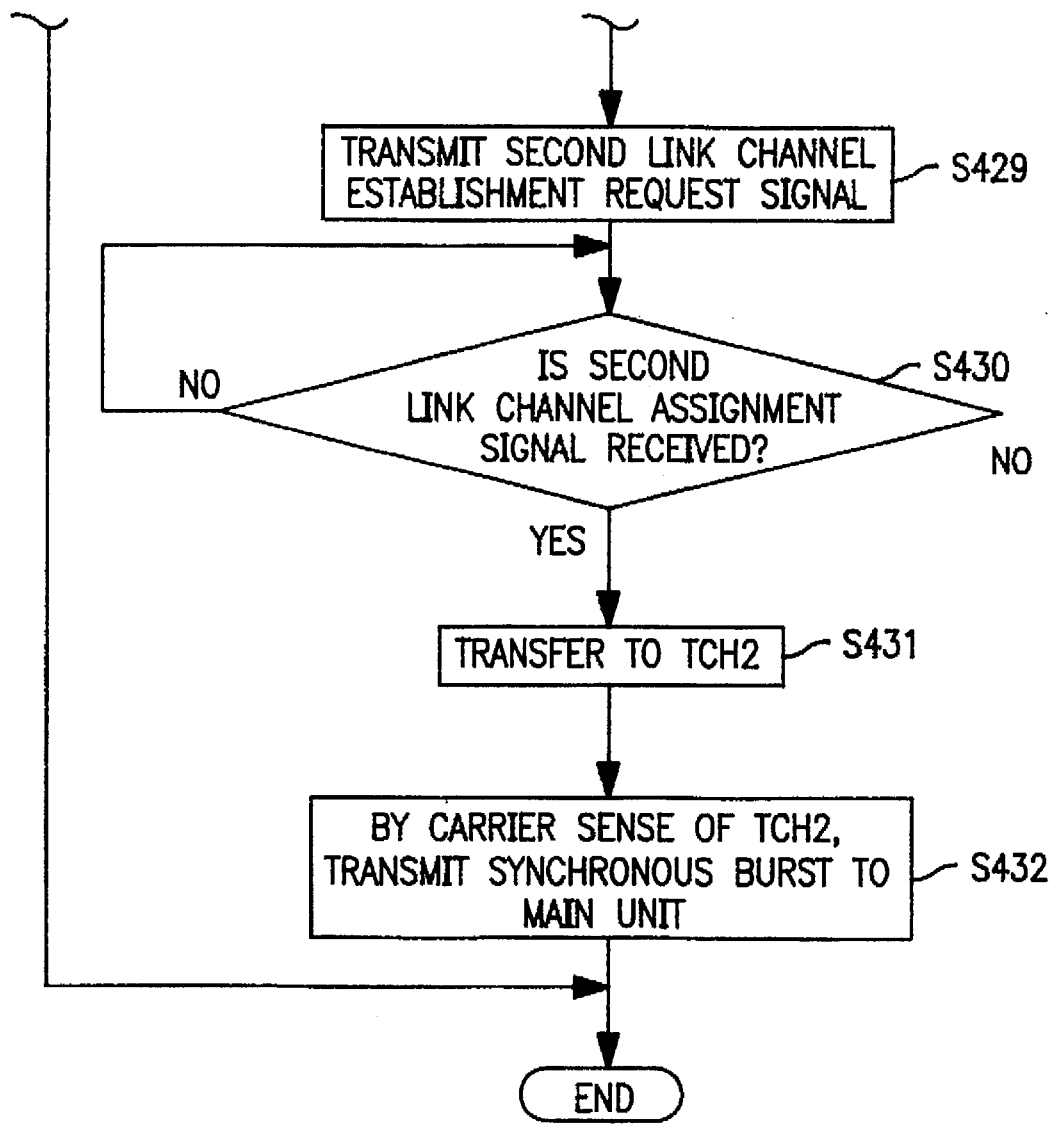
Figure 31:
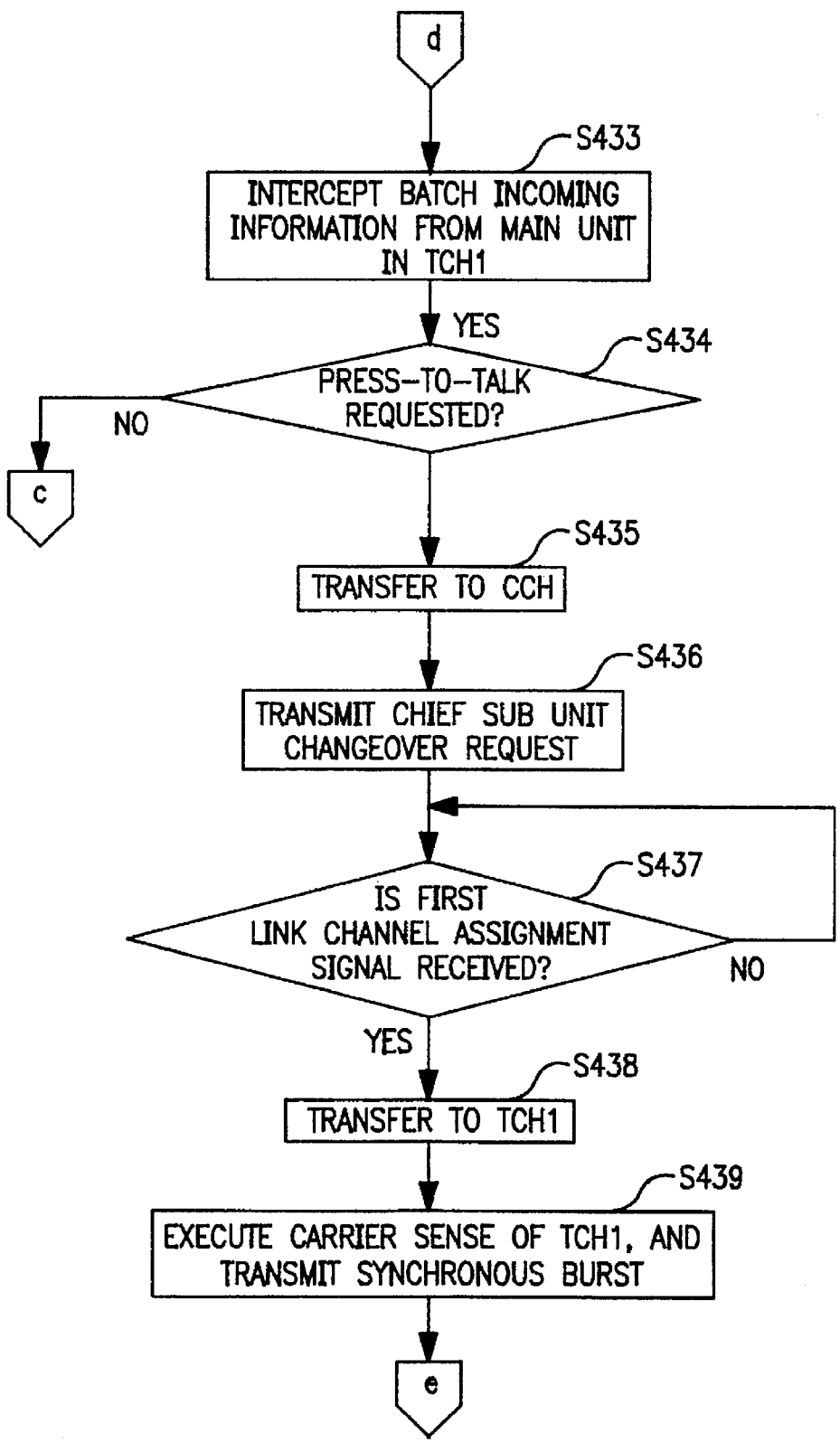
FIG. 31 is a flow chart of the sub unit of the radiotelephone system in the fifth embodiment of the invention.

FIG. 27 and FIG. 28 are sequence flow charts of the radiotelephone system in the fifth embodiment of the invention, FIG. 29 is a flow chart of the operation of the main unit 401, and FIGS. 30 and 31 are flow charts of the sub unit 403, sub unit 404 and sub unit 405.

In FIGS. 27 and 28, the CCH is a control channel, and TCH, TCH1, TCH2 are information channels for sound communications, etc., SCCH is a channel for transmitting information necessary for call connection, FACCH is a control channel accompanying the TCH, SABM is a synchronous setting mode signal, and UA is a validation signal not specified in sub unit. Moreover, a is a batch call signal sent from the main unit 401, b is a first link channel establishment request signal sent from the sub unit 403, sub unit 404 and sub unit 405, c is a first link channel assignment signal sent from the main unit 401, d is a signal sent out to synchronize the sub unit 403 and the main unit 401 (hereinafter called synchronous burst), e is a TCH burst transmitted for establishing communications of TCH, f is a ringing tone starting signal for issuing a ringing tone in the sub unit 403 and others, g is a ringing tone starting signal, q is a chief sub unit changeover request signal for requesting, when the user of a sub unit which is not the chief sub unit has pressed to talk, to designate itself as the chief sub unit to the main unit 401 in the CCH by the transmitter 424 of this sub unit, r is a chief sub unit changeover notice signal transmitted, when the main unit 401 changes the chief sub unit to other sub unit depending on the chief sub unit changeover notice signal q, in the TCH1 by the transmitter 413 of the main unit 401 in order to notify it to the other sub units, s is a press-to-talk request signal transmitted when sending a sound response signal from a sub unit to the main unit 401, t is a press-to-talk reception signal transmitted by the main unit 401 as a response to the press-to-talk request signal s, u is a TCH burst as a sound response signal of the use of a sub unit to the main unit 401, and v is a TCH as a sound call signal to each sub unit transmitted by the main unit 401.

The embodiment, same as embodiment 1, comprises the main unit 401 and sub unit 403, sub unit 404 and sub unit 405.

First, the operation of the main unit is described.

Same as in S1 to S7 in embodiment 1, the batch incoming state is established (S401 to S407). At this time, the chief sub unit is the sub unit 403.

The chief sub unit changeover request transmitting means 430*l* investigates if a chief sub unit changeover request signal q is issued from the frame multiplexer/separator 412 or not, that is, if the chief sub unit changeover request signal q is received by the receiver 415 or not (S408).

If No, jumping to S410, and if Yes, analyzing the sub unit information contained in the chief sub unit changeover request signal q, the chief sub unit information for specifying the transmitting sub unit as the chief sub unit and the first link channel assignment signal c showing that the communicating channel is the TCH1 are issued to the frame multiplexer/separator 412. As a result, the first link channel assignment signal c is transmitted to each sub unit, and the communication channel of each sub unit is transferred to the TCH1. At this time, after instructing the frame multiplexer/separator 412 to communicate in the TCH1, the chief sub unit changeover notice signal r to each sub unit is issued to the frame multiplexer/separator 412. At the same time, it is internally processed to specify the sub unit having transmitted the chief sub unit changeover request signal q received in the S408 by the chief sub unit changeover means 419q as the new chief sub unit (S409).

Consequently, the sound response receiving means 419o investigates if the press-to-talk request signal s is issued from the frame multiplexer/separator 412 or not, that is, if the press-to-talk request signal s from the chief sub unit is received by the receiver 410 or not (S410).

If No, jumping to S413, and if Yes, controlling the frame multiplexer/separator 412, a multiplexed signal is transmitted from the transmitter 413 in a state of distributing the press-to-talk reception signal t in the TCH1 (S411). Next, the sound call signal transmitting means 419h controls the frame multiplexer/separator 412, and a' multiplexed signal distributing TCHv as sound call signal from the main unit 401 in the TCH1 is transmitted from the transmitter 413, and when there is an output of THC burst u from the frame multiplexer/separator 412, the batch call by sound from the main unit 401 to the sub units 403, 404 and 405, and two-way communications by sound between the main unit 401 and an arbitrary sub unit are established (S412).

Afterwards, it is investigated if the second link channel establishment request signal issued by the frame multiplexer/separator 412 is received or if the second link channel establishment request signal h is received (S413). If No, jumping to S408, the same process is repeated, and if Yes, jumping to S414, off-hook processing of sub unit is effected in the same process as in S9 and S10 in embodiment 1.

The operation of the sub unit 403, sub unit 404 and sub unit 405 is described by referring to FIGS. 30 and 31.

First, same as in S11 to S14 in embodiment 1, the control is transferred to the TCH1 in order to establish the batch incoming state (S416 to S419).

Next, the chief sub unit changeover request signal transmitting means 430*l* investigates if it is itself specified as chief sub unit by the first link channel assignment signal c received in S418 (S420). If No, jumping to S433, and if Yes, controlling the frame multiplexer/separator 423, carrier sensing is effected in the TCH1, and the synchronous burst d is transmitted in the TCH1 by the transmitter 424, thereby establishing communications with the main unit 401 (S421).

It is then investigated if the own user has requested to press to talk (S422).

If No, jumping to S426, the same processing as in S18 to S24 in embodiment 1 is effected to transfer to the busy state (S426 to S432).

If Yes, the sound response signal transmitting means 430k controls the frame multiplexer/separator 423, and a multiplexed signal transmitted by the transmitter 424 in a state of distributing the press-to-talk request signal s in the TCH1 (S423).

In consequence, the sound call signal receiving means 430j investigates if the press-to-talk signal t is issued from the frame multiplexer/separator 423 (S424). If No, jumping to S424, and if Yes, the frame multiplexer/separator 423 is controlled to make two-way communications by sound with the main unit 401 in the TCH1 (S425).

Then, processing same as in S18 to S24 in embodiment 1, the busy state is established (S426 to S432).

If No at S420, incidentally, the batch incoming means 430d controls the frame multiplexer/separator 423 to control so as to intercept the batch incoming information, thereby establishing the batch incoming state (S433).

It is next investigated if the user has requested to press to talk, that is, if the talk button is pressed in the key input unit (S434). If jumping to S426, the same processing as in S18 to S24 in embodiment 1 is effected to transfer to the busy state (S426 to S432). If Yes, by instructing the frame multiplexer/separator 423 to communicate in the CCH, the communicating channel is transferred to the CCH (S435).

The sound response signal transmitting means 430k controls the frame multiplexer/separator 423, and transmits a chief sub unit changeover request signal q from the transmitter 424 (S435).

Consequently, the sound call signal receiving means 430j investigates if the first link channel assignment signal c is issued from the frame multiplexer/separator 423 or not, that is, if the first link channel assignment signal c is received by the receiver 426 (S437).

If No, jumping to S437, and if Yes, it is instructed to communicate in the information channel (TCH1 in this embodiment) on the basis of the signal of transfer instruction of information channel contained in the received first link channel assignment signal c (S438).

Then, controlling the frame multiplexer/separator 423, communications with the main unit 401 are established with the receiver 426 and transmitter 424 (S439).

Thereafter, by the same process as in S18 to S24 in embodiment 24, the busy state is established (S426 to S432), Thus, according to the embodiment, while set in batch incoming state, the sound of the user of the main unit 401 is converted into a sound call signal and is transmitted in the TCH1, and each sub unit receives it to convert into sound to deliver, so that the sub units may be called in batch by sound from the main unit 401. Or, by converting the sound of the user of the main unit 401 into a sound response signal, transmitting it in the TCH1, receiving it by the main unit 401 to convert into sound to deliver, two-way communications by sound are established between the main unit 401 and the chief sub unit. Furthermore, when the user of a sub unit which is not the chief sub unit attempts to reply by sound, a chief sub unit changeover request signal q is sent from this sub unit to the main unit 401 in the CCH, and this sub unit sending it out is recognized as a new chief sub unit, and the communications are established with this, so that two-way communications by sound are established between an arbitrary sub unit and the main unit 401.

In the embodiment, meanwhile, the two-way communications by sound are realized between an arbitrary sub unit and the main unit 401, by the chief sub unit changeover request signal receiving means 419p and chief sub unit changeover means 419q of the main unit 401 and the chief sub unit changeover signal transmitting means 430l of the sub unit, but, eliminating them, two-way communications by sound may be established only between the chief sub unit and the main unit 401.

Furthermore, eliminating the sound response signal receiving means 419o of the main unit 401 and the sound response signal transmitting means 430k of the sub unit, only one-way batch call by sound may be effected from the main unit 401 to each sub unit.

Embodiment 6

A radiotelephone system in a sixth embodiment of the invention is described below while referring to the drawings.

Figure 32:
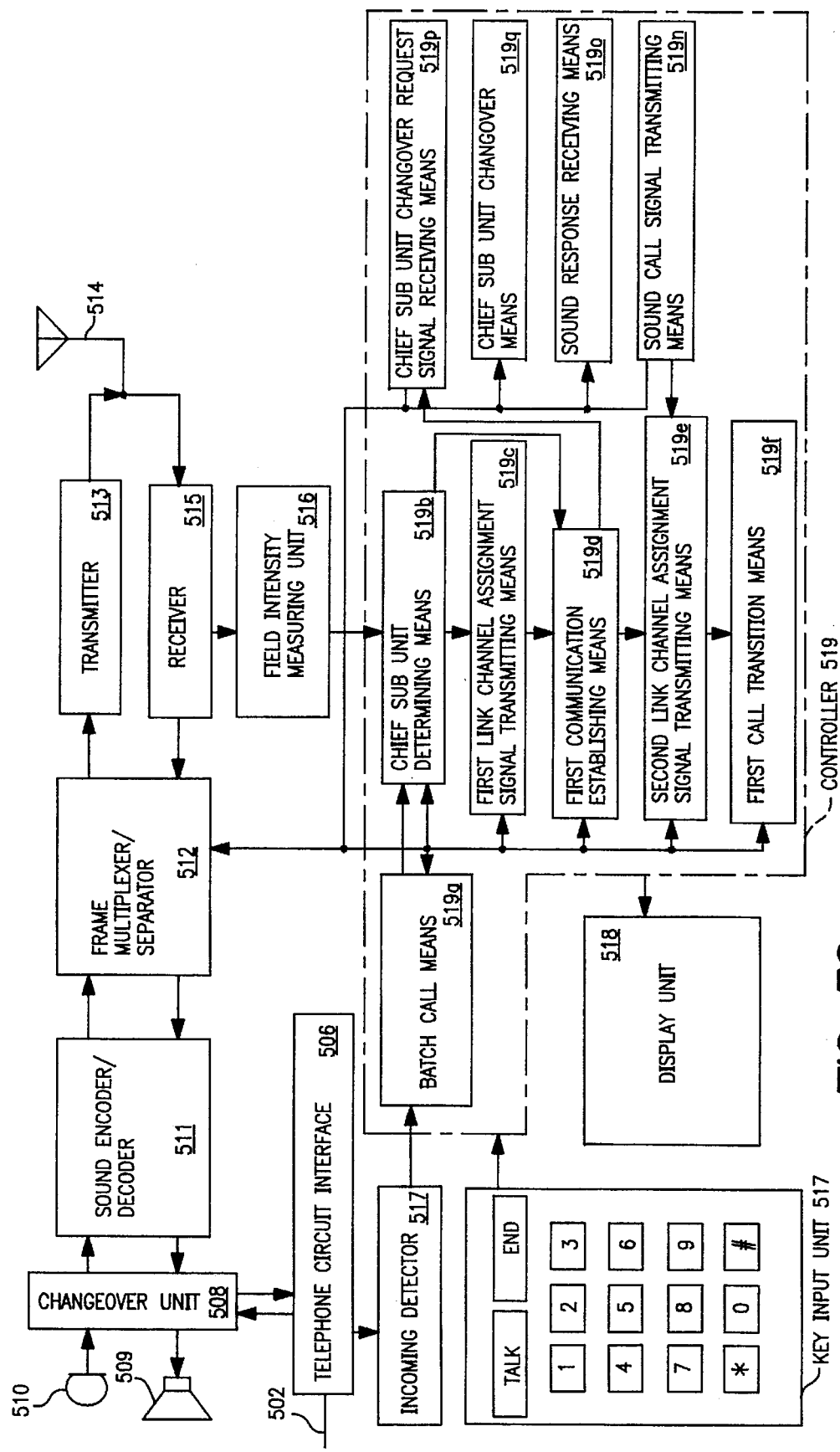
FIG. 32 is a functional block diagram of a main unit of a radiotelephone system in a sixth embodiment of the invention.

FIG. 32 is a functional block diagram of a main unit 501 of the radiotelephone system in the embodiment, in which reference numeral 506 is a telephone circuit interface, 507 is an incoming detector, 508 is a changeover unit, 509 is a sound input unit, 511 is a sound encoder/decoder, 512 is a frame multiplexer/separator, 513 is a transmitter, 514 is an antenna, 515 is a receiver, 516 is a reception field intensity measuring unit, 517 is a key input unit, 518 is a display unit, 519 is a controller, 519a is batch call means, 519b is chief sub unit determining means, 519c is first link channel assignment signal transmitting means, 519d is first communication establishing means, 519e is second link channel assignment signal transmitting means, and 519f is first call transition means, 519n is sound call signal transmitting means, 519o is sound response signal receiving means, 519p is chief sub unit changeover request signal receiving means, and 519q is chief sub unit changeover means, and they are same as in embodiment 5 and are not explained herein.

Reference numeral 519r is non-sound calling means for transmitting a call signal from the transmitter 513 by controlling the frame multiplexer/separator 512.

Figure 33:
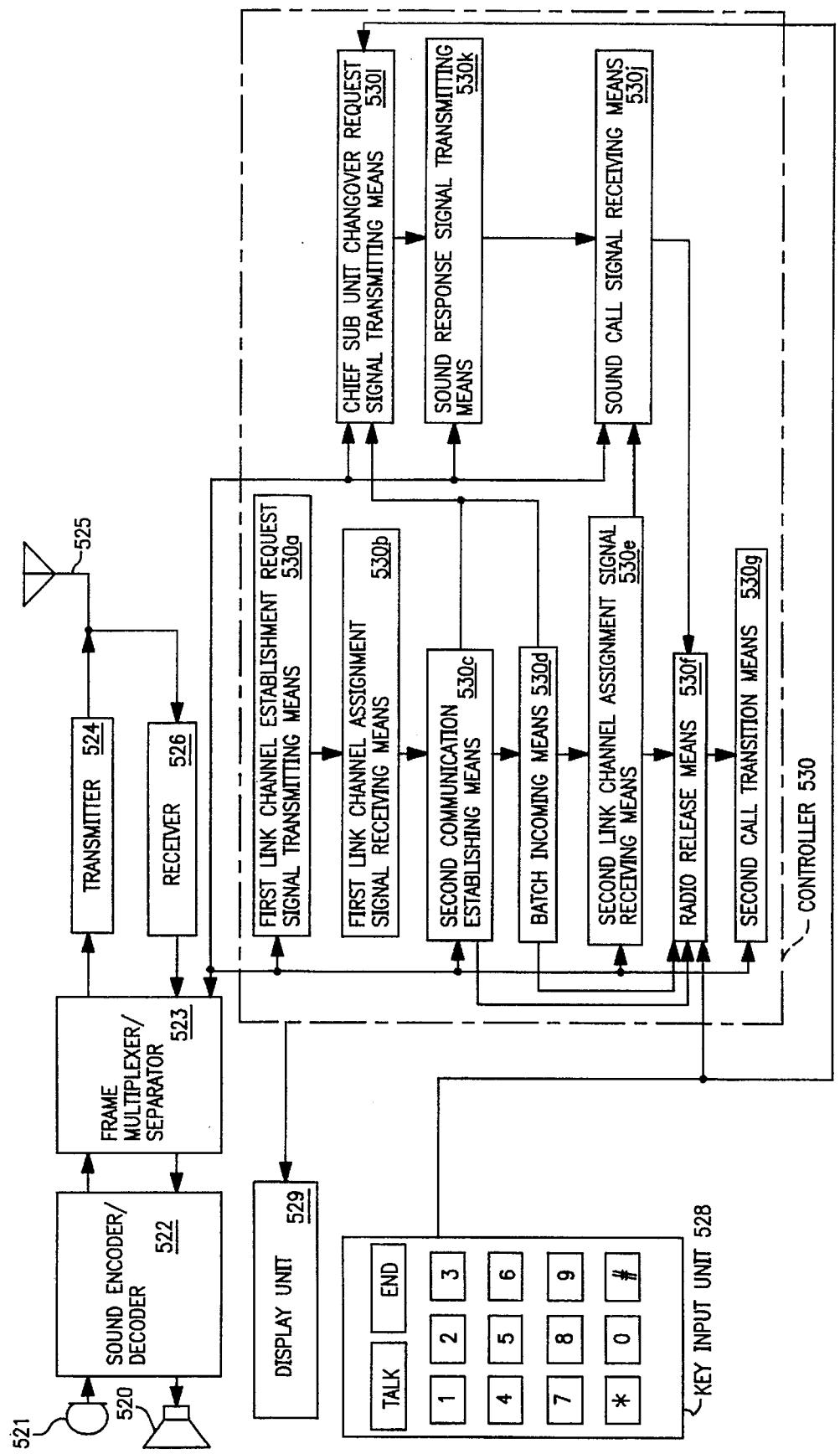
FIG. 33 is a functional block diagram of a sub unit of the radiotelephone system in the sixth embodiment of the invention.

FIG. 33 is a functional block diagram of the sub unit 503, sub unit 504 and sub unit 505, in which reference numeral 520 is a sound output unit for issuing a sound signal, 521 is a sound input unit for receiving sound, 522 is a sound encoder/decoder for coding the sound signal and decoding the coded sound signal, 523 is a frame multiplexer/separator, 524 is a transmitter, 525 is an antenna, 526 is a receiver, 528 is an input unit, 529 is a display unit, 530 is a controller, 530a is a first link channel establishment request signal transmitting means, 530b is a first link channel assignment signal receiving means, 530c is second communication establishing means, 530d is batch incoming means, 530e is second link channel assignment signal receiving means, 530f is radio release means, 530g is call transition means, 530j is sound call signal receiving means, 530k is sound response signal transmitting means, and 530l is chief sub unit changeover request signal transmitting means, which are same as in embodiment 5 and are not explained herein.

Reference numeral 530m is sound call requirement specifying means for displaying the requirement inquiry about reception of sound call signal from the main unit 501 in the display unit 518, and detecting input about the requirement specified from the key input unit 528, and 530n is intermittent receiving means for controlling to receive intermittently in the receiver 526 when it is detected that the sound call requirement specifying means 530m has instructed that reception of sound call is not necessary.

In thus constituted radiotelephone system in the sixth embodiment of the invention, the operation is described below.

Figure 34:
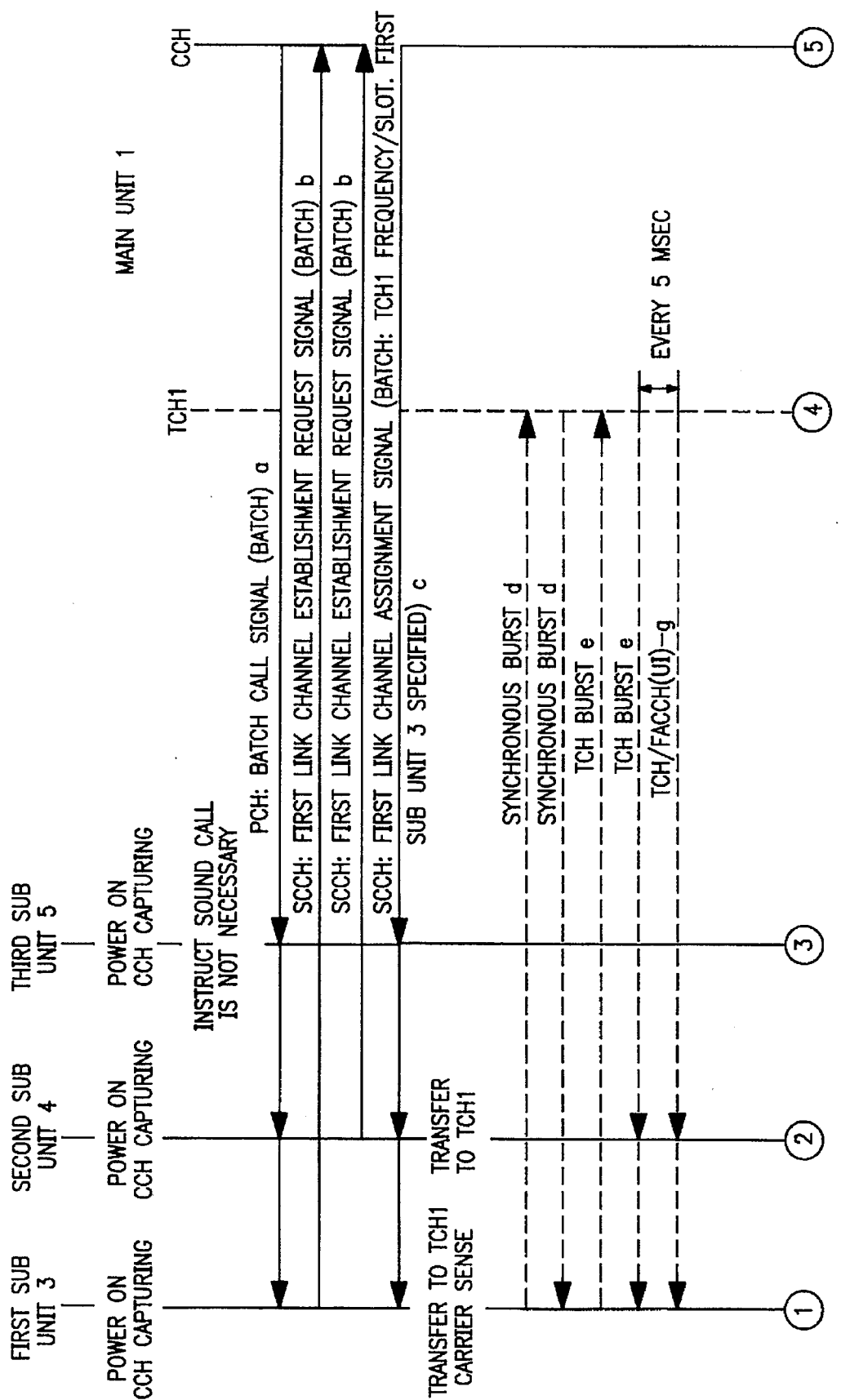
FIG. 34 is a sequence chart of the radiotelephone system in the sixth embodiment of the invention.
Figure 35:
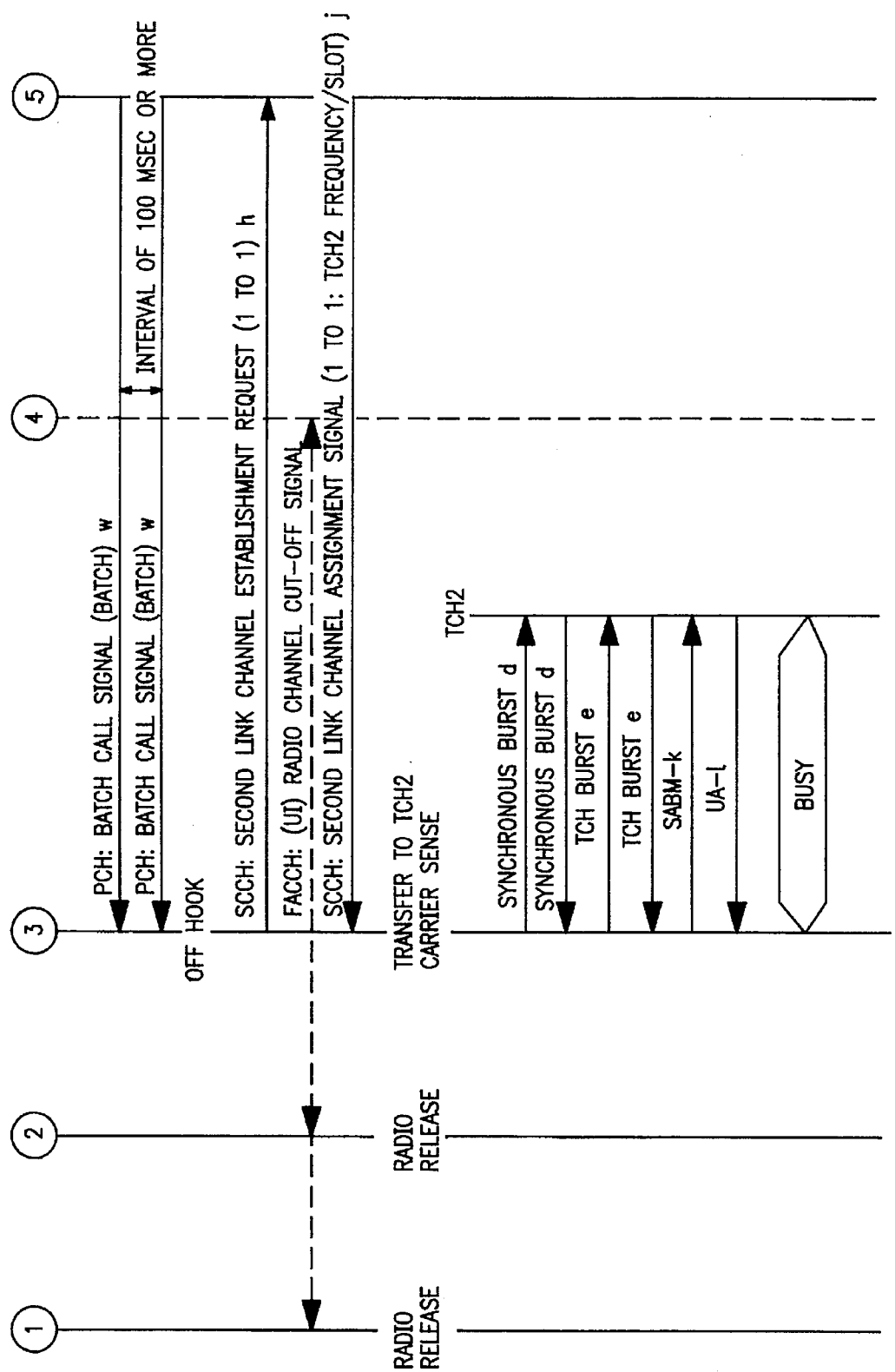
FIG. 35 is a sequence chart of the radiotelephone system in the sixth embodiment of the invention.

FIG. 34 and FIG. 35 are sequence flow charts of the radiotelephone system in the sixth embodiment of the invention.

In FIGS. 34 and 35, the CCH is a control channel, and TCH, TCH1, TCH2 are information channels for sound communications, etc., SCCH is a channel for transmitting information necessary for call connection, FACCH is a control channel accompanying the TCH, SABM is a synchronous setting mode signal, and UA is a validation signal not specified in sub unit. Moreover, a is a batch call signal sent from the main unit 501, b is a first link channel establishment request signal sent from the sub unit 503, sub unit 504 and sub unit 505, c is a first link channel assignment signal sent from the main unit 501, d is a signal sent out to synchronize the sub unit 503 and the main unit 501 (hereinafter called synchronous burst), e is a TCH burst transmitted for establishing communications Of TCH, f is a ringing tone starting signal for issuing a ringing tone in the sub unit 503 and others, g is a ringing tone starting signal, q is a chief sub unit changeover request signal for requesting, when the user of a sub unit which is not the chief sub unit has pressed to talk, to designate itself as the chief sub unit to the main unit 501 in the CCH by the transmitter 524 of this sub unit, r is a chief sub unit changeover notice signal transmitted, when the main unit 501 changes the chief sub unit to other sub unit depending on the chief sub unit changeover notice signal q, in the TCH1 by the transmitter 513 of the main unit 501 in order to notify it to the other sub units, s is a press-to-talk request signal transmitted when sending a sound response signal from a sub unit to the main unit 501, t is a press-to-talk reception signal transmitted by the main unit 501 as a response to the press-to-talk request signal s, u is a TCH burst as a sound response signal of the use of a sub unit to the main unit 501, v is a TCH as a sound call signal to each sub unit transmitted by the main unit 501, and w is a call signal transmitted at intervals of 100 msec or more from the transmitter 513 to the sub units in the CCH.

The embodiment, same as embodiment 5, comprises the main unit 501 and sub unit 503, sub unit 504 and sub unit 505.

The flow chart of the embodiment is same as in embodiment 5, and its explanation is hence omitted.

Only the difference between embodiment 5 and this embodiment is described below.

In embodiment 5, in order to receive the call signal w by sound, the signal from the main unit 501 must be received in every 5 msec by the received signal 526 of the sub unit in the batch incoming state in the TCH1. However, if the user of, for example, the third sub unit 503 instructs that this sound call signal is not necessary, this third sub unit 503 intermittently receives the call signal w transmitted from the main unit 501 at intervals of 100 msec or more in the CCH by the receiver 515 of the third sub unit 505, so that the incoming state is detected, and a ringing tone or the like is issued to notify the user of the incoming state.

Thus, according to the embodiment, by the transmitter 513 of the main unit 501, the call signal w is transmitted during incoming in the CCH, and when specified by the user of the sub unit, the call signal w is received intermittently in the CCH in the receiver of the sub unit, so that the power consumption of the sub unit may be saved greatly.

Transmitting the call signal w during incoming, when specified by the user of the sub unit, the call signal w is intermittently received in the CCH in the receiver of the sub unit, so that the power consumption in the subunit may be saved greatly.

We claim:

1. A radiotelephone system comprising:
   one main unit, and
   plural sub units;
   the main unit including:
   first transmitting means for transmitting radio signals to the sub units,
   first receiving means for receiving radio signals from the sub units,
   chief sub unit selecting means for selecting one chief sub unit among the plural sub units, and
   first communication establishing means for controlling the first transmitting means and the first receiving means so as to establish radio communications with the chief sub unit; and
   each sub unit including:
   second transmitting means for transmitting radio signals to the main unit,
   second receiving means for receiving radio signals from the main unit, and
   second communication establishing means for
   a) controlling the second transmitting means and second receiving means so as to establish radio communications with the main unit when the sub unit is selected as the chief sub unit, or
   b) controlling the second receiving means so as to receive the radio communications between the main unit and the chief sub unit when the sub unit is not selected as the chief sub unit.

2. A radiotelephone system of claim 1, wherein communications between the main unit and the chief sub unit are digital radio communications.

3. A radiotelephone system of claim 2, wherein time division multiplex access is applied in communications between the main unit and the chief sub unit.

4. A radiotelephone system of claim 1, the main unit further including:
   a field intensity measuring device for measuring the radio intensity of received radio signals, and
   means for transmitting a batch call signal to the first transmitting means when an incoming signal is provided by a telephone circuit: and
   each sub unit further including:
   means for transmitting a request for communication establishment signal to the second transmitting means when a batch call signal is received,
   wherein the chief sub unit selecting means selects the sub unit transmitting the request for communication establishment signal having the maximum field intensity at the receiving point, among the sub units transmitting a request for communication establishment signal to the main unit, as the chief sub unit.

5. A radiotelephone system of claim 4, the main unit further including:
   new chief sub unit selecting means for selecting a new chief sub unit when the field intensity of a radio signal from the current chief sub unit decreases below a specified value during communication.

6. A radiotelephone system of claim 5, wherein the new chief sub unit selecting means transmits a batch call signal to the first transmitting means when the field intensity of the radio signal from the current chief sub unit decreases below the specified value during communication, and selects the sub unit transmitting the request for communication establishment signal having the maximum field intensity at the receiving point, among the sub units transmitting a request for communication establishment signal to the main unit in response to the batch call signal, as the new chief sub unit.

7. A radiotelephone system of claim 1, the main unit further including:
   means for transmitting information about the chief sub unit to the first transmitting means,
   wherein the second communication establishing means controls the second receiving means to intercept the radio communications between the main unit and the chief sub unit when the sub unit is not selected as the chief sub unit by the information from the main unit.

8. A radiotelephone system of claim 1, each sub unit further including:
   means for generating a communication request, and
   means for transferring the sub unit to a busy state with the main unit, when the communication request is generated, by transmitting the communication request signal to the second transmitting means; and
   the main unit further including:
   means for transferring the main unit to a busy state with the sub unit transmitting the communication request signal, when the first receiving means receives the communication request signal after establishing communications with the chief sub unit.

9. A radiotelephone system of claim 1, wherein the means for generating the communication request includes a key for generating the signal.

10. A radiotelephone system of claim 1, the main unit further including:
    means for calling sub units other than said plural sub units.

11. A radiotelephone system of claim 1, each sub unit further including:
    request means for a chief sub unit change for transmitting a request signal for a chief sub unit change to the second transmitting means; and
    the main unit further including:
    means for selecting a certain sub unit as a new chief sub unit when the request signal for a chief sub unit change transmitted from the certain sub unit is received by the first receiving means.

12. A radiotelephone system of claim 11, each sub unit further including:
    means for generating a press-to-talk request,
    wherein the request means for a chief sub unit change transmits the request signal for a chief sub unit change to the second transmitting means, when the press-to-talk request is generated, so that the sub unit may be selected as the chief sub unit, and after being selected as the chief sub unit, the second communication establishing means transmits the press-to-talk request signal to the second transmitting means, and controls the second transmitting means and second receiving means so as to establish two-way communications with the main unit, and
    the first communication establishing means controls the first transmitting means and first receiving means so as to establish two-way communications with the sub unit when the first receiving means receives the press-to-talk request signal.

13. A radiotelephone system of claim 1,
the second receiving means further including:
intermittent reception means for receiving radio signals at specified time intervals.

14. A method of establishing communications in a radiotelephone system comprising one main unit and plural sub units, said method comprising the steps of:
the main unit selecting a chief sub unit among the sub units, and establishing communications with the chief sub unit, and
the sub unit
a) establishing radio communications with the main unit when selected as the chief sub unit, and
b) intercepting the radio communications between the main unit and the chief sub unit when not selected as the chief sub unit.

15. A radiotelephone system comprising:
one main unit, and
plural sub units,
wherein communications between the main unit and the sub units are digital radio communications having a control channel and plural service channels;
the main unit including:
batch call means for transmitting a batch call signal to each sub unit in the control channel when an incoming signal is provided by a telephone circuit,
chief sub unit selecting means for selecting a chief sub unit out of the sub units transmitting a request signal for a first link channel establishment to the main unit in the control channel in response to the batch call signal,
transmitting means of a first link channel establishment signal for transmitting chief sub unit information indicating which sub unit has been selected as the chief sub unit, and a first link channel assignment signal indicating the service channel for batch multiple access, to the sub units in the control channel,
first communication establishing means for establishing communications with the chief sub unit by using the service channel for batch multiple access,
transmitting means of a second link channel assignment signal for transmitting, when a request signal for a second link channel establishment is received in the control channel, the second link channel assignment signal containing the frequency of a new service channel and slot number information to the sub unit transmitting the request signal for a second link channel establishment in the control channel, and
transmitting a radio channel cut-off signal in the service channel to the other sub units for batch multiple access, and
first call transition means for establishing communications between the main unit and the sub unit transmitting the request signal for a second link channel establishment in the new service channel; and
each sub unit including:
transmitting means of a request signal for a first link channel establishment for transmitting a request signal for a first link channel establishment to the main unit in the control channel, when a batch call signal is received,
receiving means of the first link channel assignment signal for receiving the first link channel assignment signal in the control channel, and transferring the channel for transmission and reception of the sub unit to the service channel for batch multiple access specified by the first link channel assignment signal,
second communication establishing means for establishing radio communications with the main unit in the service channel for batch multiple address when selected as chief sub unit,
batch incoming means for establishing the batch incoming state by intercepting the batch multiple address from the main unit in the service channel for batch multiple address when not selected as chief sub unit,
receiving means of the second link channel assignment signal for transmitting the request signal for a second link channel establishment signal in the control channel when the user responds to the batch multiple address from the main unit, and receiving the second link channel assignment signal from the main unit in the control channel,
second call transition means for establishing service between the sub unit and the main unit in a new service channel specified by the second link channel assignment signal, and
means for transferring the channel for transmission and reception of the sub unit from the service channel to the control channel when a radio channel cut-off signal is received from the main unit in the service channel for batch multiple address.

16. A radiotelephone system of claim 15,
wherein the chief sub unit selecting means selects the sub unit transmitting the request signal for a first link channel establishment having the maximum field intensity at the receiving point, among the sub units transmitting a request signal for a first link channel establishment to the main unit in response to the batch call signal, as the chief sub unit.

17. A radiotelephone system of claim 15,
wherein the transmitting means of a second link channel assignment signal transmits a frequency and slot number information of the service channel, and
the transmitting means of a request signal for a first link channel establishment includes means for setting a batch incoming state by transferring the channel for transmission and reception of a sub unit to a specified service channel.

18. A radiotelephone system of claim 17,
the transmitting means of a second link channel assignment signal further including:
means for transmitting a synchronism assisting signal having a long synchronous pattern at specific intervals; and
the transmitting means of a first link channel assignment signal further including:
means for synchronizing with the signal transmitted from the main unit, based on the synchronism assisting signal in the batch incoming state.

19. A radiotelephone system of claim 15,
the transmitting means of a second link channel assignment signal further including:
means for transmitting a batch call signal in the service channel for batch multiple address when the field intensity of a radio signal from the current chief sub unit decreases, and
new chief sub unit selecting means for selecting, as a new chief sub unit, the sub unit transmitting the request signal for a first link channel establishment having the maximum field intensity at the receiving point, among the sub units transmitting a request signal for a first link channel establishment in response to the batch call signal; and the receiving means of the second link channel assignment signal further including:

means for transmitting a request signal for a first link channel establishment in response to a chief sub unit changeover signal.

20. A radiotelephone system of claim 15, the transmitting means of a second link channel assignment signal further including:

means for transmitting a call signal in the control channel to the sub unit not available for batch call processing.

21. A radiotelephone system of claim 15, the transmitting means of a second link channel assignment signal further including:

first sound signal transmitting means for converting a sound of the user into a call signal, and transmitting the call signal to each sub unit in the service channel for batch multiple address; and the receiving means of the second link channel assignment signal further including:

first sound signal receiving means for receiving the call signal to reproduce the sound.

22. A radiotelephone system of claim 21, the transmitting means of a second link channel assignment signal further including:

second sound signal receiving means for converting the sound signal from the chief sub unit into sound; and the second communication establishing means further including:

second sound signal transmitting means for converting the sound of the user into a sound signal, when the sub unit is the chief sub unit, and transmitting the sound signal to the main unit in the service channel for batch multiple address.

23. A radiotelephone system of claim 22, the transmitting means of a second link channel assignment signal further including:

means for transmitting, when a request signal for a chief sub unit change is received, the first link channel assignment signal containing information designating as a chief sub unit the sub unit transmitting the request signal for a chief sub unit change, and transmitting a notice of said chief sub unit change to the other sub units; and the batch incoming means further including:

means for transmitting a request signal for a chief sub unit change, and transmitting a sound signal to the second sound signal transmitting means in the service channel specified by the first link channel assignment signal in response to the chief sub unit change signal.

24. A radiotelephone system of claim 23, the transmitting means of a second link channel assignment signal further including:

means for transmitting a call signal in the control channel; and the receiving means of the second link channel assignment signal further including:

means for specifying whether or not to receive the sound call signal from the main unit, and means for receiving the call signal intermittently in the control channel when the specifying means has specified not to receive the sound call signal.

25. A sub unit of a plurality of sub units in a radiotelephone system, said radiotelephone system further including a main unit, said sub unit comprising:

transmitting means for transmitting radio signals to the main unit, receiving means for receiving radio signals from the main unit, communication establishing means a) for signaling the transmitting means and the receiving means to establish radio communications with the main unit when said sub unit is selected as a chief sub units wherein said chief sub unit is one of said plurality of sub units receiving strongest reception field intensity of said plurality of sub units from said main unit, and b) for signaling the receiving means to intercept radio communications between the main unit and the chief sub unit when said sub unit is not selected as the chief sub unit.

26. A sub unit in a radiotelephone system according to claim 25, wherein the radio signals transmitted to the main unit by the transmitting means are digital radio signals, and wherein the radio signals received from the main unit by the receiving means are digital radio signals.

27. A sub unit in a radiotelephone system according to claim 26, wherein the radio signals transmitted to the main unit by the transmitting means are transmitted by time division multiple access, and wherein the radio signals received from the main unit by the receiving means are received by time division multiple access.

28. A sub unit of a plurality of sub units of a radiotelephone system, the radiotelephone system further including a main unit, said sub unit comprising:

means for establishing radio communications with the main unit when said sub unit is selected as a chief sub unit, wherein said chief sub unit is one of said plurality of sub units receiving strongest reception field intensity of said plurality of sub units from said main unit; and means for intercepting radio communications between the main unit and the chief sub unit when not selected as the chief sub unit.

\* \* \* \* \*

UNITED STATES PATENT AND TRADE MARK OFFICE
CERTIFICATE OF CORRECTION

PATENT NO.    : 5,644,621
DATED         : July 1, 1997
INVENTOR(S)   : Yamashita et al.

It is certified that error appears in the above-identified patent and that said Letters Patent is hereby corrected as shown below:

On the cover page, item [73] Assignee, "co." should be --Co.--.

Column 26, line 31, "1" should be --8--.

Signed and Sealed this

Thirtieth Day of December, 1997

Attest:

BRUCE LEHMAN

*Attesting Officer*     *Commissioner of Patents and Trademarks*